US012804180B2

(12) United States Patent
Pan

(10) Patent No.: US 12,804,180 B2
(45) Date of Patent: Nov. 17, 2026

(54) PICTURE CODING AND DECODING METHODS AND APPARATUSES, DEVICE, AND STORAGE MEDIUM

(71) Applicant: Tencent Technology (Shenzhen) Company Limited, Shenzhen (CN)

(72) Inventor: Xiang Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/267,457

(22) Filed: Jul. 11, 2025

(65) Prior Publication Data

US 2025/0386041 A1 Dec. 18, 2025

Related U.S. Application Data

(63) Continuation of application No. PCT/CN2024/091058, filed on Apr. 30, 2024.

(30) Foreign Application Priority Data

Mar. 30, 2023 (CN) ......................... 202310353301.1
May 31, 2023 (CN) ......................... 202310639145.5
Oct. 19, 2023 (CN) ......................... 202311371093.4

(51) Int. Cl.
*H04N 19/44* (2014.01)
*G06N 3/0464* (2023.01)
*H04N 19/172* (2014.01)

(52) U.S. Cl.
CPC ........... *H04N 19/44* (2014.11); *G06N 3/0464* (2023.01); *H04N 19/172* (2014.11)

(58) Field of Classification Search
CPC ...... H04N 19/44; H04N 19/172; H04N 19/42; H04N 19/124; H04N 19/14; H04N 19/186;

(Continued)

(56) References Cited

U.S. PATENT DOCUMENTS 10,701,394 B1 * 6/2020 Caballero .............. G06N 3/044
2023/0239500 A1 * 7/2023 Yang .................... H04N 19/593
375/240.12

(Continued)

FOREIGN PATENT DOCUMENTS

CN 113497941 A 10/2021
CN 114494472 A 5/2022

(Continued)

OTHER PUBLICATIONS

Tencent Technology, ISR, PCT/CN2024/091058, Jul. 23, 2024, 2 pgs.

*Primary Examiner* — Tung T Vo
(74) *Attorney, Agent, or Firm* — Morgan, Lewis & Bockius LLP

(57) ABSTRACT

This application provides picture coding and decoding methods performed by a computer device, which may be applied to fields such as picture processing, video coding and decoding, and video livestreaming. The picture decoding method includes: decoding a bitstream of a current picture, to obtain a residual value of the current picture, determining a predicted value of the current picture based on the decoded bitstream, and determining a transformed value of the current picture based on the residual value and the predicted value; and processing the transformed value of the current picture by using a composite transformation network, to obtain a reconstructed picture of the current picture, where the composite transformation network includes K types of lightweight attention modules, and computation complexities of the K types of lightweight attention modules are each less than a preset value.

18 Claims, 28 Drawing Sheets

(58) Field of Classification Search
CPC ...... H04N 19/60; H04N 19/91; G06N 3/0464; G06N 3/045; G06N 3/048; G06N 3/08
USPC ...................................................... 375/240.25
See application file for complete search history.

(56) References Cited

U.S. PATENT DOCUMENTS

| | | | | |
|---|---|---|---|---|
| 2023/0239516 | A1* | 7/2023 | Mao | H04N 19/70<br>375/240.12 |
| 2023/0262259 | A1* | 8/2023 | Liang | H04N 19/132<br>375/240.12 |
| 2023/0388490 | A1* | 11/2023 | Liu | H04N 19/105 |
| 2024/0064318 | A1* | 2/2024 | Letunovskiy | H04N 19/42 |
| 2024/0105193 | A1* | 3/2024 | Mao | G10L 19/08 |
| 2024/0282012 | A1* | 8/2024 | Rusanovskyy | H04N 19/176 |
| 2025/0119543 | A1* | 4/2025 | Xie | H04N 19/117 |
| 2025/0168370 | A1* | 5/2025 | Esenlik | G06N 3/044 |
| 2025/0240415 | A1* | 7/2025 | Xie | H04N 19/86 |
| 2025/0330653 | A1* | 10/2025 | Jung | H04N 19/42 |
| 2025/0337933 | A1* | 10/2025 | Galpin | G06N 3/045 |
| 2025/0392747 | A1* | 12/2025 | Shingala | H04N 19/573 |
| 2026/0059147 | A1* | 2/2026 | Winken | H04N 19/107 |

FOREIGN PATENT DOCUMENTS

| | | | |
|---|---|---|---|
| CN | 115086680 | A | 9/2022 |
| CN | 115293991 | A | 11/2022 |
| CN | 117714705 | A | 3/2024 |

* cited by examiner

Lightweight composite transformation network-Y

Lightweight composite transformation network-UV

Composite transformation network-Y

Composite transformation network-UV

FIG. 7B
ResBlock
ResBlock
Cropping
ResAU
Cropping
ResAU
Lightweight module B
Lightweight module A
Cropping
ResAU
Cropping

PICTURE CODING AND DECODING METHODS AND APPARATUSES, DEVICE, AND STORAGE MEDIUM

CROSS-REFERENCE TO RELATED APPLICATIONS

This application is a continuation application of PCT Patent Application No. PCT/CN2024/091058, entitled "PICTURE CODING AND DECODING METHODS AND APPARATUSES, DEVICE, AND STORAGE MEDIUM" filed on Apr. 30, 2024, which claims priority to (i) Chinese Patent Application No. 202310353301.1, entitled "PICTURE CODING AND DECODING METHODS AND APPARATUSES, DEVICE, AND STORAGE MEDIUM" filed with the China National Intellectual Property Administration on Mar. 30, 2023, (ii) Chinese Patent Application No. 202310639145.5, entitled "PICTURE CODING AND DECODING METHODS AND APPARATUSES, DEVICE, AND STORAGE MEDIUM" filed with the China National Intellectual Property Administration on May 31, 2023, and (iii) Chinese Patent Application No. 202311371093.4, entitled "PICTURE CODING AND DECODING METHODS AND APPARATUSES, DEVICE, AND STORAGE MEDIUM" filed with the China National Intellectual Property Administration on Oct. 19, 2023, all of which are incorporated herein by reference in their entireties.

FIELD OF THE TECHNOLOGY

Embodiments of this application relate to the technical field of picture coding and decoding, and in particular, to picture coding and decoding methods and apparatuses, a device, and a storage medium.

BACKGROUND OF THE DISCLOSURE

With the rapid development of deep learning technologies, the deep learning technologies are applied to the field of picture coding and decoding. Currently, in a picture coding and decoding technology based on deep learning, a coder first maps an original picture to a hidden variable by using a composite transformation network, and codes the hidden variable to obtain a bitstream. Correspondingly, a decoder decodes the bitstream to obtain the hidden variable, and processes the hidden variable by using the composite transformation network to obtain a reconstructed picture.

However, the current composite transformation network has a problem that computation efficiency cannot be taken into consideration with processing effects, leading to low picture coding and decoding performance.

SUMMARY

This application provides picture coding and decoding methods and apparatuses, a device, and a storage medium, to improve performance of a composite transformation network, thereby improving picture coding and decoding effects.

According to a first aspect, this application provides a picture decoding method performed by a computer device. The method includes:

decoding a bitstream of a current picture, to obtain a residual value of the current picture, determining a predicted value of the current picture based on the decoded bitstream, and determining a transformed value of the current picture based on the residual value and the predicted value; and processing the transformed value of the current picture by using a composite transformation network, to obtain a reconstructed picture of the current picture, the composite transformation network comprising K types of lightweight attention modules, wherein each of the K types of lightweight attention modules has a computation complexity less than a preset value, and K being a positive integer.

According to a second aspect, this application provides a picture coding method, applied to a coding device. The method includes:

processing a current picture by using an analysis transformation network, to obtain a transformed value of the current picture, where the analysis transformation network includes K types of lightweight attention modules, computation complexities of the K types of lightweight attention modules are all less than a preset value, and K is a positive integer; and coding the current picture according to the transformed value of the current picture, to obtain a bitstream.

According to a third aspect, this application provides a picture decoding apparatus, applied to a decoding device. The apparatus includes:

a decoding unit, configured to decode a bitstream of a current picture, to obtain a residual value of the current picture, determine a predicted value of the current picture based on the decoded bitstream, and determine a transformed value of the current picture based on the residual value and the predicted value; and a reconstruction unit, configured to process the transformed value of the current picture by using a composite transformation network, to obtain a reconstructed picture of the current picture, where the composite transformation network includes K types of lightweight attention modules, computation complexities of the K types of lightweight attention modules are all less than a preset value, and K is a positive integer.

According to a fourth aspect, this application provides a picture coding apparatus, applied to a coding device. The apparatus includes:

a transformation unit, configured to process a current picture by using an analysis transformation network, to obtain a transformed value of the current picture, where the analysis transformation network includes K types of lightweight attention modules, computation complexities of the K types of lightweight attention modules are all less than a preset value, and K is a positive integer; and a coding unit, configured to code the current picture according to the transformed value of the current picture, to obtain a bitstream.

According to a fifth aspect, a decoder is provided. The decoder includes a processor and a memory. The memory is configured to store a computer program. The processor is configured to invoke and run the computer program stored in the memory, to perform the method in the first aspect or implementations thereof.

According to a sixth aspect, a coder is provided. The coder includes a processor and a memory. The memory is configured to store a computer program. The processor is configured to invoke and run the computer program stored in the memory, to perform the method in the second aspect or implementations thereof.

According to a seventh aspect, a chip is provided. The chip is configured to implement the method according to any one of the first aspect to the second aspect or implementations thereof. Specifically, the chip includes: a processor, configured to invoke and run the computer program from the memory, so that a device on which the chip is installed performs the method according to any one of the first aspect to the second aspect or implementations thereof.

According to an eighth aspect, a non-transitory computer-readable storage medium is provided. The computer-readable storage medium is configured to store a computer program. The computer program causes a computer to perform the method according to any one of the first aspect to the second aspect or implementations thereof.

According to a ninth aspect, a computer program product is provided. The computer program product includes computer program instructions. The computer program instructions cause a computer to perform the method according to any one of the first aspect to the second aspect or implementations thereof.

According to a tenth aspect, a computer program is provided. The computer program, when run on a computer, causes the computer to perform the method according to any one of the first aspect to the second aspect or implementations thereof.

In conclusion, when decoding a current picture, a decoder of this application first decodes a bitstream of a current picture, to obtain a residual value of the current picture, and determines a transformed value of the current picture based on the residual value. The transformed value of the current picture is processed by using a composite transformation network, to obtain a reconstructed picture of the current picture. The composite transformation network includes K types of lightweight attention modules, and computation complexities of the K types of lightweight attention modules are all less than a preset value. To be specific, an embodiment of this application provides a new composite transformation network. The composite transformation network includes K types of lightweight attention modules, and computation complexities of the K types of lightweight attention modules are all less than a preset value. In this way, an effect of processing a transformed value of a current picture by using the composite transformation network to obtain a reconstructed picture of the current picture is good, and the computation complexity is low, thereby effectively controlling picture decoding complexities, shortening a decoding time, and improving picture decoding performances while improving a picture processing effect.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by those of ordinary skill in the art based on the embodiments of this application without creative efforts fall within the protection scope of this application.

In the specification, claims, and accompanying drawings of this application, the terms "first", "second", and the like are configured for distinguishing similar objects but not necessarily indicating a specific order or sequence. Data used in this way is exchangeable in a proper case, so that the embodiments of this application described herein can be implemented in an order different from the order shown or described herein. In the embodiments of the present disclosure, “B corresponding to A” indicates that B is associated with A. In an implementation, B may be determined according to A. However, determining B according to A does not mean that B is determined according to only A. and B may alternatively be determined according to A and/or other information. In addition, the terms “include”, “contain” and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device. In the description of this application, unless otherwise stated, “plurality of” means two or more than two.

This application may be applied to the field of picture coding and decoding, the field of video coding and decoding, the field of hardware video coding and decoding, the field of dedicated circuit video coding and decoding, the field of real-time video coding and decoding, and the like. For example, the solution of this application may be combined to a deep learning-based end-to-end picture coding standard, for example, JPEG AI. Alternatively, the solution of this application may be operated by combining to another exclusive or industry standard. The standard includes ITU-TH.261, ISO/IECMPEG-1Visual, ITU-TH.262, ISO/IECMPEG-2Visual, ITU-TH.263, ISO/IECMPEG-4Visual, and ITU-TH.264 (also referred to as ISO/IECMPEG-4AVC), including scalable video coding (SVC) and multi-view video coding (MVC) extensions. The technology of this application is not limited to any particular coding and decoding standard or technology.

For ease of understanding, a video coding and decoding system in an embodiment of this application is first described with reference to FIG. 1.

Figure 1:
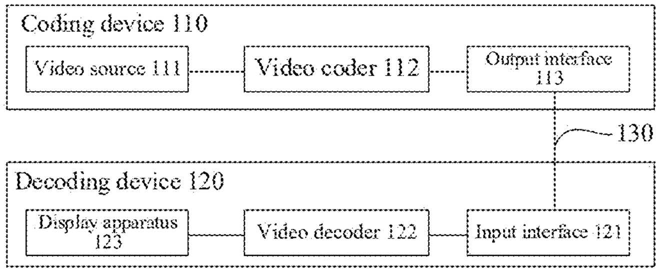
FIG. 1 is a schematic block diagram of a video coding and decoding system according to an embodiment of this application.

FIG. 1 is a schematic block diagram of a video coding and decoding system according to an embodiment of this application. FIG. 1 is merely an example. The video coding and decoding system according to this embodiment of this application includes but is not limited to that shown in FIG. 1. As shown in FIG. 1, the video coding and decoding system 100 includes a coding device 110 and a decoding device 120. The coding device is configured to code (which may be understood as compressing) video data to generate a bitstream, and transmit the bitstream to the decoding device. The decoding device decodes the bitstream generated by the coding device through coding, to obtain decoded video data.

In this embodiment of this application, the coding device 110 may be understood as a device having a video coding function, and the decoding device 120 may be understood as a device having a video decoding function. To be specific, in this embodiment of this application, the coding device 110 and the decoding device 120 include a wider range of apparatuses, for example, a smartphone, a desktop computer, a mobile computing apparatus, a notebook (for example, laptop) computer, a tablet computer, a set-top box, a television, a camera, a display apparatus, a digital media player, a video game console, and an in-vehicle computer.

In some embodiments, the coding device 110 may transmit coded video data (for example, a bitstream) to the decoding device 120 via a channel 130. The channel 130 may include one or more media and/or apparatuses capable of transmitting the coded video data from the coding device 110 to the decoding device 120.

In an example, the channel 130 includes one or more communication media enabling the coding device 110 to directly transmit the coded video data to the decoding device 120 in real time. In this example, the coding device 110 may modulate the coded video data according to a communication standard and transmit the modulated video data to the decoding device 120. The communication medium includes a wireless communication medium, for example, a radio frequency spectrum. In some embodiments, the communication medium may further include a wired communication medium, for example one or more physical transmission lines.

In another embodiment, the channel 130 includes a storage medium. The storage medium may store video data coded by the coding device 110. The storage medium includes various local access data storage media, for example, an optical disc, a DVD, and a flash memory. In this embodiment, the decoding device 120 may obtain the coded video data from the storage medium.

In another embodiment, the channel 130 may include a storage server. The storage server may store the video data coded by the coding device 110. In this example, the decoding device 120 may download the stored coded video data from the storage server. In some embodiments, the storage server may store the coded video data and may transmit the coded video data to the decoding device 120, for example, a web server (for example, for a website) or a file transfer protocol (FTP) server.

In some embodiments, the coding device 110 includes a video coder 112 and an output interface 113. The output interface 113 may include a modulator/demodulator (modem) and/or a transmitter.

In some embodiments, besides the video coder 112 and the input interface 113, the coding device 110 may further include a video source 111.

The video source 111 may include at least one of a video capture apparatus (for example, a video camera), a video file, a video input interface, and a computer graphics system. The video input interface is configured to receive video data from a video content provider. The computer graphics system is configured to generate video data.

The video coder 112 codes video data from the video source 111, to generate a bitstream. The video data may include one or more pictures or a sequence of pictures. The bitstream includes coded information of the picture or the sequence of pictures in a form of a bit stream. The coded information may include coded picture data and associated data. The associated data may include a sequence parameter set (SPS), a picture parameter set (PPS), and another syntax structure. The SPS may include parameters applied to one or more sequences. The PPS may include parameters applied to one or more pictures. The syntax structure refers to a set of zero or more syntax elements arranged in a specified order in the bitstream.

The video coder 112 directly transmits coded video data to the decoding device 120 via the output interface 113. The coded video data may further be stored on a storage medium or a storage server, so as to be read by the decoding device 120 subsequently.

In some embodiments, the decoding device 120 includes an input interface 121 and a video decoder 122.

In some embodiments, besides the input interface 121 and the video decoder 122, the decoding device 120 may further include a display apparatus 123.

The input interface 121 includes a receiver and/or a modem. The input interface 121 may receive the coded video data through the channel 130.

The video decoder 122 is configured to decode the coded video data, to obtain decoded video data, and transmit the decoded video data to the display apparatus 123.

The display apparatus 123 displays the decoded video data. The display apparatus 123 may be integrated with the decoding device 120 or external to the decoding device 120. The display apparatus 123 may include various display apparatuses, for example, a liquid crystal display (LCD), a plasma display, an organic light emitting diode (OLED) display, or another type of display apparatus.

In addition, FIG. 1 is merely an example. The technical solution of this embodiment of this application is not limited to FIG. 1. For example, the technology of this application may further be applied to single-side video coding or single-side video decoding.

The following describes a deep learning-based end-to-end picture coding and decoding framework involved in this embodiment of this application.

Figure 2A:
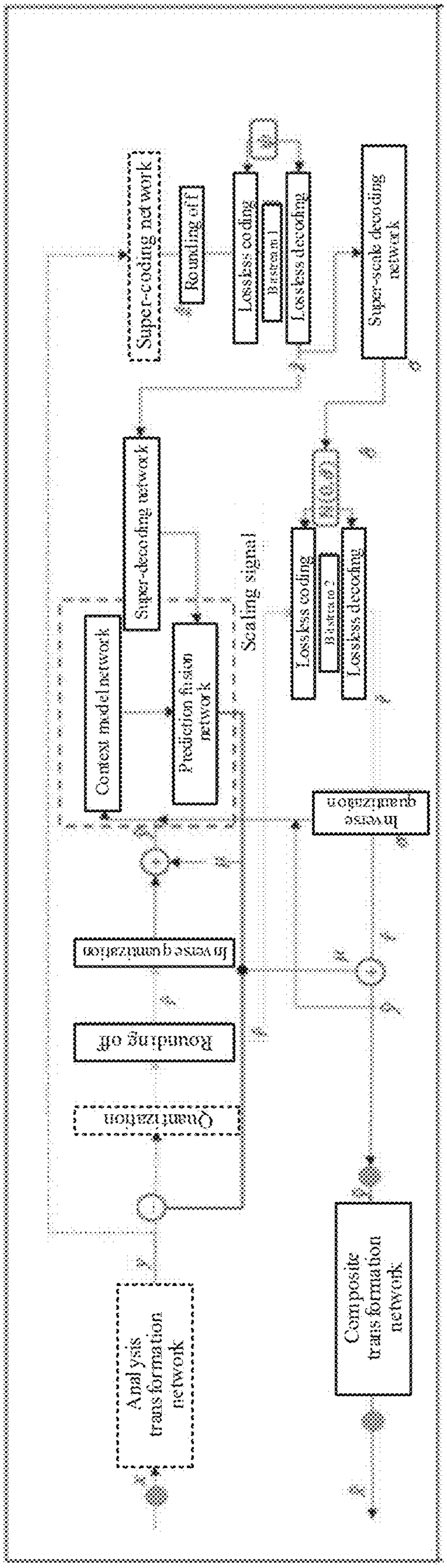
FIG. 2A is a schematic diagram of a deep learning-based end-to-end picture coding and decoding model.

FIG. 2A is a schematic diagram of a deep learning-based end-to-end picture coding and decoding model. As shown in FIG. 2A, a current picture x is processed by using an analysis transformation network, to obtain a transformed value y of the current picture x. The transformed value y is processed by using a super-coding network, to obtain to-be-coded data $\hat{z}$. Then, the to-be-coded data $\hat{z}$ is subjected to loss coding, to obtain a bitstream 1. The bitstream 1 is subjected to lossless decoding, to obtain reconstructed $\hat{z}$. The reconstructed $\hat{z}$ is decoded by using a super-decoding network and then operated by a context model network and a prediction fusion network, to obtain a predicted value μ of the current picture. The predicted value μ of the current picture is subtracted from the transformed value y of the current picture, to obtain a residual value r of the current picture, and the residual value r is quantized and rounded off, to obtain a quantized residual value $\hat{r}$. The quantized residual value $\hat{r}$ is subjected to entropy coding, to obtain a bitstream 2.

The decoder decodes the bitstream 1 and the bitstream 2, to obtain a quantized residual value $\hat{r}$. The quantized residual value $\hat{r}$ is inversely quantized and added to the predicted value μ, to obtain a transformed reconstruction value $\hat{y}$ of the current picture. The transformed reconstruction value $\hat{y}$ is processed by using a composite transformation network, to obtain a reconstructed picture $\hat{x}$ of the current picture.

Figure 2B:
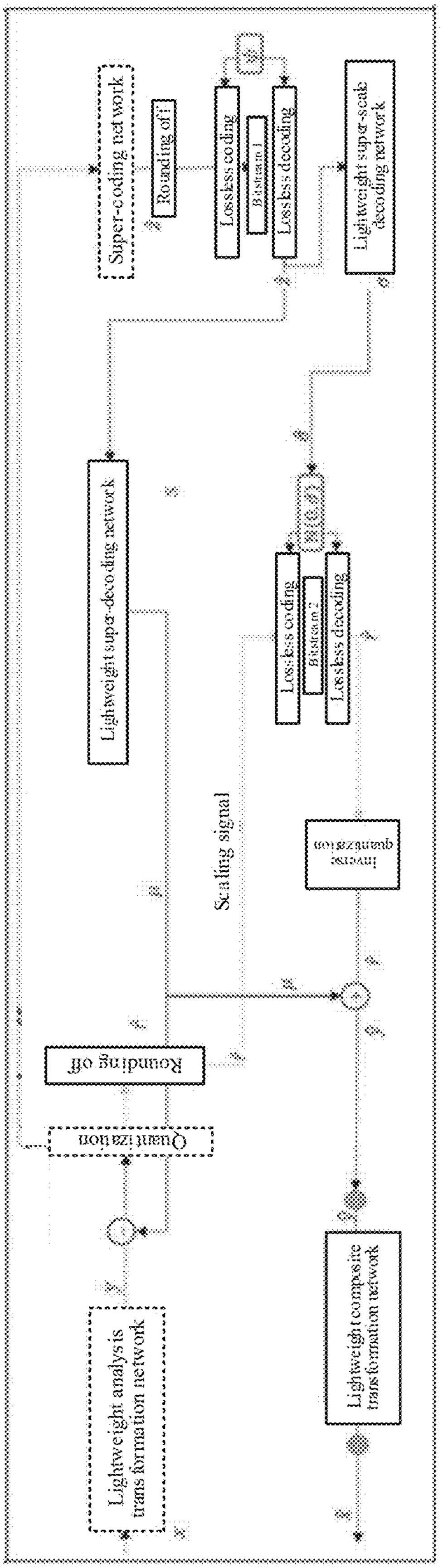
FIG. 2B is a schematic diagram of a lightweight end-to-end picture coding and decoding model.

FIG. 2B is a schematic diagram of a lightweight end-to-end picture coding and decoding model. As shown in FIG. 2B, the model bypasses the context model network and the prediction fusion network. In the absence of the context model network and the prediction fusion network, an output of a lightweight super-decoding network is directly used as a predicted value. Specifically, a current picture x is processed by using a lightweight analysis transformation network, to obtain a transformed value y of the current picture x. A predicted value μ of the current picture is obtained by using the lightweight super-decoding network. The predicted value μ of the current picture is subtracted from the transformed value y of the current picture, to obtain a residual value r of the current picture, and the residual value r is quantized and rounded off, to obtain a quantized residual value $\hat{r}$. The quantized residual value $\hat{r}$ is subjected to entropy coding, to obtain a bitstream 2. In addition, after being quantized, the residual value r of the current picture is coded and rounded off by using a super-coding network, to obtain to-be-coded data $\hat{z}$. Then, the to-be-coded data $\hat{z}$ is subjected to loss coding, to obtain a bitstream 1.

The decoder decodes the bitstream 1 and the bitstream 2, to obtain a quantized residual value $\hat{r}$. The quantized residual value $\hat{r}$ is inversely quantized and added to the predicted value μ, to obtain a transformed reconstruction value $\hat{y}$ of the current picture. The transformed reconstruction value $\hat{y}$ is processed by using a composite transformation network, to obtain a reconstructed picture $\hat{x}$ of the current picture.

As shown in FIG. 2A and FIG. 2B, in a deep learning-based end-to-end picture compression solution, a luminance component ($x_Y$) and a chrominance component ($x_{UV}$) of an inputted picture are nonlinearly transformed by using the analysis transformation network, to obtain transformed results of the luminance component ($y_Y$) and the chrominance component ($y_{UV}$). Then, outputs $\mu_Y$ and $\mu_{UV}$ of the prediction fusion network are subtracted from the luminance component ($y_Y$) and the chrominance component ($y_{UV}$), to respectively obtain residuals $r_Y$ and $r_{UV}$ of the luminance component and the chrominance component, which are both of a floating point type. Then, $r_Y$ and $r_{UV}$ are quantized and converted into integers $\hat{r}_Y$ and $\hat{r}_{UV}$ for an operation to generate a bitstream. The decoder decodes the bitstream to obtain $\hat{r}_Y$ and $\hat{r}_{UV}$ for inverse quantization, and obtains transformed values $\hat{y}_Y$ and $\hat{y}_{UV}$ of the luminance component and the chrominance component based on the outputs $\mu_Y$ and $\mu_{UV}$ of the prediction fusion network. Then, the transformed values $\hat{y}_Y$ and $\hat{y}_{UV}$ of the luminance component and the chrominance component are used as inputs. Reconstructed pictures $\hat{x}_Y$ and $\hat{x}_{UV}$ of the luminance component and the chrominance component are obtained by using the composite transformation network.

Figure 3B:
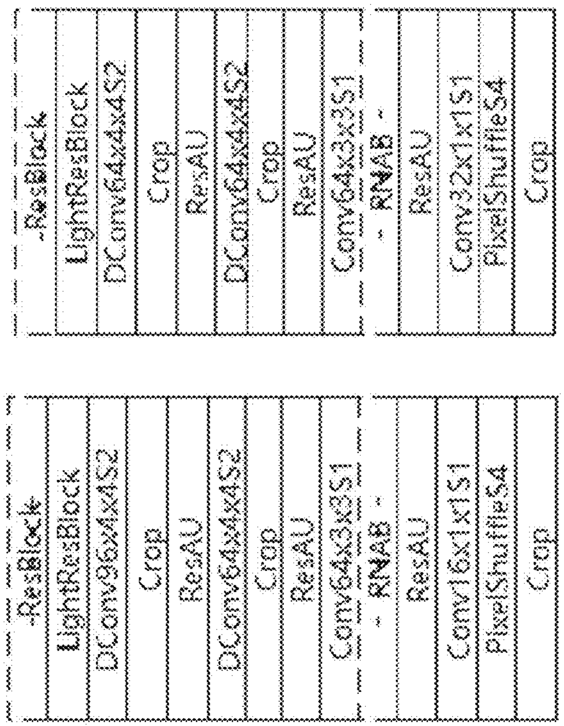
FIG. 3B is a schematic diagram of a composite transformation network with low complexity.
Figure 3A:
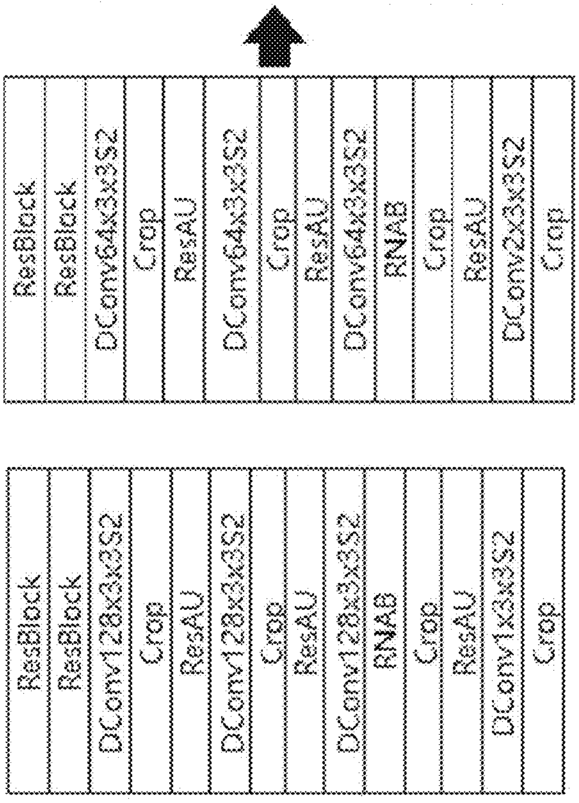
FIG. 3A is a schematic diagram of a composite transformation network with high complexity.

Current composite transformation networks include the following two types. The first type is a composite transformation network with high complexity, as shown in FIG. 3A. The second type is a composite transformation network with low complexity, as shown in FIG. 3B. Specifically, the composite transformation network with high complexity uses a residual non-local attention block (RNAB), which brings high complexity while improving performance. In comparison, a structure of the composite transformation network with low complexity does not use any attention module, resulting in a large performance loss while reducing complexity.

As can be known, the current composite transformation network has a problem of incompatibility between a computation complexity and a picture processing effect. For example, although the composite transformation network with high complexity shown in FIG. 3A may bring a good picture processing effect, the computation complexity is high, leading to low picture coding and decoding efficiency. Although the composite transformation network with low complexity shown in FIG. 3B has a simple structure and low computation complexity, leading to high picture coding and decoding efficiency, the attention module is discarded, leading to a non-ideal picture processing effect.

To resolve the foregoing technical problem, an embodiment of this application provides a new composite transformation network. The composite transformation network includes a lightweight attention module. A computation complexity of the lightweight attention module is less than a preset value. In this way, an effect of processing the transformed value of the current picture by using the composite transformation network to obtain the reconstructed picture of the current picture is good, and the computation complexity is low, thereby effectively controlling picture coding and decoding complexities and improving picture coding and decoding performances while improving a picture processing effect.

The technical solution of this embodiment of this application is described in detail in the following with reference to some embodiments. The following embodiments may be mutually combined, and same or similar concepts or processes may not be repeatedly described in some embodiments.

A picture decoding method provided in an embodiment of this application, which is applied to, for example, a decoder, is described first.

Figure 4:
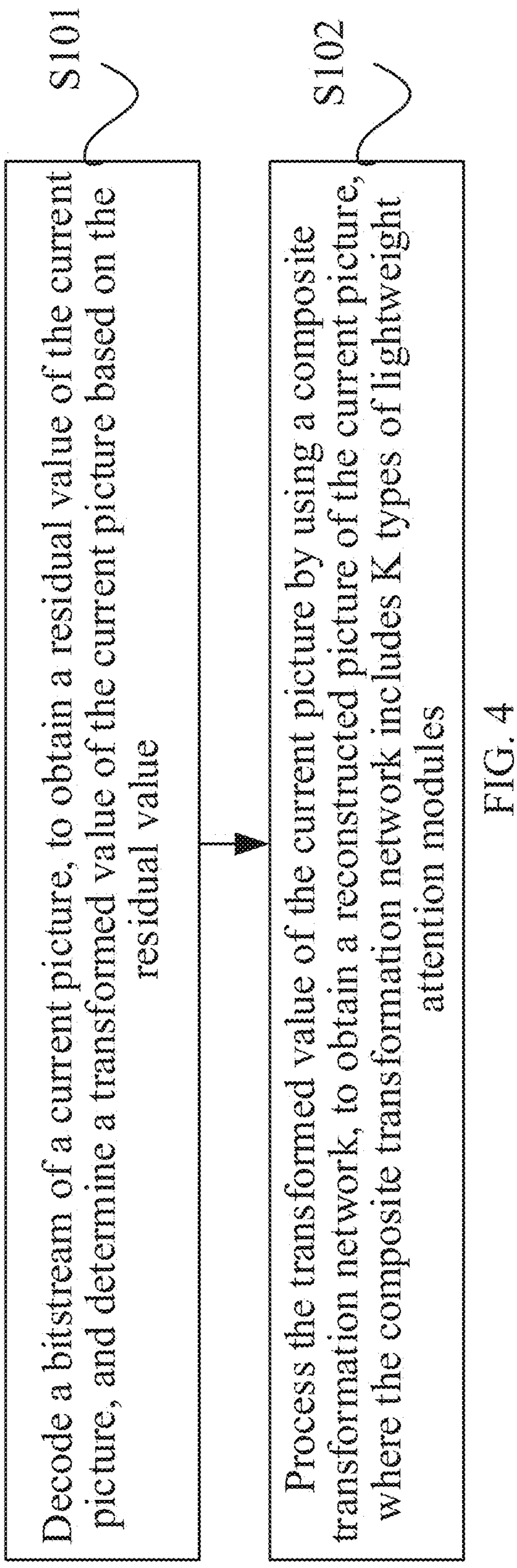
FIG. 4 is a schematic flowchart of a picture decoding method according to an embodiment of this application.

FIG. 4 is a schematic flowchart of a picture decoding method according to an embodiment of this application. This embodiment of this application is applied to the decoder shown in FIG. 1. As shown in FIG. 4, the method according to this embodiment of this application includes the following operations.

S101: Decode a bitstream of a current picture, to obtain a residual value of the current picture, and determine a transformed value of the current picture based on the residual value.

As shown in FIG. 2A and FIG. 2B, the decoder decodes the bitstream, to obtain a quantized residual value $\hat{r}$ of the current picture, and inversely quantizes the quantized residual value $\hat{r}$, to obtain a residual value r of the current picture. Then, a predicted value μ of the current picture is determined. For example, the predicted value μ of the current picture is determined by using a prediction fusion network. Further, the predicted value μ of the current picture is added to the residual value r, to obtain a transformed value $\hat{y}$ of the current picture.

In some embodiments, the transformed value $\hat{y}$ of the decoder is also referred to as a transformed reconstructed value, a reconstructed value of a transformed value, or the like.

S102: Process the transformed value of the current picture by using a composite transformation network, to obtain a reconstructed picture of the current picture, where the composite transformation network includes K types of lightweight attention modules.

Exemplarily, computation complexities of the K types of lightweight attention modules are all less than a preset value.

In this embodiment of this application, lightweight attention modules having different network structures may be referred to as different types of lightweight attention modules. To be specific, in this embodiment of this application, a lightweight attention module of one network structure is referred to as one type of lightweight attention module. Further, K types of lightweight attention modules correspond to lightweight attention modules of K network structures.

A current composite transformation network has a problem of incompatibility between a computation complexity and a picture processing effect. To resolve the technical problem, an embodiment of this application provides a new composite transformation network. The composite transformation network includes K types of lightweight attention modules, and computation complexities of the K types of lightweight attention modules are less than a preset value. In this way, an effect of processing a transformed value of a current picture by using the composite transformation network to obtain a reconstructed picture of the current picture is good, and the computation complexity is low, thereby effectively controlling picture coding and decoding complexities and improving picture coding and decoding performances while improving a picture processing effect.

The quantity of types of lightweight attention modules included in the composite transformation network is not limited in this embodiment of this application, and is specifically determined according to an actual requirement. For example, the composite transformation network includes one type of lightweight attention module, or the composite transformation network includes a plurality of different types of lightweight attention modules.

In some embodiments, the composite transformation network may include one or more lightweight attention modules of a same type. For example, the composite transformation network includes two types of lightweight attention modules, and includes two lightweight attention modules of a first type, and one lightweight attention module of a second type.

The computation complexity of the current picture by the K types of lightweight attention modules provided in this embodiment of this application is less than the predicted value. To be specific, the computation complexity of the current picture by the K types of lightweight attention modules provided in this embodiment of this application is less than the computation complexity of the current picture by the RNAB shown in FIG. 3A.

In some embodiments, the composite transformation network in this embodiment of this application includes only the K types of lightweight attention modules, and does not include the RNAB shown in FIG. 3A.

In some embodiments, the composite transformation network in this embodiment of this application includes the K types of lightweight attention modules, and includes at least one RNAB shown in FIG. 3A.

A specific indicator measuring the computation complexity of the lightweight attention module for the current picture is not limited in this embodiment of this application.

In an example, the computation complexity of the lightweight attention module for the current picture may be measured by using floating point operations (FLOPs). For example, smaller values of the FLOPs indicate a smaller computation complexity, and larger values of the FLOPs indicate a larger computation complexity.

In another example, kmac/pixel=FLOPs/(1000*w*h) may be used for representing the computation complexity, where h and w represent a height and a width of a decoded picture.

In some embodiments, the decoder may measure the computation complexity of the lightweight attention module for the current picture based on an overall computation complexity of decoding the current picture by the decoder.

In some embodiments, the preset value is a preset fixed value, and does not change with a change of a to-be-processed picture.

In some embodiments, the preset value is a preset value corresponding to a current picture. To be specific, different pictures may correspond to different preset values. In this way, in this embodiment of this application, if the computation complexity of an attention module for a current picture is less than a predicted value corresponding to the current picture, it may be considered that the attention module is one type of lightweight attention module.

In some embodiments, the at least one RNAB in the composite transformation network shown in FIG. 3A may be replaced with the K types of lightweight attention modules provided in this embodiment of this application, to reduce the computation complexity of the composite transformation network.

In some embodiments, at least K types of lightweight attention modules provided in this embodiment of this application may be added to the composite transformation network shown in FIG. 3B, to improve a picture processing capability of the composite transformation network.

In some embodiments, the composite transformation network in this embodiment of this application includes only the K types of lightweight attention modules. The decoder processes the transformed value of the current picture by using the K types of lightweight attention modules, to obtain the reconstructed picture of the current picture.

In some embodiments, the composite transformation network in this embodiment of this application further includes N convolution layers. M convolution layers of the N convolution layers are separately followed by at least one lightweight attention module of the K types of lightweight attention modules.

In an example, M=N. To be specific, each convolution layer of the N convolution layers is followed by at least one lightweight attention module of the K types of lightweight attention modules, and types of lightweight attention modules following different convolution layers may be the same or may be different.

Figure 5A:
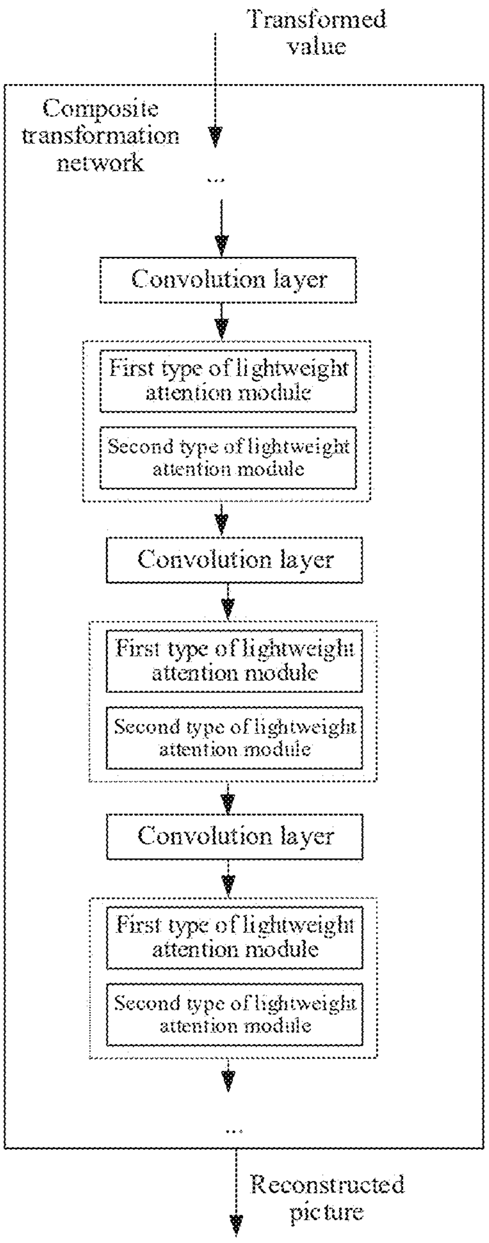
FIG. 5A to FIG. 5C are schematic diagrams of a composite transformation network according to this application.

For example, as shown in FIG. 5A, M=N=3. Types of lightweight attention modules following each convolution layer of the three convolution layers are the same. To be specific, the three convolution layers are all followed by two types of lightweight attention modules. For example, a first type of lightweight attention module and a second type of lightweight attention module are connected. The quantities of the first type of lightweight attention modules connected to each convolution layer of the three convolution layers may be the same or may be different, and the quantities of the second type of lightweight attention modules connected to each convolution layer of the three convolution layers may be the same or may be different.

Figure 5B:
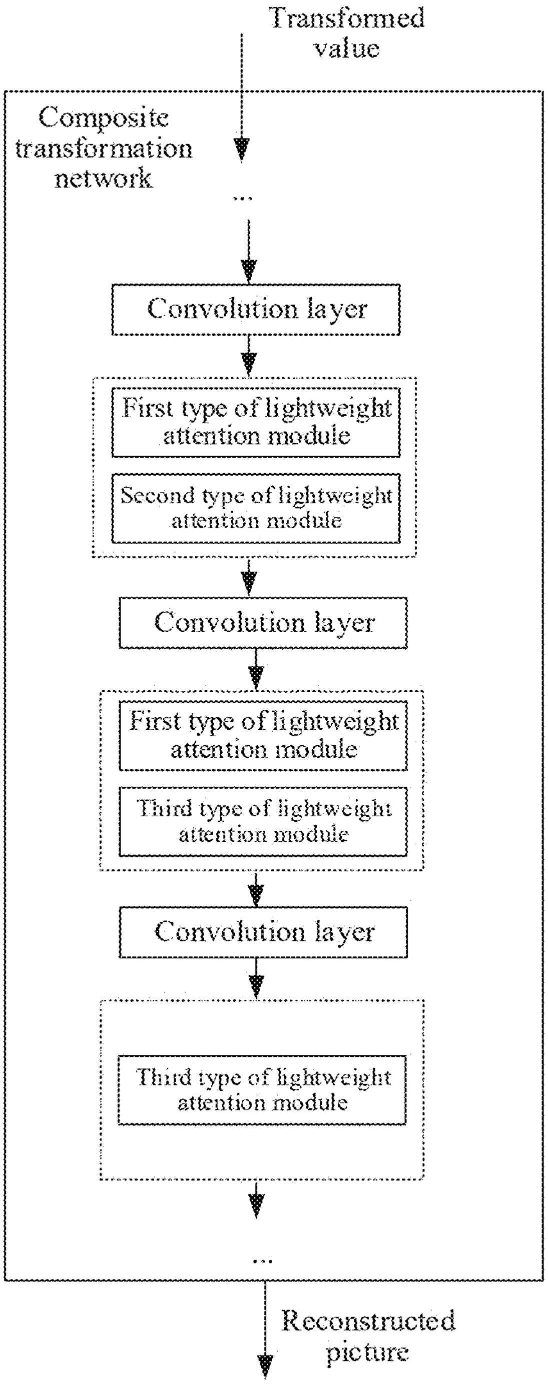

For another example, types of lightweight attention modules following each of the N convolution layers are different, or types of lightweight attention modules following at least two convolution layers of the N convolution layers are different. For example, as shown in FIG. 5B, M=N=3. A first convolution layer of the three convolution layers is followed by a first type of lightweight attention module and a second type of lightweight attention module. A second convolution layer is followed by a first type of lightweight attention module and a third type of lightweight attention module. A third convolution layer is followed by a third type of lightweight attention module.

In an example, M is less than N. To be specific, M convolution layers of the N convolution layers are separately followed by at least one lightweight attention module of the K types of lightweight attention modules, and types of lightweight attention modules following different convolution layers of the M convolution layers may be the same or may be different.

Figure 5C:
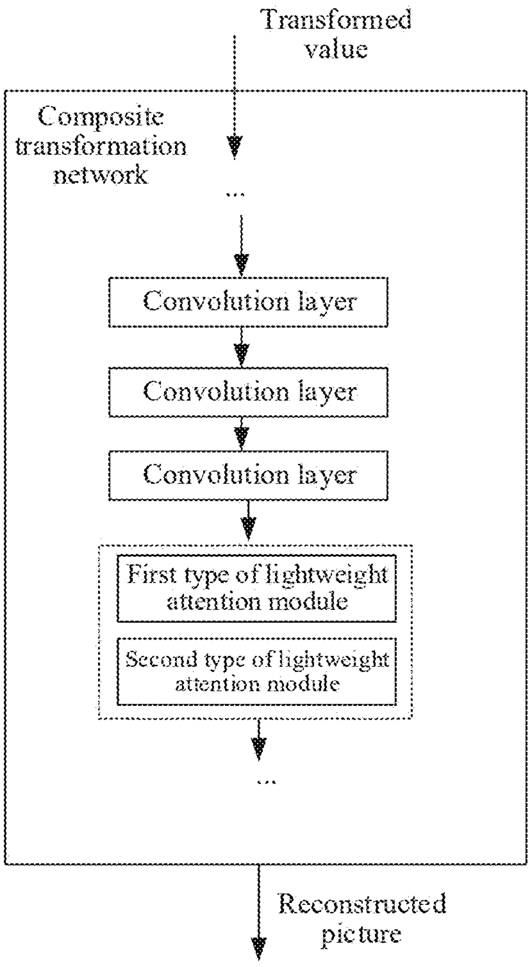

For example, as shown in FIG. 5C, N=3, and M=1. The third convolution layer of the three convolution layers is followed by two types of lightweight attention modules. For example, a first type of lightweight attention module and a second type of lightweight attention module are connected.

To be specific, in this embodiment of this application, each convolution layer of the N convolution layers of the composite transformation network may be followed by at least one type of lightweight attention module of the K types of lightweight attention modules, and types of lightweight attention modules following each convolution layer of the N convolution layers may be the same or may be different. Alternatively, a part of convolution layers of the N convolution layers of the composite transformation network may be followed by at least one type of lightweight attention module of the K types of lightweight attention modules, and types of lightweight attention modules following each convolution layer of the part of convolution layers may be the same or may be different.

In this embodiment of this application, data processing principles of the lightweight attention modules connected to each convolution layer of the M convolution layers of the composite transformation network are basically the same. For ease of description, at least one type of lightweight attention module following the $i^{th}$ convolution layer of the M convolution layers is used as an example for description. At this moment, S102 includes the following operations.

S102-A: The decoder processes, for an $i^{th}$ convolution layer of the M convolution layers. $(i-1)^{th}$ feature information of the current picture by using the $i^{th}$ convolution layer, to obtain it feature information of the current picture, where the $(i-1)^{th}$ feature information is obtained based on the transformed value of the current picture, N is a positive integer, M is a positive integer less than or equal to N, and i is a positive integer less than or equal to M.

S102-B: The decoder processes the $i^{th}$ feature information by using P types of lightweight attention modules connected to the $i^{th}$ convolution layer, to obtain $(i+1)^{th}$ feature information of the current picture.

S102-C. The decoder determines the reconstructed picture based on the $(i+1)^{th}$ feature information.

The $i^{th}$ convolution layer is any convolution layer of the M convolution layers. The $i^{th}$ convolution layer is followed by P types of lightweight attention modules. The P types of lightweight attention modules are all or a part of the K types of lightweight attention modules. For example, if P is less than K, it indicates that the $i^{th}$ convolution layer is connected to any P types of lightweight attention modules in the K types of lightweight attention modules. For another example, if P=K, it indicates that the $i^{th}$ convolution layer is connected to the K types of lightweight attention modules. P is a positive integer. To be specific, the $i^{th}$ convolution layer may be connected to one type of lightweight attention module of the K types of lightweight attention modules, or be connected to two or more types of lightweight attention modules in the K types of lightweight attention modules.

A specific quantity of lightweight attention modules included in each of the P types is not limited in this embodiment of this application. For example, each of the P types may include one or more lightweight attention modules, and different types may include the same or different quantities of lightweight attention modules.

The $(i-1)^{th}$ feature information is obtained based on the transformed value of the current picture. For example, if the $i^{th}$ convolution layer is a first data processing layer in the composite transformation network, the $(i-1)^{th}$ feature information is the transformed value of the current picture. For another example, if the $i^{th}$ convolution layer is not the first data processing layer in the composite transformation network, the $(i-1)^{th}$ feature information is feature information obtained after another data processing layer before the $i^{th}$ convolution layer in the composite transformation network processes the transformed value of the current picture. To be specific, the $(i-1)^{th}$ feature information may be understood as input information of the $i^{th}$ convolution layer.

Figure 6:
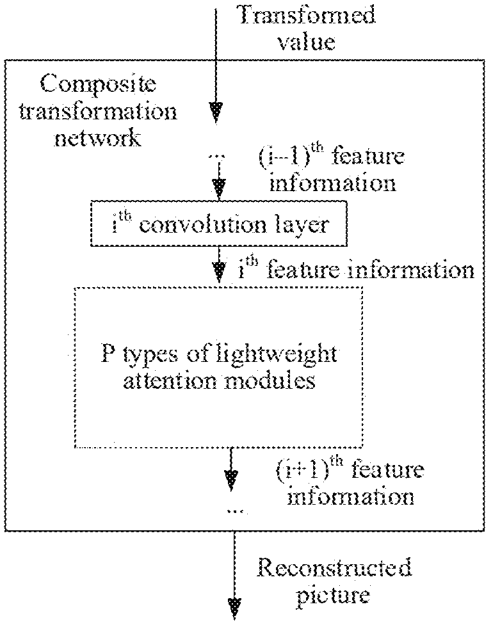
FIG. 6 is a schematic diagram of a data processing procedure of a composite transformation network according to an embodiment of this application.

As shown in FIG. 6, the decoder inputs the $(i-1)^{th}$ feature information of the current picture to the $i^{th}$ convolution layer to perform convolution processing, to obtain the $i^{th}$ feature information of the current picture. Then, the $i^{th}$ feature information is inputted to P types of lightweight attention modules connected to the $i^{th}$ convolution layer for attention computation, and a computation result is recorded as $(i+1)^{th}$ feature information of the current picture. Finally, the reconstructed picture of the current picture is determined according to the $(i+1)^{th}$ feature information. For example, as shown in FIG. 3A and FIG. 3B, processing such as convolution or cropping is performed on the $(i+1)^{th}$ feature information, to obtain the reconstructed picture of the current picture.

A specific connection mode (or fusion mode) of the P types of lightweight attention modules is not limited in this embodiment of this application.

In some embodiments, the P types of lightweight attention modules are connected in series or in parallel.

In some embodiments, the P types of lightweight attention modules are divided into Q attention units. Each attention unit includes at least one type of lightweight attention module of the P types of lightweight attention modules.

A specific division mode of dividing the P types of lightweight attention modules into the Q attention units includes, but is not limited to, the following examples.

Example 1: Lightweight attention modules included in a same attention unit of the Q attention units are of a same type (to be specific, one type of lightweight attention module is included), and lightweight attention modules included in different attention units are of different types.

For example, the decoder may divide a same type of lightweight attention modules of the P types of lightweight attention modules into a same attention unit, to obtain P attention units. At this moment, Q=P.

For example, it is assumed that the P types of lightweight attention modules include a first type of lightweight attention module and a second type of lightweight attention module. The Q attention units include two attention units. In this way, the decoder may divide the first type of lightweight attention module into an attention unit, and divide the second type of lightweight attention module into another attention unit. At this moment, types of lightweight attention modules included in the two attention units are different.

Example 2: At least one attention unit of the Q attention units includes two or more types of lightweight attention modules.

In a possible implementation of Example 2, each attention unit of the Q attention units includes two or more types of lightweight attention modules. At this moment, types of lightweight attention modules included in each attention unit of the Q attention units may be the same, or may be different. For example, Q=2. Lightweight attention modules included in the two attention modules are of a same type. For example, the first type of lightweight attention module and the second type of lightweight attention module are included. For another example, Q=2. Types of lightweight attention modules included in the two attention units are not completely the same. For example, a first attention unit includes a first type of lightweight attention module and a second type of lightweight attention module, and a second attention unit includes a third type of lightweight attention module and a second type of lightweight attention module.

In another possible implementation of Example 2, a part of attention units of the Q attention units include two or more types of lightweight attention modules, and a part of attention units include one type of lightweight attention module. For example, Q=3. Two attention units in the three attention modules include two or more types of lightweight attention modules. The other attention unit includes one type of lightweight attention module.

To be specific, in Example 2, a part or all of the Q attention units include two or more types of lightweight attention modules.

Based on the foregoing description, at this moment, in S102-B, the processing the $i^{th}$ feature information by using P types of lightweight attention modules connected to the $i^{th}$ convolution layer, to obtain $(i+1)^{th}$ feature information of the current picture includes: processing, by the decoder, the $i^{th}$ feature information by using the Q attention units, to obtain the $(i+1)^{th}$ feature information, where Q is a positive integer less than or equal to P.

In this embodiment, the decoder may divide P types of lightweight attention modules connected to the $i^{th}$ convolution layer into Q attention units. Each attention unit includes at least one type of lightweight attention module of the P types. In this way, the decoder may process the $i^{th}$ feature information by using the Q attention units, to obtain the $(i+1)^{th}$ feature information.

A specific connection mode of the Q attention units is not limited in this embodiment of this application.

In some embodiments, the Q attention units are connected in series. At this moment, the decoder may process the $i^{th}$ feature information by using the Q attention units connected in series, to obtain the $(i+1)^{th}$ feature information.

Figure 7A:
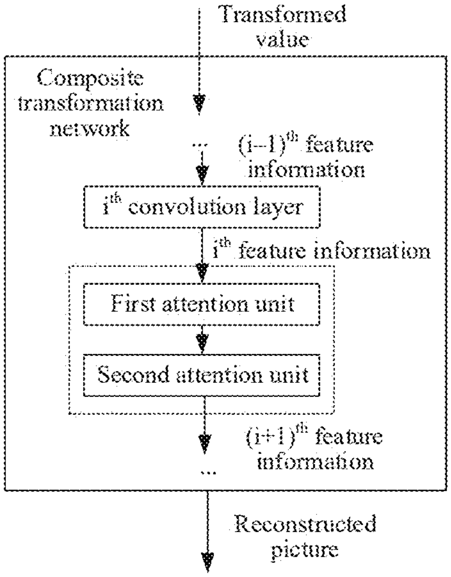
FIG. 7A to FIG. 7H are schematic diagrams of connection modes of different types of lightweight attention modules.

As shown in FIG. 7A, Q=2. The two attention units are connected in series. After inputting the $i^{th}$ feature information to the first attention unit for processing, to obtain processed feature information 1, the decoder further inputs the feature information 1 to the second attention unit for processing, and outputs the $(i+1)^{th}$ feature information.

In an example, a same attention unit of the foregoing two attention units shown in FIG. 7A includes one type of lightweight attention module. As shown in FIG. 7B, it is assumed that the composite transformation network includes four convolution layers, and the $i^{th}$ convolution layer is a third convolution layer of the composite transformation network. The first attention unit includes a first type of lightweight attention module, which is recorded as a lightweight attention module A, and the second attention unit includes a second type of lightweight attention module, which is recorded as a lightweight attention module B. At this moment, the lightweight attention module A and the lightweight attention module B following the $i^{th}$ convolution layer (i.e. the third convolution layer) are connected in series. FIG. 7B shows, as an example, that the first type of lightweight attention module is located in front of the second type of lightweight attention module. An alternative second type of lightweight attention module may be located in front of the first type of lightweight attention module. In FIG. 7B, $\hat{y}$ is a transformed value (or a transformed reconstructed value) of the current picture, and $\hat{x}$ is a reconstructed picture of the current picture.

In some examples, a lightweight attention module following another convolution layer of the M convolution layers of the composite transformation network may be consistent with a lightweight attention module following the $i^{th}$ convolution layer. For example, a part or all of the convolution layers of the composite transformation network are all followed by the lightweight attention module A and the lightweight attention module B which are connected in series as shown in FIG. 7B.

In some embodiments, the Q attention units are connected in series, and inputs and outputs of the Q attention units are in skip connection. To be specific, the Q attention units are in skip connection with the $i^{th}$ feature information after being connected in series. At this moment, the decoder may process the $i^{th}$ feature information by using the Q attention units connected in series, to obtain feature information a outputted by the last attention unit, and then fuse the feature information a with the $i^{th}$ feature information, to obtain the $(i+1)^{th}$ feature information.

A specific fusion mode of the feature information is not limited in this embodiment of this application.

For example, the decoder adds feature information a to feature information b, to obtain fused feature information.

For another example, the decoder adds the feature information a to the feature information b, to obtain the fused feature information.

For another example, the decoder multiplies the feature information a by the feature information b, and then adds to the feature information a (or the feature information b), to obtain the fused feature information.

For another example, the decoder adds the feature information a to the feature information b, and then multiplies by the feature information a (or the feature information b), to obtain the fused feature information.

Figure 7C:
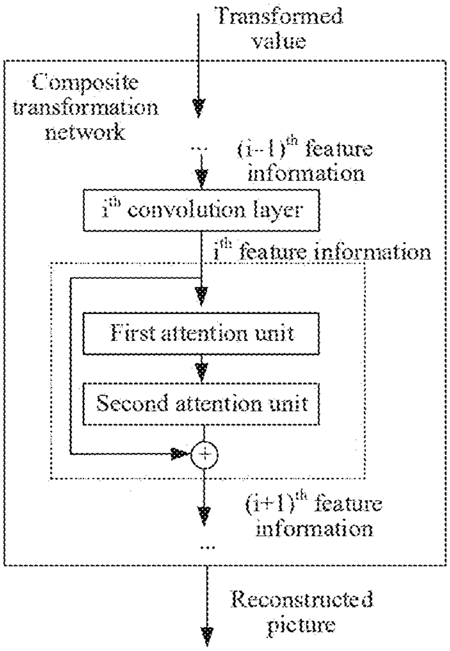
Figure 7B:

As shown in FIG. 7C, Q=2. The two attention units are connected in series and then in skip connection with the $i^{th}$ feature information. In this way, the decoder may input the $i^{th}$ feature information to the first attention unit for processing, to obtain processed feature information 1, and input the feature information 1 to the second attention unit for processing, to obtain processed feature information 2. Then, the feature information 2 outputted by the second attention unit is fused with the $i^{th}$ feature information, to obtain the $(i+1)^{th}$ feature information.

Figure 7D:
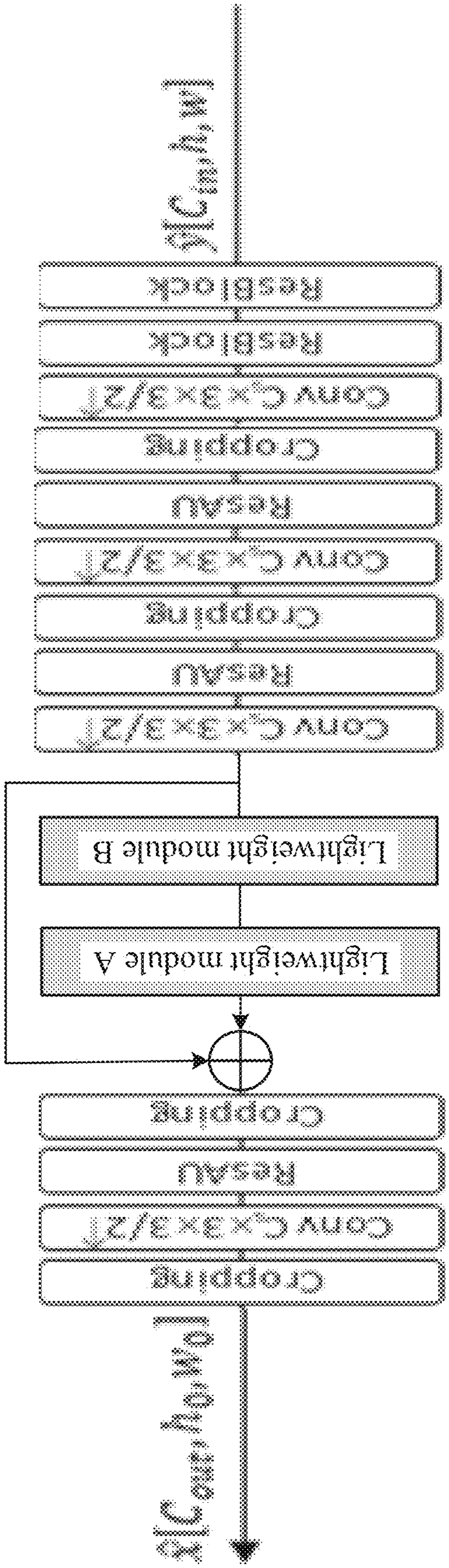

In an example, a same attention unit of the foregoing two attention units shown in FIG. 7C includes one type of lightweight attention module. As shown in FIG. 7D, it is assumed that the composite transformation network includes four convolution layers, and the $i^{th}$ convolution layer is a third convolution layer of the composite transformation network. The first attention unit includes a first type of lightweight attention module, which is recorded as a lightweight attention module A, and the second attention unit includes a second type of lightweight attention module, which is recorded as a lightweight attention module B. At this moment, the lightweight attention module A and the lightweight attention module B following the $i^{th}$ convolution layer (i.e. the third convolution layer) are in skip connection. FIG. 7D shows, as an example, that the first type of lightweight attention module is located in front of the second type of lightweight attention module. An alternative second type of lightweight attention module may be located in front of the first type of lightweight attention module.

In some examples, a lightweight attention module following another convolution layer of the M convolution layers of the composite transformation network may be consistent with a lightweight attention module following the $i^{th}$ convolution layer by the decoder. For example, a part or all of the convolution layers of the composite transformation network are all followed by the lightweight attention module A and the lightweight attention module B which are in skip connection as shown in FIG. 7D.

In some embodiments, the Q attention units are connected in parallel. At this moment, the decoder may divide the $i^{th}$ feature information into Q pieces of first sub-feature information. The decoder processes, for a $j^{th}$ attention unit of the Q attention units, $j^{th}$ first sub-feature information in the Q pieces of sub-feature information by using the $j^{th}$ attention unit, to obtain $j^{th}$ second sub-feature information, where j is a positive integer less than or equal to Q. The decoder fuses the second sub-feature information separately outputted by the Q attention units, to obtain the $(i+1)^{th}$ feature information.

Figure 7E:
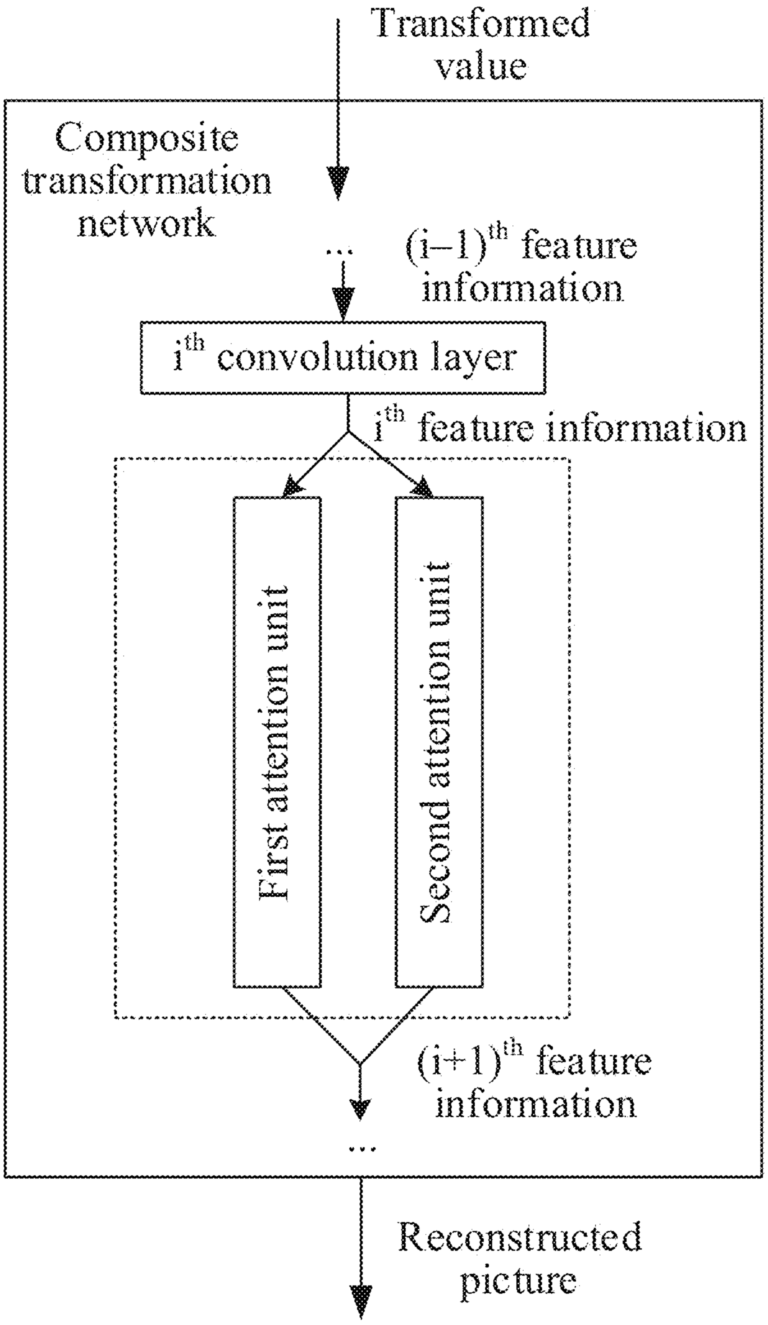

As shown in FIG. 7E, Q=2. The two attention units are connected in parallel. In this way, the decoder first divides the $i^{th}$ feature information into two pieces, to obtain two pieces of first sub-feature information. Then, the decoder separately inputs the two pieces of first sub-feature information to corresponding attention units. For example, the decoder inputs the first piece of first sub-feature information to the first attention unit, to obtain feature information outputted by the first attention unit, and records the feature information as a first piece of second sub-feature information. Meanwhile, the decoder inputs the second piece of first sub-feature information to the second attention unit, to obtain feature information outputted by the second attention unit, and records the feature information as a second piece of second sub-feature information. Then, the decoder fuses the first piece of second sub-feature information and the second piece of second sub-feature information, to obtain the $(i+)^{th}$ feature information.

A division mode of the $i^{th}$ feature information into Q pieces of first sub-feature information is not limited in this embodiment of this application.

For example, the decoder divides, based on a scale of the $i^{th}$ feature information, the $i^{th}$ feature information into Q pieces of first sub-feature information. Correspondingly, the decoder performs scale concatenation on Q pieces of second sub-feature information, to obtain the $(i+1)^{th}$ feature information.

For another example, the decoder divides the $i^{th}$ feature information into the Q pieces of first sub-feature information according to a quantity of channels of the $i^{th}$ feature information. To be specific, the decoder divides the quantity of channels of the $i^{th}$ feature information into Q pieces, to obtain the Q pieces of first sub-feature information. Correspondingly, the decoder concatenates, according to the quantity of channels, the second sub-feature information separately outputted by the Q attention units, to obtain the $(i+1)^{th}$ feature information. To be specific, the Q pieces of second sub-feature information are concatenated on the channels, to obtain the $(i+1)^{th}$ feature information.

Figure 7F:
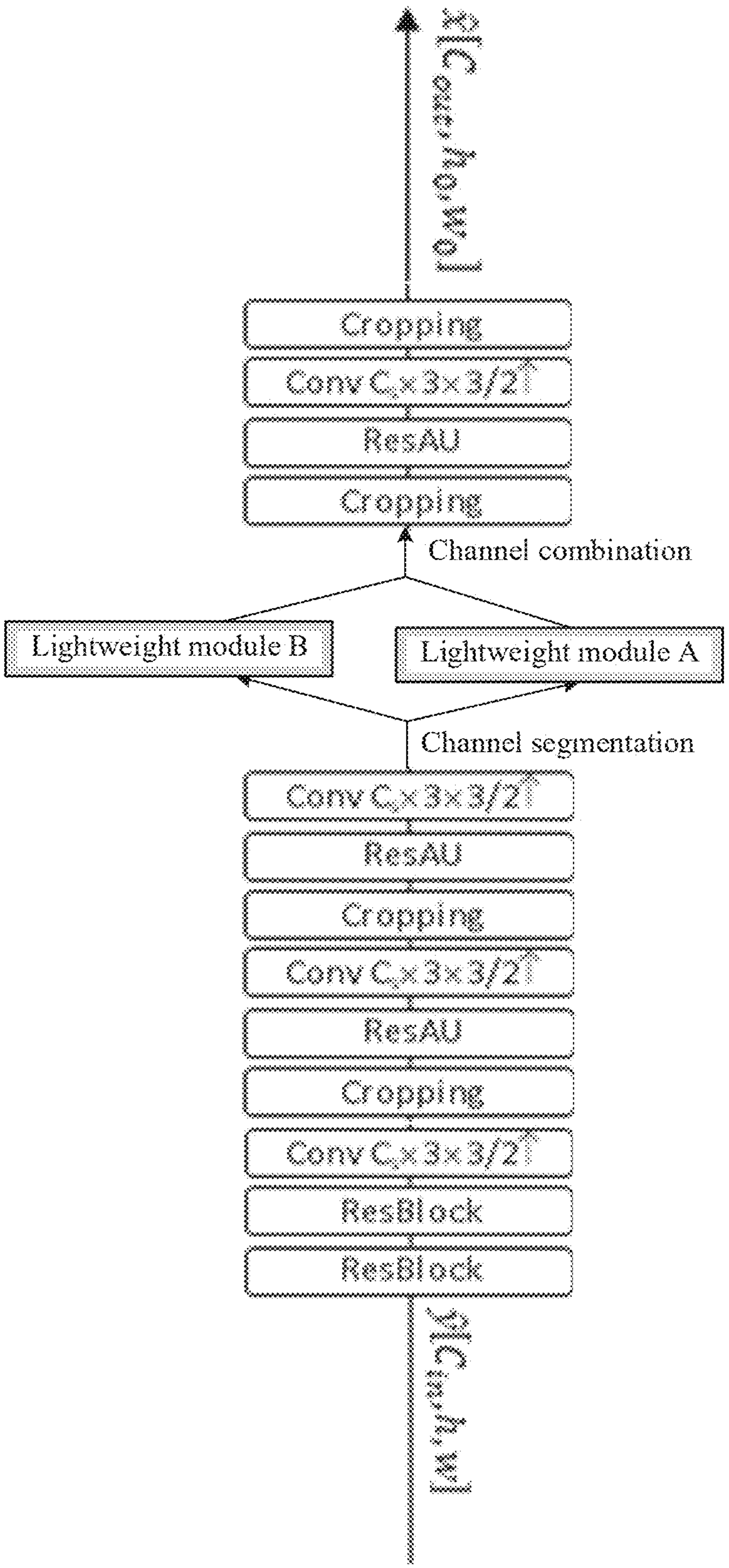

In an example, a same attention unit of the foregoing two attention units shown in FIG. 7E includes one type of lightweight attention module. As shown in FIG. 7F, it is assumed that the composite transformation network includes four convolution layers, and the $i^{th}$ convolution layer is a third convolution layer of the composite transformation network. The first attention unit includes a first type of lightweight attention module, which is recorded as a lightweight attention module A, and the second attention unit includes a second type of lightweight attention module, which is recorded as a lightweight attention module B. At this moment, the lightweight attention module A and the lightweight attention module B following the $i^{th}$ convolution layer (i.e. the third convolution layer) are connected in parallel. FIG. 7F shows, as an example, that the first type of lightweight attention module is located above the second type of lightweight attention module. An alternative second type of lightweight attention module may be located above the first type of lightweight attention module.

In some examples, a lightweight attention module following another convolution layer of the M convolution layers of the composite transformation network may be consistent with a lightweight attention module following the $i^{th}$ convolution layer. For example, a part or all of the convolution layers of the composite transformation network are all followed by the lightweight attention module A and the lightweight attention module B which are connected in parallel as shown in FIG. 7F.

In some examples, for each Q attention unit of the Q attention units, if the attention unit includes a plurality of lightweight attention modules, the plurality of lightweight attention modules may be connected in series, or may be connected in parallel, or may be connected in another mode. This is not limited in this embodiment of this application.

Figure 7G:
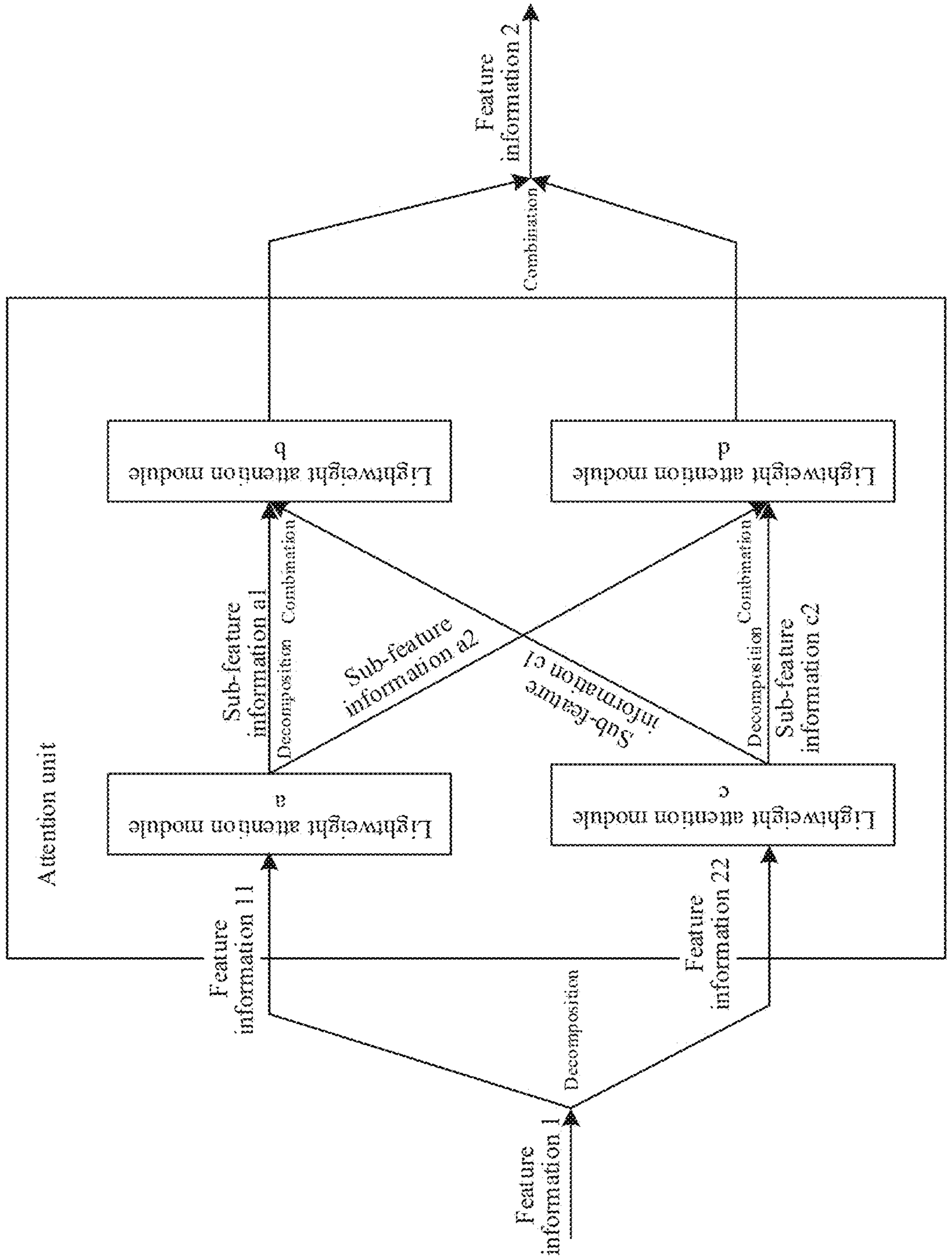

In some embodiments, for any attention unit of the Q attention units, if the attention unit includes a plurality of lightweight attention modules, and the plurality of lightweight attention modules are connected in a hybrid mode, namely, are connected in parallel and connected in series as shown in FIG. 7G, a part of lightweight attention modules may divide outputted feature information (for example, perform channel division), and input the divided feature information to two or more lightweight attention modules. As shown in FIG. 7G, an attention unit includes a lightweight attention module a, a lightweight attention module b, a lightweight attention module c, and a lightweight attention module d. The lightweight attention module a and the lightweight attention module b are connected in series. The lightweight attention module c and the lightweight attention module d are connected in series. The lightweight attention module a and the lightweight attention module c are connected in parallel. First, the decoder divides the feature information 1 inputted to the attention unit into two pieces: feature information 11 and feature information 22, inputs the feature information 11 to the lightweight attention module a, and inputs the feature information 22 to the lightweight attention module c. The lightweight attention module a may divide the outputted feature information into two pieces, for example, divide the outputted feature information into two pieces according to the quantity of channels, and record the two pieces as sub-feature information a1 and sub-feature information a2. The sub-feature information a1 is inputted to the lightweight attention module b, and the sub-feature information a2 is inputted to the lightweight attention module d. In some embodiments, the lightweight attention module c may divide the outputted sub-feature information into two pieces, for example, divide the outputted sub-feature information into two pieces according to the quantity of channels, and record the two pieces as sub-feature information c1 and sub-feature information c2. The sub-feature information c1 is inputted to the lightweight attention module b, and the sub-feature information c2 is inputted to the lightweight attention module d. In an example, the decoder may concatenate the sub-feature information a1 and the sub-feature information c1 and input the concatenated information to the lightweight attention module b, and may concatenate the sub-feature information a2 and the sub-feature information c2 and input the concatenated information to the lightweight attention module d. The lightweight attention module a, the lightweight attention module b, the lightweight attention module c, and the lightweight attention module d may be lightweight attention modules of a same type, or may be lightweight attention modules of different types, or may be lightweight attention modules partially of a same type and partially of different types. This is not limited in this embodiment of this application.

The foregoing describes a specific connection mode of the P types of lightweight attention modules following the $i^{th}$ convolution layer of the M convolution layers in the composite transformation network. For example, the P types of lightweight attention modules may be connected in series, may be connected in parallel, may be in skip connection, and certainly may further be connected in another mode. This is not limited in the embodiment of this application.

In some embodiments, a connection mode of a lightweight attention module following another convolution layer of the M convolution layers is the same as a connection mode of a lightweight attention module following the $i^{th}$ convolution layer.

In some embodiments, a connection mode of a lightweight attention module following another convolution layer of the M convolution layers is not completely the same as a connection mode of a lightweight attention module following the $i^{th}$ convolution layer. For example, various types of lightweight attention modules following the first convolution layer of the M convolution layers are connected in series, various types of lightweight attention modules following the second convolution layer are in skip connection, and various types of lightweight attention modules following the third convolution layer are connected in parallel.

In some embodiments, in at least two convolution layers of the M convolution layers, lightweight attention modules following a same convolution layer are of a same type, and lightweight attention modules following different convolution layers are of different types.

Figure 7H:
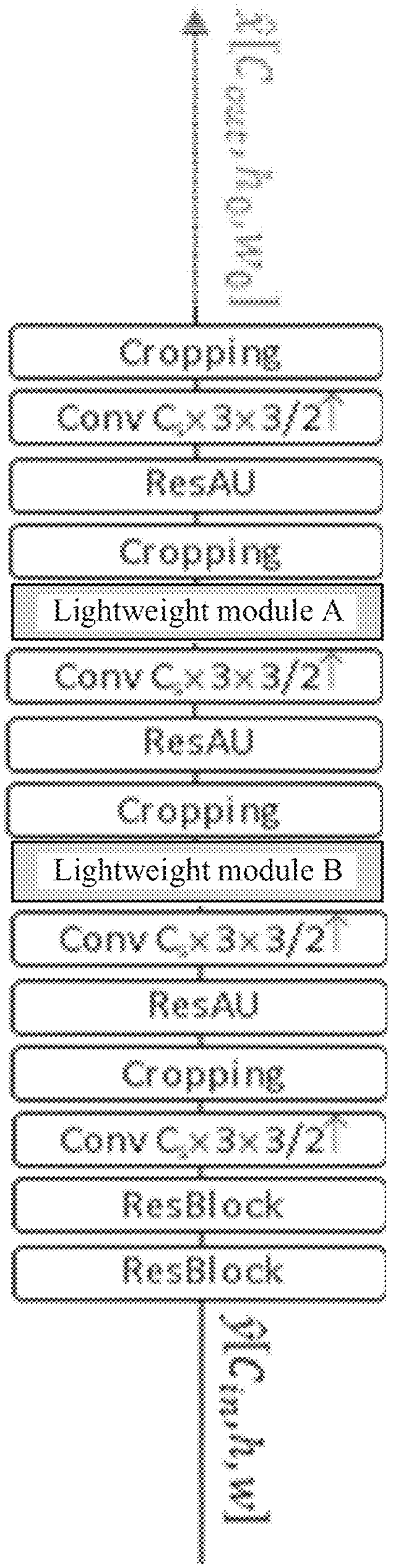

For example, as shown in FIG. 7H, it is assumed that the composite transformation network includes four convolution layers. A second convolution layer and a third convolution layer of the four convolution layers are followed by lightweight attention modules. For example, a first type of lightweight attention module following the second convolution layer is recorded as a lightweight attention module A, and a second type of lightweight attention module following the third convolution layer is marked as a lightweight attention module B.

In some embodiments, before processing the $i^{th}$ feature information by using P types of lightweight attention modules connected to the $i^{th}$ convolution layer, to obtain $(i+1)^{th}$ feature information of the current picture, the decoder may downsample the $i^{th}$ feature information, to obtain $i^{th}$ downsampled feature information, then process, by using the P types of lightweight attention modules, the $i^{th}$ downsampled feature information, to obtain $i^{th}$ attention-processed feature information, and finally upsample the $i^{th}$ attention-processed feature information, to obtain the $(i+1)^{th}$ feature information. To be specific, in this embodiment of this application, before performing attention computation on the $i^{th}$ feature information, the decoder first performs downsampling, to reduce a data volume for the attention computation. In this way, when attention computation is performed on the $i^{th}$ downsampled feature information by using the P types of lightweight attention modules, a processing speed of the attention computation can be improved, thereby improving the entire decoding efficiency. Finally, the $i^{th}$ attention-processed feature information is upsampled, to obtain the $(i+1)^{th}$ feature information.

Specific modes of downsampling and upsampling used by the decoder are not limited in this embodiment of this application, and may be determined according to an actual requirement.

In some embodiments, in the K types of lightweight attention modules included in the composite transformation network, at least one type of lightweight attention module includes an upsampling unit and a downsampling unit. To be specific, the lightweight attention module may first downsample inputted information, perform attention computation processing on the downsampled information, and then perform upsampling.

Different lightweight attention modules involved in this embodiment of this application are introduced below. The types of the lightweight attention modules in this embodiment of this application include, but are not limited to, those shown in the following examples, and may further include a lightweight attention module developed based on any of the foregoing types of lightweight attention modules, or another type of lightweight attention module easily conceived of by a person skilled in the art.

In some embodiments, the P types of lightweight attention modules include a first type of lightweight attention module. The first type of lightweight attention module includes a simplified residual non-local attention block. At this moment, S102-B includes the following operations.

S102-B-a1: The decoder processes first feature information by using a simplified residual local attention block, to obtain second feature information, where the first feature information is obtained based on $i^{th}$ feature information.

S102-B-a2: The decoder obtains $(i+1)^{th}$ feature information based on the second feature information.

Figure 8A:
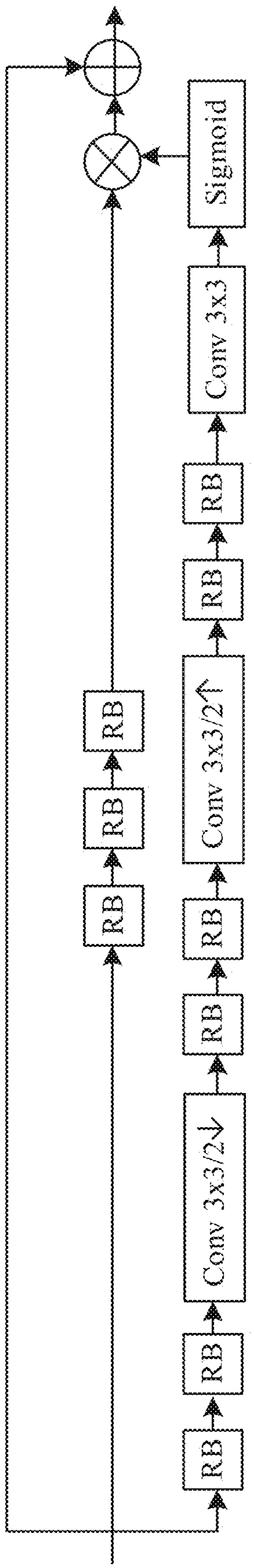
FIG. 8A is a schematic diagram of an RNAB.

As shown in FIG. 8A, a current RNAB includes two parallel residual units. One residual unit includes three residual blocks (RB), and the other residual unit includes six residual blocks (RB), three convolution layers, and a sigmoid function. The structure is relatively complex.

In this embodiment of this application, a simplified residual non-local attention block is provided. The simplified residual non-local attention block may be understood as a lightweight RNAB.

A specific network structure of the simplified residual non-local attention block is not limited in this embodiment of this application. For example, the simplified residual non-local attention block may be any simple structure of an RNAB network shown in FIG. 8A. For example, a network structure including fewer convolution layers, fewer residual blocks, or fewer convolution layers and fewer residual blocks than those shown in FIG. 8A may all be used as the simplified residual non-local attention block in this embodiment of this application.

In this embodiment of this application, if the P types of lightweight attention modules following the $i^{th}$ convolution layer include a first type of lightweight attention module, the decoder may process first feature information by using a simplified residual local attention block, to obtain second feature information, where the first feature information is obtained based on the $i^{th}$ feature information. For example, if the P types of lightweight attention modules are connected in series and the first type of lightweight attention module is a first lightweight attention module directly connected to the $i^{th}$ convolution layer, the first feature information is the $i^{th}$ feature information. If the first type of lightweight attention module is not the first lightweight attention module directly connected to the $i^{th}$ convolution layer, the first feature information is feature information obtained after processing the $i^{th}$ feature information by a lightweight attention module of another type located in front of the first type of lightweight attention module. If the P types of lightweight attention modules are connected in parallel, the first feature information is the $i^{th}$ feature information. For another example, if the P types of lightweight attention modules are in skip connection, the first feature information is also the $i^{th}$ feature information.

After processing the first feature information by using the simplified residual local attention block (i.e. the first type of lightweight attention module), to obtain second feature information, the decoder obtains the $(i+1)^{th}$ feature information based on the second feature information.

In an example, if the P types of lightweight attention modules are connected in series and the simplified residual local attention block is the last lightweight attention module of the P types of lightweight attention modules, the second feature information is determined as the $(i+1)^{th}$ feature information. If the simplified residual local attention block is not the last lightweight attention module of the P types of lightweight attention modules, the decoder inputs the second feature information to another type of lightweight attention module following the simplified residual local attention block for processing, to obtain the $(i+1)^{th}$ feature information.

In an example, if the P types of lightweight attention modules are connected in parallel, the second feature information and feature information outputted by lightweight attention modules of other types than the first type in the P types are fused (for example, channel concatenation), to obtain the $(i+1)^{th}$ feature information.

In an example, if the P types of lightweight attention modules are in skip connection, the second feature information and feature information outputted by lightweight attention modules of other types than the first type in the P types are fused (for example, channel concatenation), to obtain fused feature information. Then the fused feature information is fused with the $i^{th}$ feature information, to obtain the $(i+1)^{th}$ feature information.

Figure 8B:
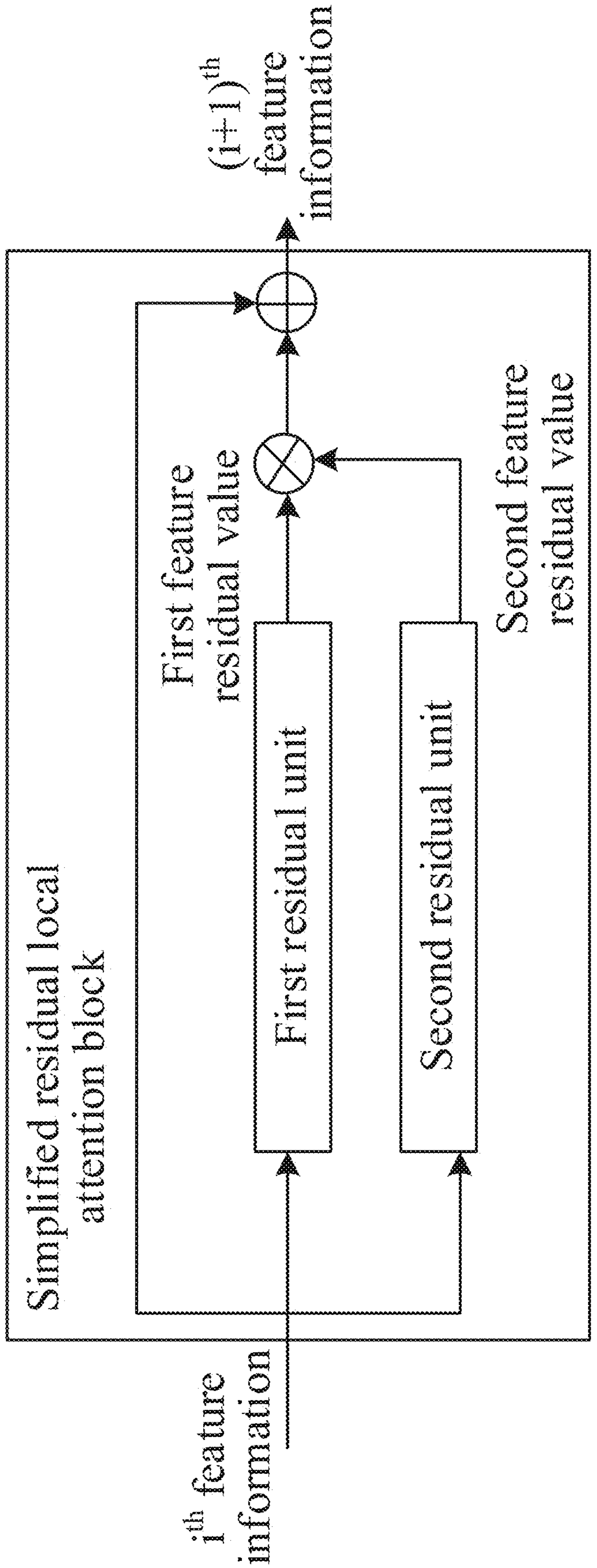
FIG. 8B is a schematic diagram of a lightweight attention module according to this application.

In a possible implementation, as shown in FIG. 8B, the simplified residual local attention block in this embodiment of this application includes a first residual unit and a second residual unit. At this moment, S102-B-a1 includes the following operations.

S102-B-a11: The decoder processes first feature information by using a first residual unit, to obtain a first feature residual value.

S102-B-a12: The decoder processes the first feature information by using a second residual unit, to obtain a second feature residual value.

S102-B-a13: The decoder obtains second feature information according to the first feature residual value, the second feature residual value, and the first feature information.

The first residual unit and the second residual unit in this embodiment of this application are connected in parallel, and are configured to perform residual processing on the first feature information, to obtain a first feature residual value and a second feature residual value of the current picture.

In some embodiments, a quantity of residual blocks included in the first residual unit is less than a first preset quantity and/or a quantity of residual blocks included in the second residual unit is less than a second preset quantity.

Specific values of the first preset quantity and the second preset quantity are not limited in this embodiment of this application. For example, the first preset quantity is 3, and the second preset quantity is 6. To be specific, the quantity of residual blocks included in the first residual unit is less than the quantity of residual blocks included in an upper residual unit in FIG. 8A, and/or the quantity of residual blocks included in the second residual unit is less than the quantity of residual blocks included in a lower residual unit in FIG. 8A, so that the network structure of the simplified residual local attention block provided in this embodiment of this application is simpler than the network structure of the RNAB shown in FIG. 8A.

In some embodiments, at least one residual unit of the first residual unit and the second residual unit includes a simplified residual block. The simplified residual block may be understood as a residual block having a simpler structure than an existing residual block.

In an example, the simplified residual block includes a convolution layer.

Figure 8C:
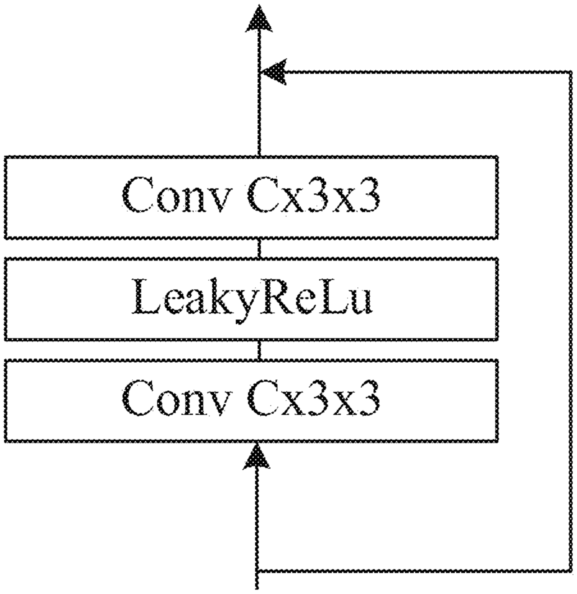
FIG. 8C is a schematic diagram of a residual block.

As shown in FIG. 8C, a current residual block includes at least two convolution layers. This embodiment of this application provides a simplified residual block (simplified RB). The simplified residual block includes only one convolution layer, which may reduce computation complexity of the residual block.

Figure 8D:
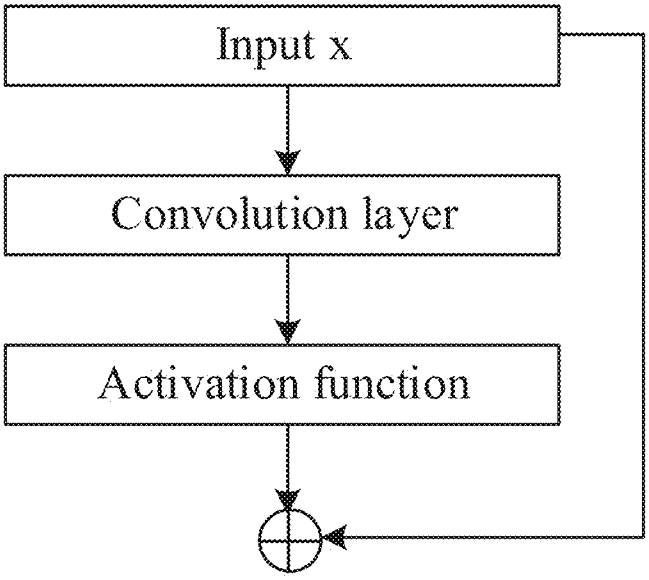
FIG. 8D is a schematic diagram of a simplified residual block according to this application.

In an example, as shown in FIG. 8D, the simplified residual block includes a convolution layer and an activation function, and further includes a skip connection. Input information x is processed by the convolution layer and then is processed by the activation function. By adding to the input information x, an output of the simplified residual block is obtained. A specific size of the convolution layer shown in FIG. 8D is not limited in this embodiment of this application. For example, a convolution kernel of the convolution layer is 3×3 and a stepsize is s1, or the convolution kernel of the convolution layer is 5×5 and the stepsize is s2. A specific type of the activation function included in the simplified residual block is not limited in this embodiment of this application. For example, the activation function may be a Rule activation function, or may be a LeakyReLu activation function.

A specific quantity of simplified residual blocks included in the first residual unit and the second residual unit is not limited in this embodiment of this application.

Figure 8E:
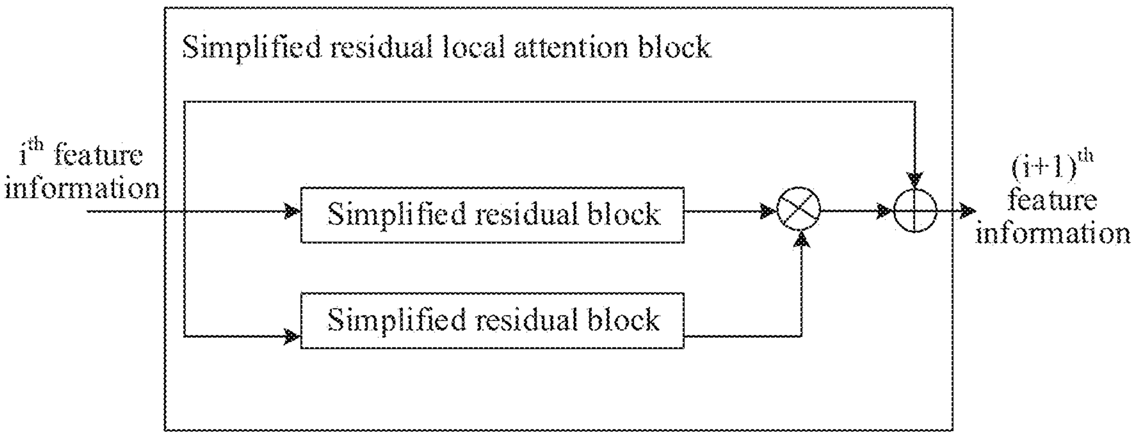
FIG. 8E is a schematic diagram of a simplified residual non-local attention block according to this application.

In an example, both the first residual unit and the second residual unit include a simplified residual block. At this moment, the simplified residual local attention block is shown in FIG. 8E. The first feature information is separately processed by using the simplified residual block in the first residual unit and the simplified residual block in the second residual unit, and then multiplied. A multiplication result is added to the first feature information, to obtain the second feature information.

In some embodiments, at least one residual block shown in FIG. 8A may be replaced with a simplified residual block provided in this embodiment of this application as a simplified residual non-local attention block.

It can be known from the foregoing description that in this embodiment, the decoder inputs first feature information to a simplified residual non-local attention block, processes the first feature information by using a first residual unit, to obtain a first feature residual value, and processes the first feature information by using a second residual unit, to obtain a second feature residual value. Then, second feature information is obtained according to the first feature residual value, the second feature residual value, and the first feature information. For example, the first feature residual value and the second feature residual value are multiplied and then added to the first feature information, to obtain the second feature information. For another example, the first feature residual value and the second feature residual value are multiplied and then convolved. A convolution result is added to the first feature information, to obtain the second feature information.

Because the network structure of the simplified residual non-local attention block provided in this embodiment of this application is simpler than the network structure of the RNAB shown in FIG. 3A and FIG. 8A, and computation complexity is lower, the computation complexity is reduced while a picture processing effect is ensured, thereby improving picture decoding performance.

Figure 9A:
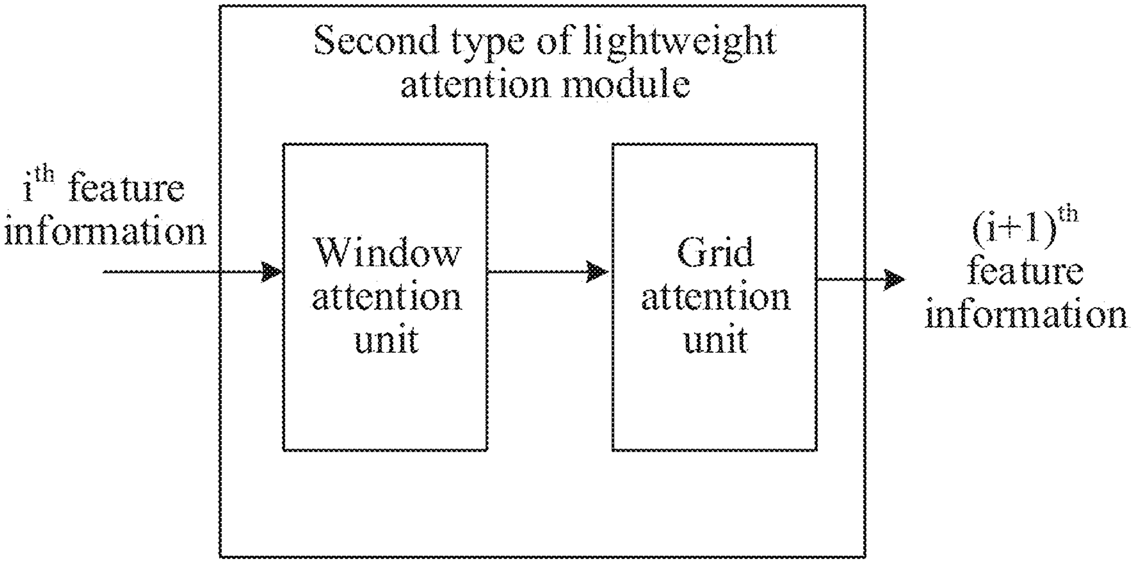
FIG. 9A is a schematic diagram of a lightweight attention module according to this application.

In some embodiments, as shown in FIG. 9A, the P types of lightweight attention modules in this embodiment of this application include a second type of lightweight attention module. The second type of lightweight attention module includes a window attention unit and a grid attention unit. At this moment, S102-B includes the following operations.

S102-B-b1: The decoder determines a first window size and a second window size corresponding to the $i^{th}$ convolution layer.

S102-B-b2: The decoder determines third feature information based on the $i^{th}$ feature information.

S102-B-b3: The decoder divides, based on the first window size and the window attention unit, the third feature information into a plurality of sub-blocks, and separately performs local attention processing on the plurality of sub-blocks, to obtain local feature information of the current picture.

S102-B-b4: The decoder divides, based on the second window size and the grid attention unit, the local feature information of the current picture into a plurality of grids, and performs global attention processing on the plurality of grids, to obtain global feature information of the current picture.

S102-B-b5: The decoder determines the $(i+1)^{th}$ feature information based on the global feature information of the current picture.

The second type of lightweight attention module in this embodiment of this application includes a window attention unit and a grid attention unit. The window attention unit is configured to divide the input into sub-blocks, and separately perform local attention computation on each sub-block. The grid attention unit is configured to perform global attention computing processing on the input. To be specific, in this embodiment of this application, the second type of lightweight attention module is configured to perform local and global attention computing on the $i^{th}$ feature information, to improve a data processing effect.

In this embodiment of this application, in an input feature map $X \in R^{H \times W \times C}$, H is a height of the input feature map, W is a width of the input feature map, and C is a quantity of channels of the input feature map. The window attention unit does not focus attention on a flat spatial dimension HW, but divides, according to the first window size, the first feature information into non-overlapping sub-blocks. The size of each sub-block is P×P, and focuses self attention on a local spatial dimension (i.e. P×P), and uses this attention to perform local interaction.

Meanwhile, in this embodiment of this application, the grid attention unit is configured to grid the input into a shape (G×G, HG×WG, C) by using a fixed G×G even grid, so as to generate a grid having an adaptive size H/G×W/G. Global space mixing is performed on a decomposed grid axis (i.e. G×G) by using self attention.

It can be seen that in this embodiment of this application, if the second type of lightweight attention module includes a window attention unit and a grid attention unit, a first window size and a second window size corresponding to the $i^{th}$ convolution layer are first determined.

The first window size may be understood as a window size corresponding to the window attention unit, and the second window size may be understood as a window corresponding to the grid attention unit.

Specific values of the first window size and the second window size are not limited in this embodiment of this application.

In some embodiments, first window sizes corresponding to different network layers are the same, and/or second window sizes corresponding to different network layers are the same.

In some embodiments, first window sizes corresponding to different network layers are different, and/or second window sizes corresponding to different network layers are different.

In some embodiments, on different network layers, different window sizes may be set to better capture an association between elements in a hidden variable, and effectively control complexity. Exemplarily, S102-B-b1 includes determining, according to a network depth of the $i^{th}$ convolution layer, at least one of the first window size and the second window size corresponding to the $i^{th}$ convolution layer.

In this embodiment, different or different levels of first window sizes and/or second window sizes are set for the second type of lightweight attention modules of different network depths. For example, different first window sizes and/or second window sizes are set for the second type of lightweight attention modules of different network depths. Alternatively, different levels of first window sizes and/or second window sizes are set for the second type of lightweight attention modules of different network depth ranges.

In this way, the decoder may determine, according to a network depth of an it convolution layer (or the second type of lightweight attention module), a first window size and/or a second window size corresponding to the $i^{th}$ convolution layer (or the second type of lightweight attention module).

For example, a small first window and/or second window may be used in a shallow layer of a network, and a large first window and/or second window may be used in a deep layer of the network. To be specific, if the network depth of the $i^{th}$ convolution layer (or the second type of lightweight attention module) is small, a small first window and/or second window is used. If the network depth of the $i^{th}$ convolution layer (or the second type of lightweight attention module) is large, a large first window and/or second window is used.

An execution sequence of S102-B-b2 and S102-B-b1 is not limited in this embodiment of this application. To be specific, S102-B-b2 may be performed after S102-B-b1, or may be performed before S102-B-b1, or may be performed synchronously with S102-B-b1.

A specific mode of determining, by the decoder, the third feature information based on the $i^{th}$ feature information is not limited in this embodiment of this application.

For example, if the P types of lightweight attention modules are connected in series and the second type of lightweight attention module is a first lightweight attention module directly connected to the $i^{th}$ convolution layer, the third feature information is the $i^{th}$ feature information. If the second type of lightweight attention module is not the first lightweight attention module directly connected to the $i^{th}$ convolution layer, the third feature information is feature information obtained after processing the $i^{th}$ feature information by a lightweight attention module of another type located in front of the second type of lightweight attention module.

For another example, if the P types of lightweight attention modules are connected in parallel, the third feature information is the $i^{th}$ feature information.

For another example, if the P types of lightweight attention modules are in skip connection, the third feature information is also the $i^{th}$ feature information.

After determining the first window size and the third feature information based on the foregoing operations, the decoder divides, based on the first window size and the window attention unit, the third feature information into a plurality of sub-blocks, and separately performs local attention processing on the plurality of sub-blocks, to obtain local feature information of the current picture.

In some embodiments, before dividing the third feature information into the plurality of sub-blocks, the decoder further processes the third feature information by using another feature processing unit, to obtain processed third feature information.

A specific network structure of the feature processing unit is not limited in this embodiment of this application.

Figure 9B:
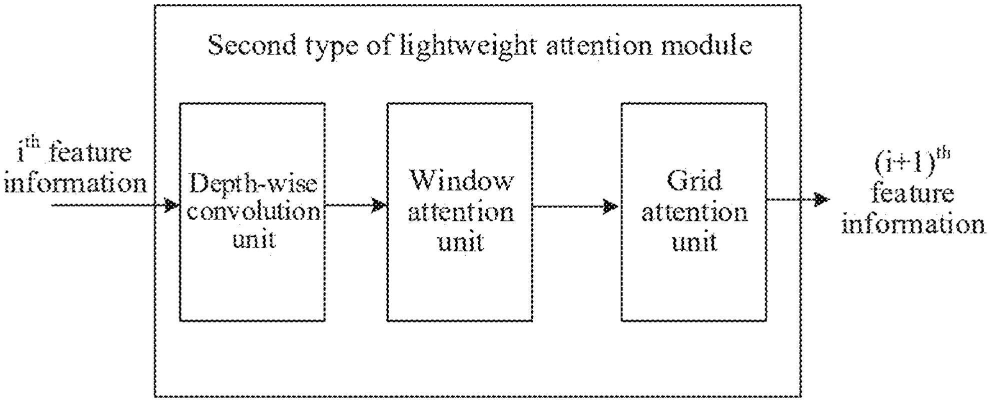
FIG. 9B is a schematic diagram of another lightweight attention module according to this application.

In a possible implementation, as shown in FIG. 9B, the second type of lightweight attention module further includes an inverted linear bottleneck unit with depth-wise convolution. At this moment, S102-B-b2 includes operation S102-B-b21.

S102-B-b21: The decoder performs feature extraction on the third feature information by using the inverted linear bottleneck unit with depth-wise convolution, to obtain the processed third feature information.

A specific network structure of the inverted linear bottleneck unit with depth-wise convolution is not limited in this embodiment of this application.

Figure 9C:
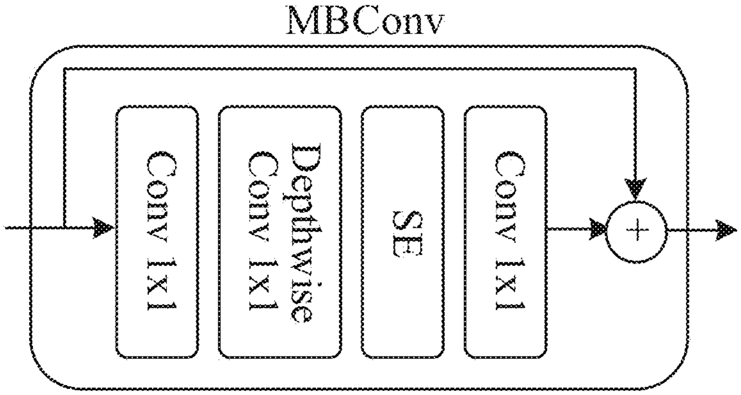
FIG. 9C is a schematic diagram of an inverted linear bottleneck unit with depth-wise convolution.

In an example, as shown in FIG. 9C, the inverted linear bottleneck unit with depth-wise convolution is an MBConv, including a first convolution layer, a Depth-wise convolution layer, a squeeze excitation layer (SE), and a second convolution layer. At this moment, S102-B-b21 includes: performing pointwise convolution channel dimension increase on the $i^{th}$ feature information by using the first convolution layer, performing Depth-wise convolution in a projection space after the dimension increase, enhancing representation of an important channel by using the SE immediately following, and finally, performing pointwise convolution to restore a dimension by using the second convolution layer again.

Figure 9D:
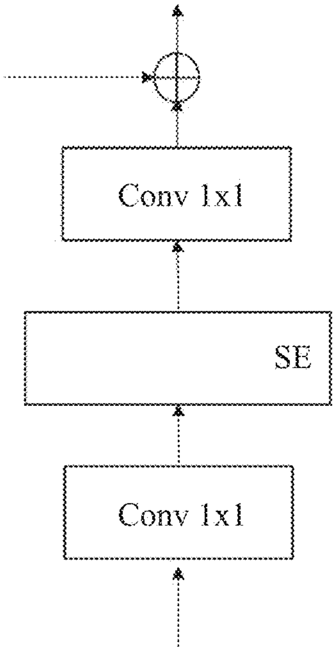
FIG. 9D is another schematic diagram of an inverted linear bottleneck unit with depth-wise convolution.

In an example, as shown in FIG. 9D, the inverted linear bottleneck unit with depth-wise convolution includes a first convolution layer, an SE layer, and a second convolution layer. At this moment, S102-B-b21 includes the following operations: performing channel dimension increase processing on the third feature information by using the first convolution layer, to obtain dimension increase feature information; performing channel enhancement processing on the dimension increase feature information by pressing the squeeze excitation layer, to obtain enhanced feature information; and performing channel dimension reduction on the enhanced feature information by using the second convolution layer, to obtain processed third feature information.

Specifically, as shown in FIG. 9D, the decoder inputs the third feature information to the first convolution layer to perform channel dimension increase processing, to obtain dimension increase feature information, and inputs the dimension increase feature information to the SE layer to perform channel enhancement processing, to obtain enhanced feature information. Then, the enhanced feature information is inputted to the second convolution layer to perform channel dimension reduction, to obtain dimension reduction feature information, and the dimension reduction feature information is fused with the third feature information, to obtain processed third feature information.

Exemplarily, a feature dimension of the dimension reduction feature information is equal to a feature dimension of the third feature information.

Specific parameters of the first convolution layer and the second convolution layer are not limited in this embodiment of this application.

Exemplarily, the first convolution layer is a 1×1 convolution layer.

Exemplarily, the second convolution layer is a 1×1 convolution layer.

Compared with the MBConv of FIG. 9C, the inverted linear bottleneck unit with depth-wise convolution shown in FIG. 9D reduces a Depth-wise convolution layer. Normalization processing is usually performed after the Depth-wise convolution layer, and the normalization processing is not very friendly to a picture compression task. Therefore, when picture compression is performed by using the depth-wise convolution unit shown in FIG. 9D, picture compression efficiency can be improved.

In some embodiments, the inverted linear bottleneck unit with depth-wise convolution shown in FIG. 9D may be used as an improved MBConv.

After determining, based on the foregoing operations, the processed third feature information, the first window size, and the second window size, the decoder performs operations S102-B-b3 and S102-B-b4. To be specific, the window attention unit divides the processed third feature information into a plurality of sub-blocks according to the first window size, and performs local attention processing on each sub-block of the plurality of sub-blocks, to obtain local feature information of the current picture.

For example, for the processed third feature information $X \in R^{H\times W\times C}$, the processed third feature information is divided, according to the first window size, into a plurality of non-overlapping sub-blocks, where a size of each sub-block is P×P. Finally, self attention computation is performed in each window, to obtain the local feature information of the current picture.

A specific network structure of the window attention unit is not limited in this embodiment of this application.

Figure 9E:
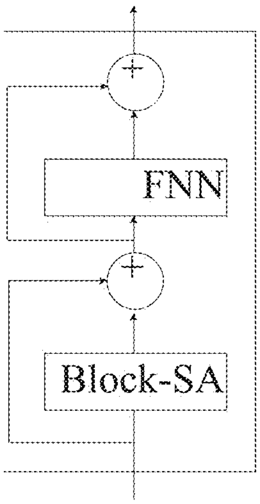
FIG. 9E is a schematic diagram of a window attention unit.

In a possible implementation, as shown in FIG. 9E, the window attention unit includes a block self-attention (Block-SA) and a feed forward neural network (FNN). Exemplarily, for each sub-block of the plurality of sub-blocks, block-level self attention computation is first performed on the sub-block by using the Block-SA, and a computation result is added to the sub-block, to obtain self attention information of the sub-block. The self attention information of the plurality of sub-blocks is combined, and the combined self attention information is inputted to the FNN for processing, to obtain the local feature information of the current picture.

In a possible implementation, the window attention unit may include more or fewer modules than those shown in FIG. 9E. For example, at least one convolution layer is added after the FNN shown in FIG. 9E, or at least one convolution layer is added after the last addition operation shown in FIG. 9E.

After obtaining the local feature information of the current picture by using the window attention unit, the decoder inputs the local feature information to the grid attention unit.

Specifically, the local feature information of the current picture is divided into a plurality of grids according to the second window size, and global attention processing is performed on the plurality of grids, to obtain global feature information of the current picture.

For example, for the local feature information of the current picture $X1 \in R^{H\times W\times C}$, the local feature information is evenly gridded into (G×G, HG×WG, C) according to the second window size, to generate a grid having an adaptive size H/G×W/G. Global space mixing is performed on a decomposed grid axis (i.e. G×G) by using self attention, to obtain the global feature information of the current picture.

A specific network structure of the grid attention unit is not limited in this embodiment of this application.

Figure 9F:
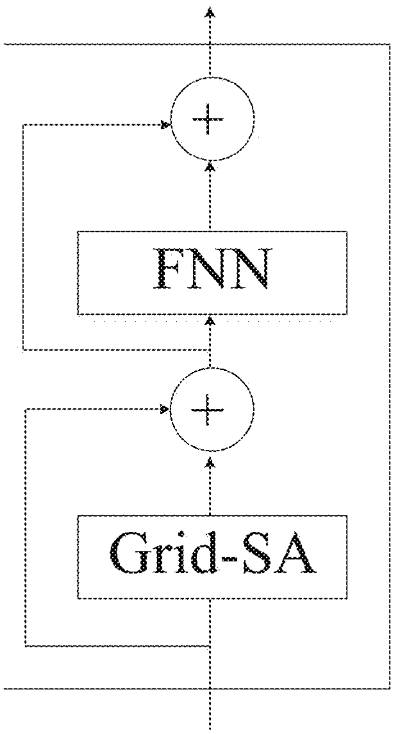
FIG. 9F is a schematic diagram of a grid attention unit.

In a possible implementation, as shown in FIG. 9F, the grid attention unit includes a grid self attention (Grid-SA) and a feed forward neural network (FNN).

For example, the decoder first performs self attention computation on the entire grid by using the Grid-SA, and fuses a computation result with the local feature information, to obtain self attention information of the entire grid. The self attention information of the entire grid is inputted to the FNN for processing, to obtain the global feature information of the current picture.

In a possible implementation, the grid attention unit may include more or fewer modules than those shown in FIG. 9F. For example, at least one convolution layer is added after the FNN shown in FIG. 9F, or at least one convolution layer is added after the last addition operation shown in FIG. 9F.

After determining the global feature information of the current picture based on the foregoing operations, the decoder determines the $(i+1)^{th}$ feature information according to the global feature information of the current picture.

A specific mode of determining, by the decoder, the $(i+1)^{th}$ feature information according to the global feature information of the current picture is not limited in this embodiment of this application.

In an example, if the P types of lightweight attention modules are connected in series and the second type of lightweight attention module is the last lightweight attention module of the P types of lightweight attention modules, the global feature information is determined as the $(i+1)^{th}$ feature information. If the second type of lightweight attention module is not the last lightweight attention module of the P types of lightweight attention modules, the decoder inputs the global feature information to another type of lightweight attention module following the second type of lightweight attention module for processing, to obtain the $(i+1)^{th}$ feature information.

In an example, if the P types of lightweight attention modules are connected in parallel, the global feature information and feature information outputted by lightweight attention modules of other types than the second type in the P types are fused (for example, channel concatenation), to obtain the $(i+1)^{th}$ feature information.

In an example, if the P types of lightweight attention modules are in skip connection, the decoder fuses (for example, performs channel concatenation on) the global feature information and feature information outputted by lightweight attention modules of other types than the second type in the P types, to obtain fused feature information. Then the fused feature information is fused with the $i^{th}$ feature information, to obtain the $(i+1)^{th}$ feature information.

In this implementation, the provided second type of lightweight attention module includes a window attention unit and a grid attention unit. It can be seen from the foregoing that the window attention unit and the grid attention unit have a simple structure, so that the entire second type of lightweight attention module has a simple structure and has low computation complexity. Therefore, the computation complexity can be reduced while a picture processing effect is ensured, thereby improving picture decoding performance.

Figure 10A:
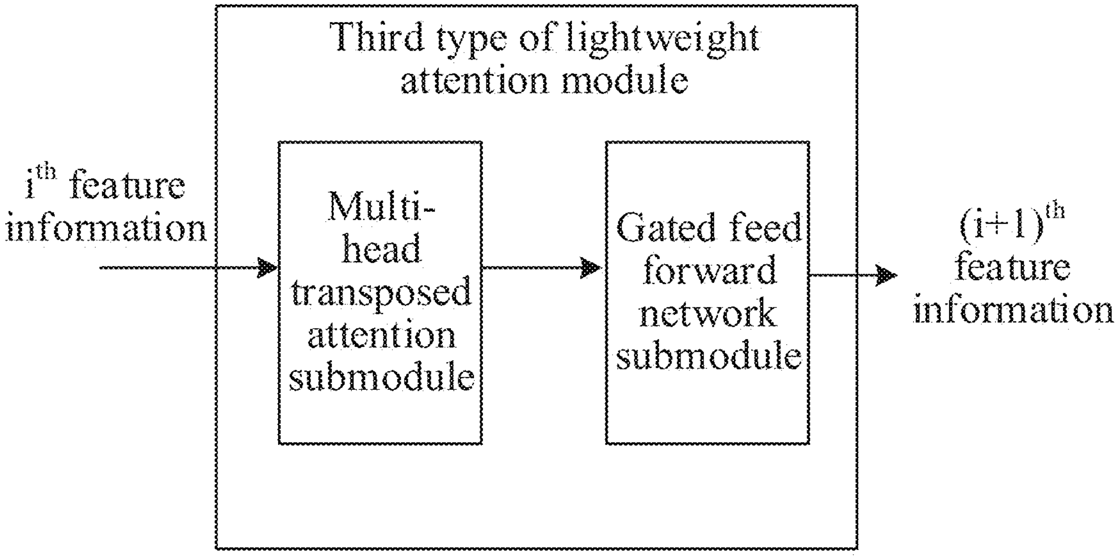
FIG. 10A is a schematic diagram of a lightweight attention module according to this application.

In some embodiments, as shown in FIG. 10A, the P types of lightweight attention modules in this embodiment of this application include a third type of lightweight attention module. The third type of lightweight attention module includes at least one of a multi-head transposed attention submodule and a gated feed forward network submodule. At this moment, S102-B includes the following operations.

S102-B-c1: The decoder processes fourth feature information by using at least one of the multi-head transposed attention submodule and the gated feed forward network submodule, to obtain fifth feature information.

S102-B-c2: The decoder determines the $(i+1)^{th}$ feature information based on the fifth feature information.

The fourth feature information is obtained based on the $i^{th}$ feature information.

For example, if the P types of lightweight attention modules are connected in series and the third type of lightweight attention module is a first lightweight attention module directly connected to the $i^{th}$ convolution layer, the fourth feature information is the $i^{th}$ feature information. If the third type of lightweight attention module is not the first lightweight attention module directly connected to the $i^{th}$ convolution layer, the fourth feature information is feature information obtained after processing the $i^{th}$ feature information by a lightweight attention module of another type located in front of the third type of lightweight attention module.

For another example, if the P types of lightweight attention modules are connected in parallel, the fourth feature information is the $i^{th}$ feature information.

For another example, if the P types of lightweight attention modules are in skip connection, the fourth feature information is also the $i^{th}$ feature information.

Then, the decoder inputs the fourth feature information to the third type of lightweight attention module, and processes the fourth feature information by using the multi-head transposed attention submodule and/or the gated feed forward network submodule in the third type of lightweight attention module, to obtain fifth feature information.

The multi-head transposed attention submodule is configured to perform channel self attention processing on information inputted to the multi-head transposed attention submodule. The gated feed forward network submodule is configured to perform feature conversion processing on information inputted to the gated feed forward network submodule.

In some embodiments, if the third type of lightweight attention module includes a multi-head transposed attention submodule and a gated feed forward network submodule, S102-B-c1 includes the following operations.

S102-B-c11: The decoder performs channel self attention processing on the fourth feature information by using the multi-head transposed attention submodule, to obtain sixth feature information.

S102-B-c12: The decoder performs feature conversion processing on the sixth feature information by using the gated feed forward network submodule, to obtain the fifth feature information.

In this embodiment of this application, the third type of lightweight attention module includes a multi-head transposed attention submodule and a gated feed forward network submodule. The multi-head transposed attention submodule computes self attention on a channel rather than space, and implicitly codes global context information by computing the attention on the channel. In addition, between computation of the self attention map, Q, K, and V are generated by using a depth-wise convolution operation. In this way, local information may be emphasized.

A specific network structure of the multi-head transposed attention submodule is not limited in this embodiment of this application.

Figure 10B:
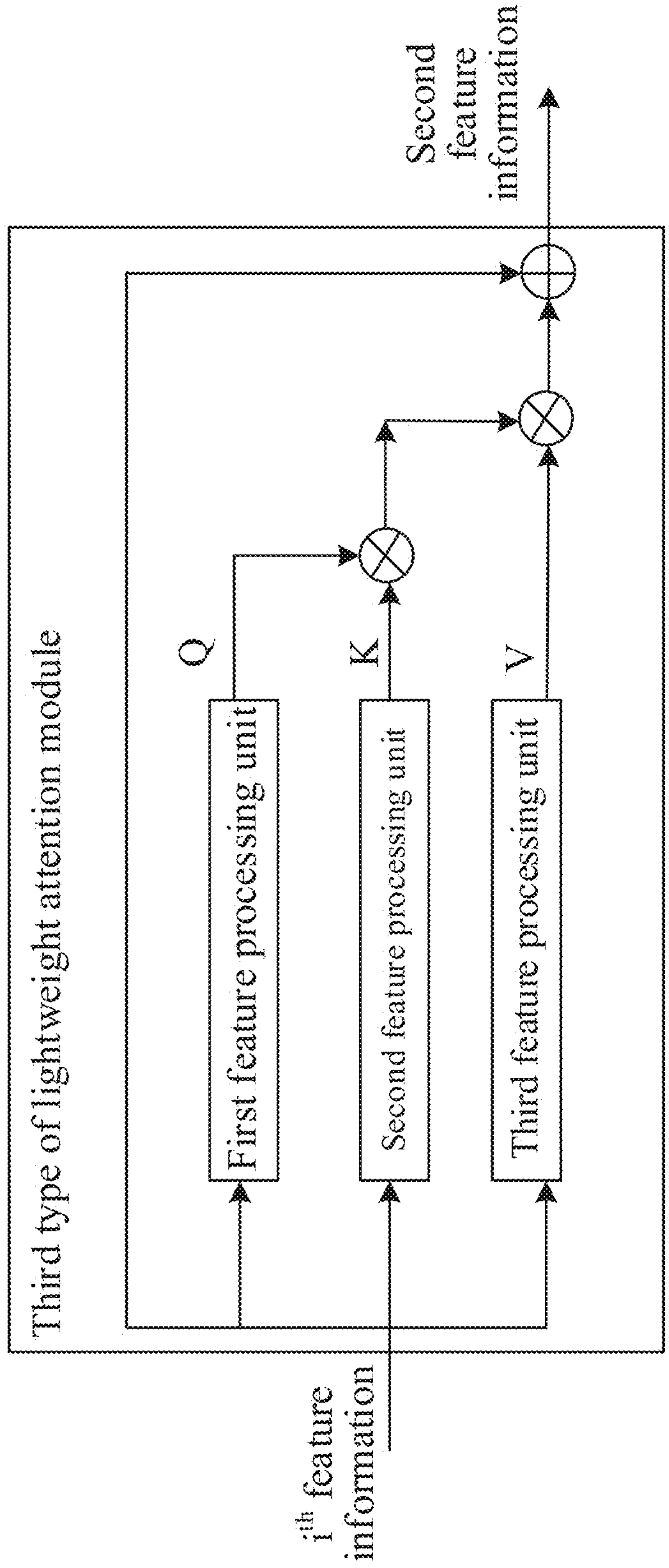
FIG. 10B is a schematic diagram of a multi-head transposed attention submodule.

In a possible implementation, as shown in FIG. 10B, the multi-head transposed attention submodule includes a first feature processing unit, a second feature processing unit, and a third feature processing unit. At this moment, S102-B-c11 includes the following operations.

S102-B-c111: The decoder separately processes the fourth feature information by using the first feature processing unit, the second feature processing unit, and the third feature processing unit, to obtain query information, key value information, and value entry information.

S102-B-c112: The decoder determines transposed attention information according to the query information, the key value information, and the value entry information.

S102-B-c113: The decoder obtains the sixth feature information according to the transposed attention information and the fourth feature information.

As shown in FIG. 10B, in this embodiment of this application, the decoder inputs the fourth feature information to the first feature processing unit for processing, and outputs query information Q. The query information Q is also referred to as a query matrix. The fourth feature information is inputted to the second feature processing unit for processing, and key value information K is outputted. The key value information K is also referred to as a key value matrix. The fourth feature information is inputted to the third feature processing unit for processing, and value entry information V is outputted. The value entry information V is also referred to as a value entry matrix. Further, transposed attention information is determined according to the query information, the key value information, and the value entry information, and sixth feature information is obtained according to the transposed attention information and the fourth feature information.

A specific mode of determining, by the decoder, the transposed attention information according to the query information, the key value information, and the value entry information is not limited in this embodiment of this application.

For example, the decoder multiplies the query information Q, the key value information K, and the value entry information V, to obtain the transposed attention information.

For another example, the decoder multiplies the query information Q and the key value information K and then performs normalization processing. For example, the decoder multiplies the query information Q and the key value information K and then inputs the query information Q and the key value information K to a softmax function for normalization processing, and outputs a transposed attention picture A. Then, the transposed attention picture A is multiplied by the value entry information V, to obtain the transposed attention information.

Specific network structures of the first feature processing unit, the second feature processing unit, and the third feature processing unit are not limited in this embodiment of this application.

Figure 10C:
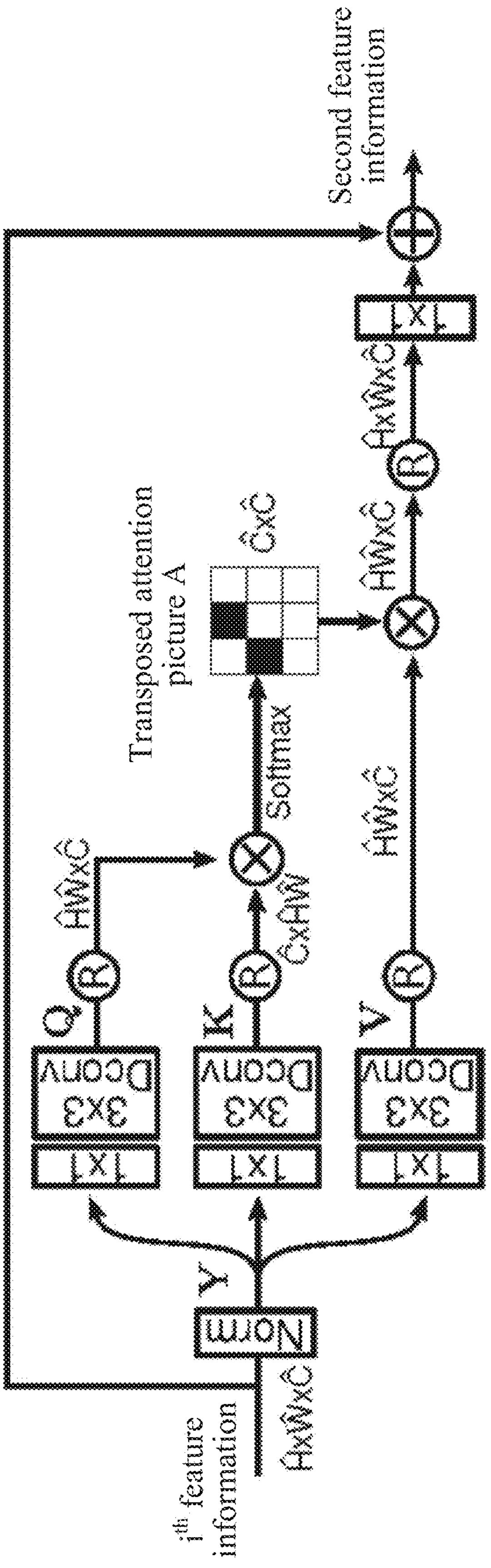
FIG. 10C is another schematic diagram of a multi-head transposed attention submodule.

In a possible implementation, as shown in FIG. 10C, the first feature processing unit includes one convolution layer and one deformable convolution layer. The second feature processing unit includes one convolution layer and one deformable convolution layer. The third feature processing unit includes one convolution layer and one deformable convolution layer. In some embodiments, convolution layers included in the first feature processing unit, the second feature processing unit, and the third feature processing unit may be the same or may be different. In some embodiments, deformable convolution layers included in the first feature processing unit, the second feature processing unit, and the third feature processing unit may be the same, or may be different.

In some embodiments, a convolution layer included in at least one feature processing unit of the first feature processing unit, the second feature processing unit, and the third feature processing unit is a 1×1 convolution layer.

In some embodiments, a deformable convolution layer included in at least one feature processing unit of the first feature processing unit, the second feature processing unit, and the third feature processing unit is a 3×3 deformable convolution layer.

In a possible implementation, at least one of the first feature processing unit, the second feature processing unit, and the third feature processing unit does not include a third convolution layer, and a size of a convolution kernel of the third convolution layer is a first preset value.

In an example, the third convolution layer may be the 1×1 convolution layer in FIG. 10C.

In an example, the third convolution layer may be the 3×3 deformable convolution layer in FIG. 10C.

To be specific, the multi-head transposed attention submodule shown in this implementation may not include the at least one 1×1 convolution layer in FIG. 10C. Alternatively, the multi-head transposed attention submodule shown in this implementation may not include the at least one 3×3 deformable convolution layer in FIG. 10C, to reduce computation complexity of the multi-head transposed attention submodule. Alternatively, the multi-head transposed attention submodule shown in this implementation includes fewer 1×1 convolution layers and/or fewer 3×3 deformable convolution layers than those shown in FIG. 10C.

Figure 10D:
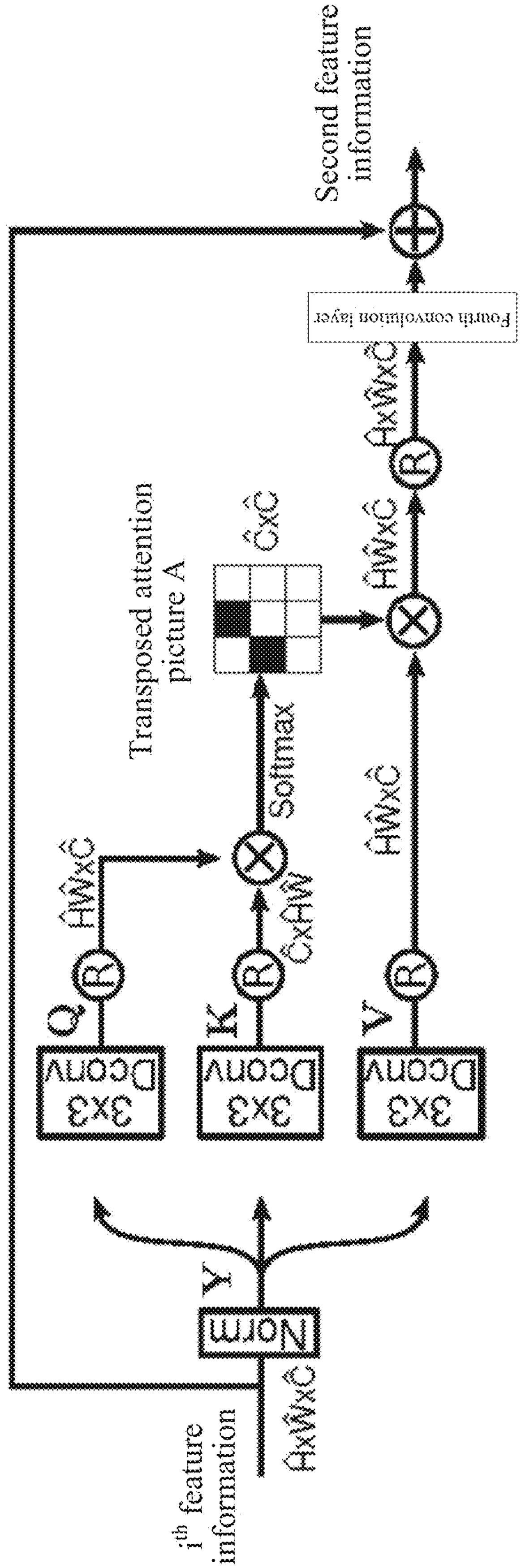
FIG. 10D is still another schematic diagram of a multi-head transposed attention submodule.

In an example, if the first feature processing unit, the second feature processing unit, and the third feature processing unit do not include a 1×1 convolution layer, a network of the multi-head transposed attention submodule is shown in FIG. 10D.

In some embodiments, as shown in FIG. 10D, the multi-head transposed attention submodule further includes a fourth convolution layer. At this moment, the obtaining, by the decoder, the sixth feature information according to the transposed attention information and the fourth feature information includes: processing the transposed attention information by using the fourth convolution layer, and fusing with the fourth feature information, to obtain the sixth feature information.

A specific structure of the fourth convolution layer is not limited in this embodiment of this application.

Exemplarily, the fourth convolution layer is a 1×1 convolution layer.

Figure 10E:
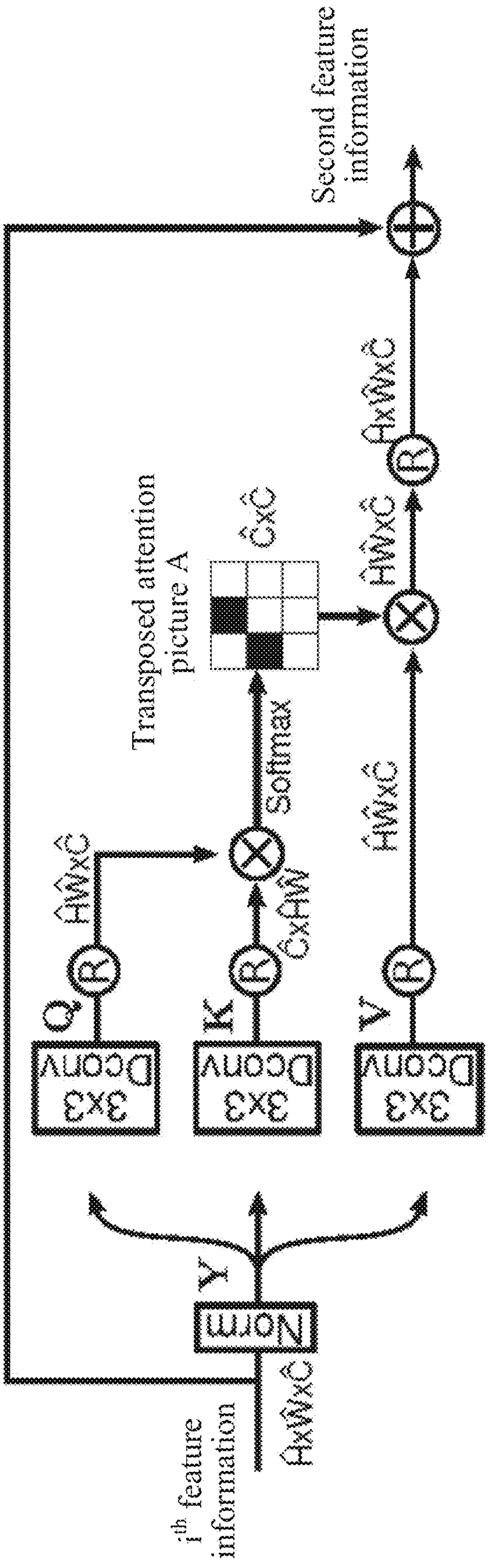
FIG. 10E is still another schematic diagram of a multi-head transposed attention submodule.

In some embodiments, as shown in FIG. 10E, the multi-head transposed attention submodule does not include a fourth convolution layer. At this moment, the obtaining, by the decoder, the sixth feature information according to the transposed attention information and the fourth feature information includes: processing the transposed attention information, and fusing with the fourth feature information, to obtain the sixth feature information.

In some embodiments, as shown in FIG. 10C, before inputting the fourth feature information to the first feature processing unit, the second feature processing unit, and the third feature processing unit, the decoder first performs normalization (Norm) processing, and separately inputs the normalized fourth feature information to the first feature processing unit, the second feature processing unit, and the third feature processing unit.

It can be seen from the foregoing that, in some embodiments, to reduce computation complexity of the multi-head transposed attention submodule, compared with the multi-Dconv head transposed attention (MDTA) shown in FIG. 10C, there are fewer 1×1 convolution layers, fewer 3×3 deformable convolution layers, or fewer 1×1 convolution layers and 3×3 deformable convolution layers, to reduce computation complexity of the multi-head transposed attention submodule and improve picture processing efficiency. For example, the left three 1×1 convolution layers and/or the right three 1×1 convolution layers in the MDTA shown in FIG. 10C are reduced, to obtain a multi-head transposed attention submodule with low computation complexity.

In some embodiments, at least one of the first feature processing unit, the second feature processing unit, and the third feature processing unit in the multi-head transposed attention submodule includes a residual block (RB) or a simplified residual block (simplified RB block). To be specific, in this embodiment, the 1×1 convolution layer and the 3×3 convolution layer in any branch of the MDTA shown in 10C may be replaced with a residual block or a simplified residual block. In some embodiments, the last convolution layer (i.e. a 1×1 convolution layer at the lower right corner) may further be removed, to further reduce model complexity. In some embodiments, the activation function in the simplified residual block may be a LeakyReLU activation function, another activation function, or the like.

In some embodiments, the multi-head transposed attention submodule may be directly replaced with the simplified residual non-local attention block. As shown in the foregoing embodiment, the simplified residual non-local attention block includes a first residual unit and a second residual unit. At least one residual unit of the first residual unit and the second residual unit includes one or more simplified residual blocks. Alternatively, a quantity of residual blocks included in the first residual unit is less than a first preset quantity and/or a quantity of residual blocks included in the second residual unit is less than a second preset quantity.

In some embodiments, in the lightweight attention modules included in the composite transformation network, different lightweight attention modules correspond to different quantities of heads of multi-head transposed attention submodules. For example, for some lightweight attention modules, head transposed attention submodules with a large quantity of heads are used. For some lightweight attention modules, head transposed attention submodules with a small quantity of heads are used. For example, lightweight attention modules of different network depths correspond to different quantities of heads of multi-head transposed attention submodules.

Based on the foregoing operations, after inputting the fourth feature information to the multi-head transposed attention submodule to perform channel self attention processing, to obtain sixth feature information, the decoder inputs the sixth feature information to the gated feed forward network submodule to perform feature conversion processing, to obtain fifth feature information.

A specific network structure of the gated feed forward network submodule is not limited in this embodiment of this application.

Figure 10F:
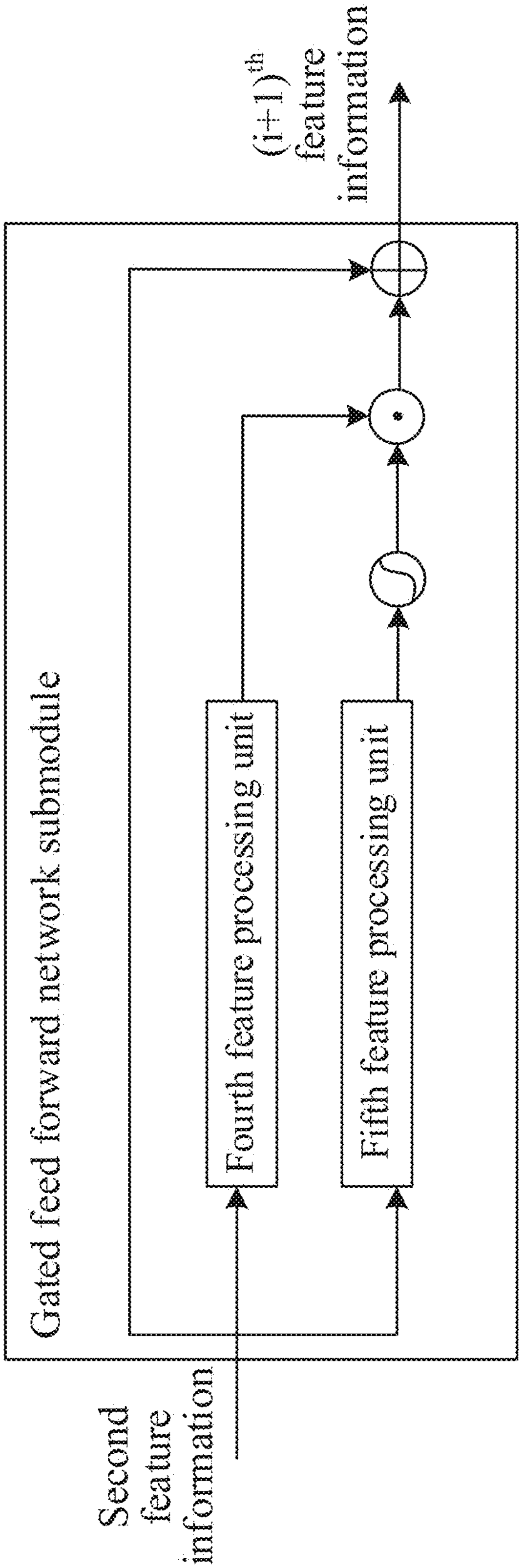
FIG. 10F is a schematic diagram of a gated feed forward network submodule.

In a possible implementation, as shown in FIG. 10F, the gated feed forward network submodule includes a fourth feature processing unit and a fifth feature processing unit. At this moment, S102-B-c12 includes the following operations.

S102-B-c121: The decoder separately processes the sixth feature information by using the fourth feature processing unit and the fifth feature processing unit, to obtain seventh feature information and eighth feature information.

S102-B-c122: The decoder point-multiplies the seventh feature information and the eighth feature information, to obtain ninth feature information.

S102-B-c123: The decoder obtains fifth feature information according to the ninth feature information and the sixth feature information.

As shown in FIG. 10F, in this embodiment of this application, the decoder inputs the sixth feature information to the fourth feature processing unit for processing, and outputs the seventh feature information. The sixth feature information is inputted to the fifth feature processing unit for processing, and the eighth feature information is outputted. The seventh feature information and the eighth feature information are point-multiplied, to obtain the ninth feature information. Further, the fifth feature information is obtained according to the ninth feature information and the sixth feature information.

Specific network structures of the fourth feature processing unit and the fifth feature processing unit are not limited in this embodiment of this application.

Figure 10G:
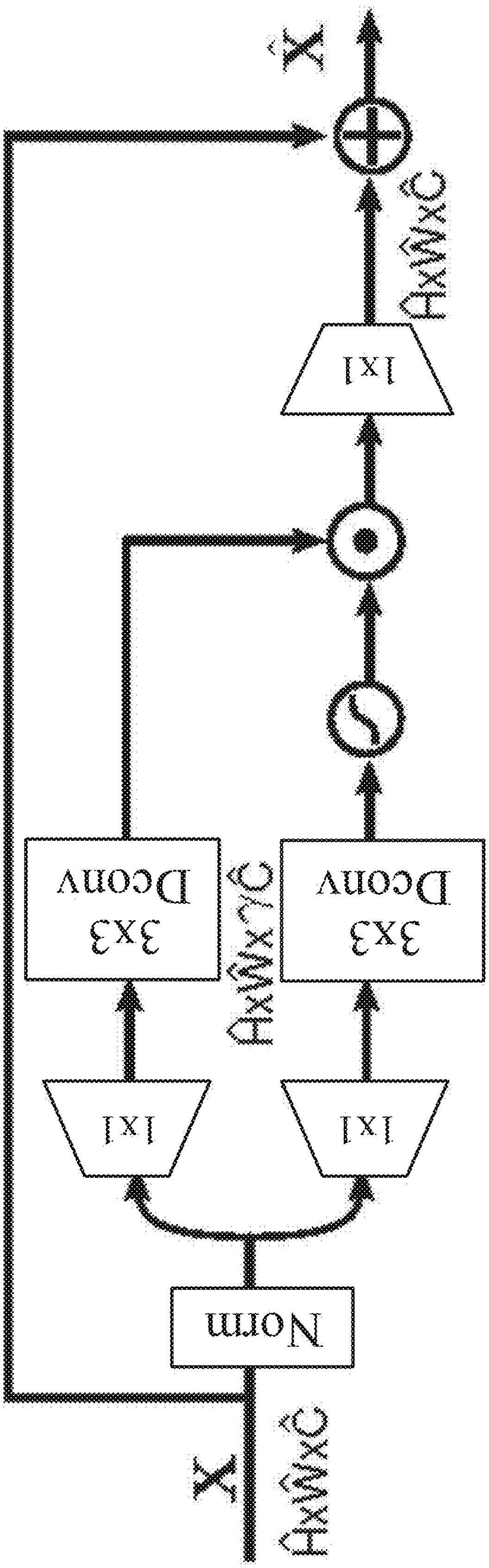
FIG. 10G is another schematic diagram of a gated feed forward network submodule.

In a possible implementation, as shown in FIG. 10G, the fourth feature processing unit includes one convolution layer and one deformable convolution layer. The fifth feature processing unit includes one convolution layer and one deformable convolution layer. In some embodiments, convolution layers included in the fourth feature processing unit and the fifth feature processing unit may be the same or may be different. In some embodiments, deformable convolution layers included in the fourth feature processing unit and the fifth feature processing unit may be the same or may be different.

In some embodiments, a convolution layer included in at least one feature processing unit of the fourth feature processing unit and the fifth feature processing unit is a 1×1 convolution layer.

In some embodiments, a deformable convolution layer included in at least one feature processing unit of the fourth feature processing unit and the fifth feature processing unit is a 3×3 deformable convolution layer.

In a possible implementation, at least one of the fourth feature processing unit and the fifth feature processing unit does not include a fifth convolution layer, and a size of a convolution kernel of the fifth convolution layer is a second preset value.

In an example, the fifth convolution layer may be the 1×1 convolution layer in FIG. 10G.

In an example, the fifth convolution layer may be the 3×3 deformable convolution layer in FIG. 10G.

To be specific, the gated feed forward network submodule shown in this implementation may not include the at least one 1×1 convolution layer in FIG. 10G. Alternatively, the gated feed forward network submodule shown in this implementation may not include the at least one 3×3 deformable convolution layer in FIG. 10G, to reduce computation complexity of the gated feed forward network submodule. Alternatively, the gated feed forward network submodule shown in this implementation includes fewer 1×1 convolution layers and/or fewer 3×3 deformable convolution layers than those shown in FIG. 10G. For example, two 1×1 convolution layers on the left of 10G are adapted to be reduced.

Figure 10H:
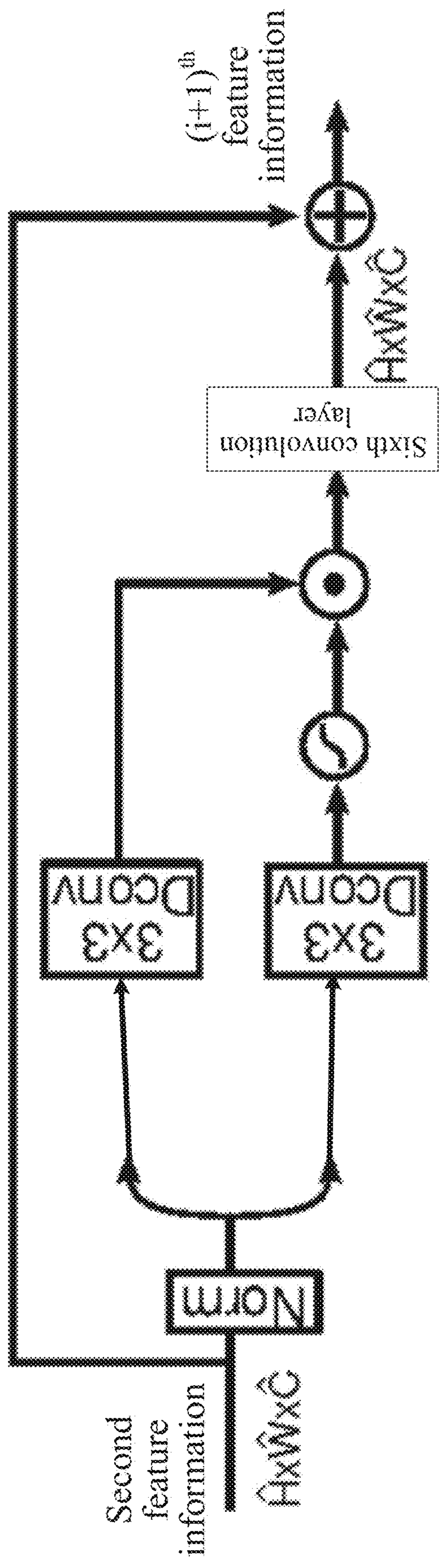
FIG. 10H is still another schematic diagram of a gated feed forward network submodule.

In an example, if neither the fourth feature processing unit nor the fifth feature processing unit includes a 1×1 convolution layer, a network of the gated feed forward network submodule is shown in FIG. 10H.

In some embodiments, as shown in FIG. 10H, the gated feed forward network submodule further includes a sixth convolution layer. At this moment, the obtaining, by the decoder, fifth feature information according to the ninth feature information and the sixth feature information includes: processing the ninth feature information by using the sixth convolution layer, and fusing with the sixth feature information, to obtain the fifth feature information.

A specific structure of the sixth convolution layer is not limited in this embodiment of this application.

Exemplarily, the sixth convolution layer is a 1×1 convolution layer.

Figure 10I:
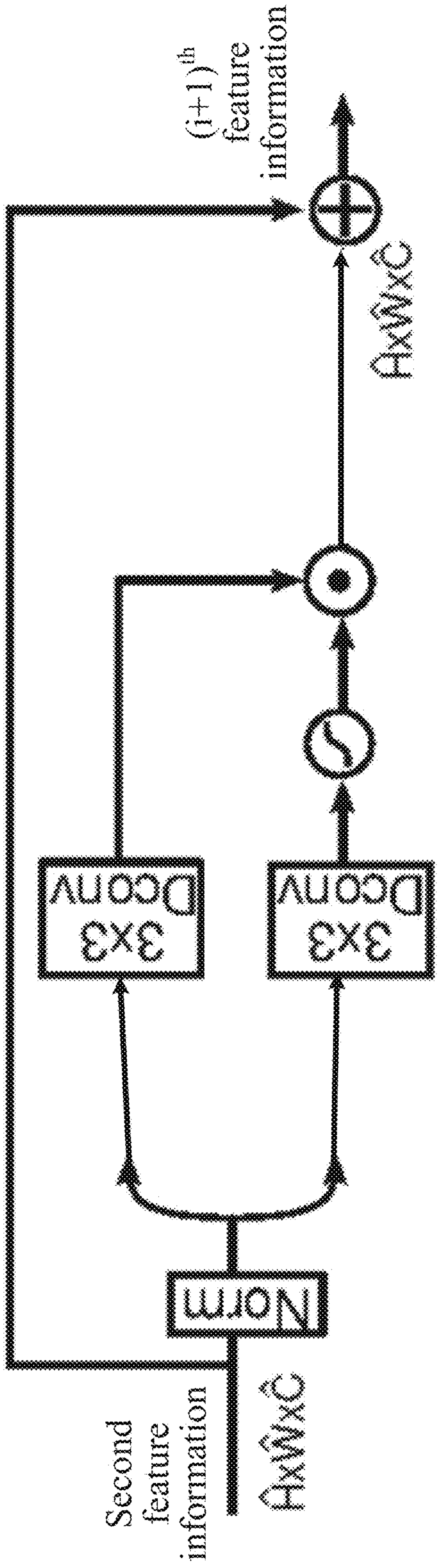
FIG. 10I is still another schematic diagram of a gated feed forward network submodule.

In some embodiments, as shown in FIG. 10I, the gated feed forward network submodule does not include a sixth convolution layer. At this moment, the obtaining, by the decoder, fifth feature information according to the ninth feature information and the sixth feature information includes: fusing the ninth feature information and the sixth feature information, to obtain the fifth feature information.

In some embodiments, before inputting the ninth feature information to the fourth feature processing unit and the fifth feature processing unit, the decoder first performs normalization processing (Norm), and separately inputs the normalized sixth feature information to the fourth feature processing unit and the fifth feature processing unit.

It can be seen from the foregoing that, in some embodiments, to reduce computation complexity of the gated feed forward network submodule, compared with the gated-Dconv feed-forward network (GDFN) shown in FIG. 10G, there are fewer 1×1 convolution layers, fewer 3×3 deformable convolution layers, or fewer 1×1 convolution layers and 3×3 deformable convolution layers, to reduce computation complexity of the multi-head transposed attention submodule and improve picture processing efficiency. For example, the left two 1×1 convolution layers and/or the right two 1×1 convolution layers in the GDFN shown in FIG. 10G are reduced, to obtain a gated feed forward network submodule with low computation complexity.

In some embodiments, as shown in FIG. 10F, after the fifth feature processing unit, the gated feed forward network submodule in this embodiment of this application further includes an activation function. To be specific, after processing the second feature information by using the fifth feature processing unit to obtain fourth feature information, the decoder processes the fourth feature information by using the activation function, and point-multiplies the processed fourth feature information by the third feature information and the fourth feature information, to obtain fifth feature information.

A specific type of the activation function in FIG. 10F is not limited in this embodiment of this application.

In some embodiments, the activation function is GELU Activation.

In some embodiments, to further reduce complexity of the gated feed forward network submodule, the activation function may be an activation function such as Sigmoid, ReLU, LeakyReLU, PReLU, or ELU.

In some embodiments, at least one of the fourth feature processing unit and the fifth feature processing unit includes a residual block or a simplified residual block. To be specific, in this embodiment, the 1×1 and 3×3 convolution of any branch in the gated feed forward network submodule may be replaced with the residual block (RB) or the foregoing simplified residual block (simplified RB block). In some embodiments, the last convolution layer, i.e. the 1×1 convolution layer at the lower right corner of the GDFN shown in FIG. 10G, is removed, thereby further reducing model complexity. In some embodiments, the activation function in the simplified residual block may be a LeakyReLU activation function, another activation function, or the like.

In some embodiments, the gated feed forward network submodule may be directly replaced with the simplified residual non-local attention block.

After determining the global feature information of the current picture based on the foregoing operations, the decoder determines the $(i+1)^{th}$ feature information according to the global feature information of the current picture.

A specific mode of determining, by the decoder, the $(i+1)^{th}$ feature information according to the fifth feature information is not limited in this embodiment of this application.

In an example, if the P types of lightweight attention modules are connected in series and the third type of lightweight attention module is the last lightweight attention module of the P types of lightweight attention modules, the decoder determines the fifth feature information as the $(i+1)^{th}$ feature information. If the third type of lightweight attention module is not the last lightweight attention module of the P types of lightweight attention modules, the decoder inputs the fifth feature information to another type of lightweight attention module following the third type of lightweight attention module for processing, to obtain the $(i+1)^{th}$ feature information.

In an example, if the P types of lightweight attention modules are connected in parallel, the decoder fuses (for example, performs channel concatenation on) the fifth feature information and feature information outputted by lightweight attention modules of other types than the third type in the P types, to obtain the $(i+1)^{th}$ feature information.

In an example, if the P types of lightweight attention modules are in skip connection, the decoder fuses (for example, performs channel concatenation on) the fifth feature information and feature information outputted by lightweight attention modules of other types than the third type in the P types, to obtain fused feature information. Then the fused feature information is fused with the $i^{th}$ feature information, to obtain the $(i+1)^{th}$ feature information.

In this implementation, the provided third type of lightweight attention module includes at least one of a multi-head transposed attention submodule and a gated feed forward network submodule. It can be seen from the foregoing that the multi-head transposed attention submodule and the gated feed forward network submodule have a simple structure, so that the entire third type of lightweight attention module has low computation complexity. Therefore, the computation complexity can be reduced while a picture processing effect is ensured, thereby improving picture decoding performance.

Figure 11:
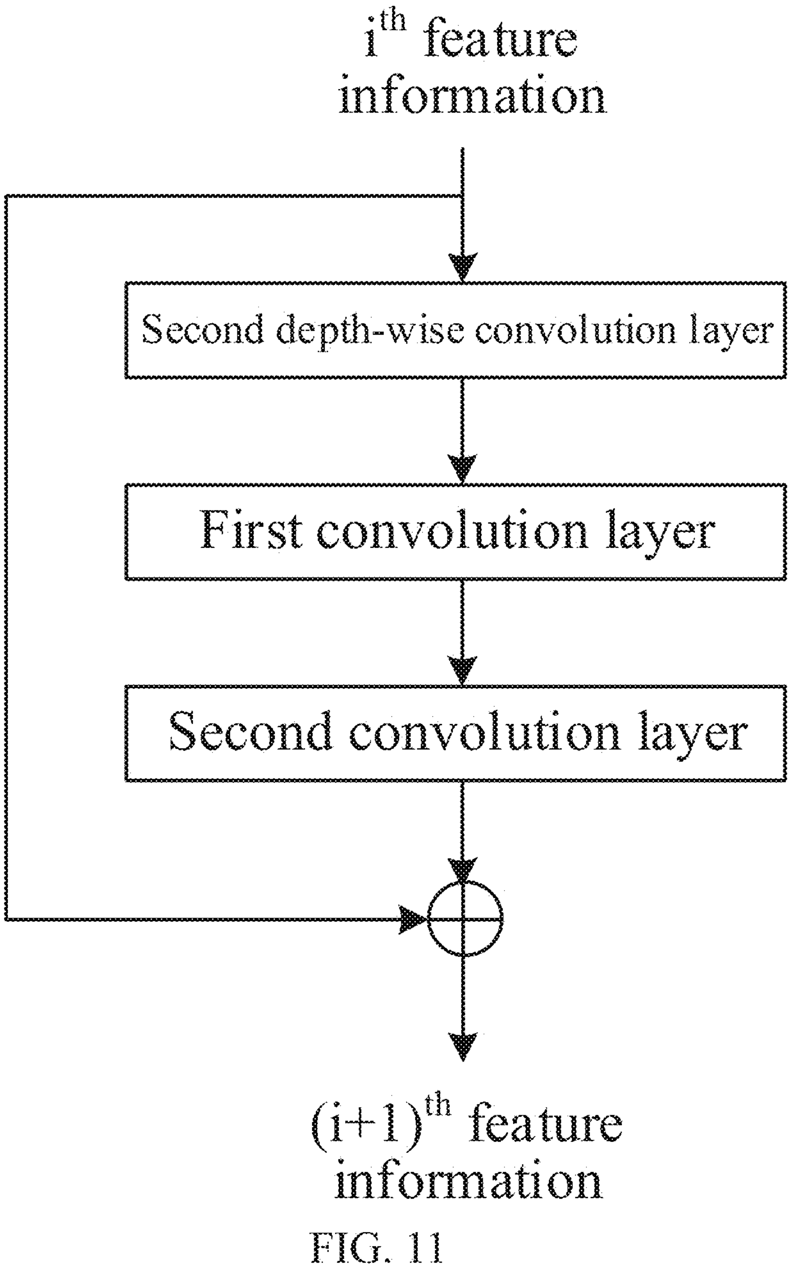
FIG. 11 is a schematic diagram of a lightweight attention module according to this application.

In some embodiments, as shown in FIG. 11, the P types of lightweight attention modules in this embodiment of this application include a fourth type of lightweight attention module. The fourth type of lightweight attention module includes a depth-wise convolution layer, a first convolution layer, and a second convolution layer. At this moment, S102-B includes the following operations.

S102-B-d1: The decoder processes the tenth feature information by using the depth-wise convolution layer, to obtain eleventh feature information.

S102-B-d2: The decoder obtains twelfth feature information based on the first convolution layer and the eleventh feature information.

S102-B-d3: The decoder obtains thirteenth feature information based on the second convolution layer and the twelfth feature information.

S102-B-d4: The decoder fuses the thirteenth feature information and the tenth feature information, to obtain fourteenth feature information.

S102-B-d5: The decoder obtains $(i+1)^{th}$ feature information based on the fourteenth feature information.

In this embodiment, a lightweight attention module shown in FIG. 11 is provided. The lightweight attention module may replace the RNBA in FIG. 2A. Because the lightweight attention module has a simple structure and low computation complexity, picture decoding efficiency can be improved.

The tenth feature information is obtained based on the $i^{th}$ feature information.

For example, if the P types of lightweight attention modules are connected in series and the fourth type of lightweight attention module is a first lightweight attention module directly connected to the $i^{th}$ convolution layer, the tenth feature information is the $i^{th}$ feature information. If the fourth type of lightweight attention module is not the first lightweight attention module directly connected to the $i^{th}$ convolution layer, the tenth feature information is feature information obtained after processing the $i^{th}$ feature information by a lightweight attention module of another type located in front of the fourth type of lightweight attention module.

For another example, if the P types of lightweight attention modules are connected in parallel, the tenth feature information is the $i^{th}$ feature information.

For another example, if the P types of lightweight attention modules are in skip connection, the tenth feature information is also the $i^{th}$ feature information.

Then, as shown in FIG. 11, the decoder inputs the tenth feature information to the depth-wise convolution layer for processing, inputs the eleventh feature information, and then obtains the twelfth feature information based on the first convolution layer and the eleventh feature information.

A specific mode of obtaining, by the decoder, the twelfth feature information based on the first convolution layer and the eleventh feature information is not limited in this embodiment of this application.

For example, the decoder directly inputs the eleventh feature information to the first convolution layer, and outputs the twelfth feature information.

For another example, the decoder inputs the eleventh feature information to a layer-normalization (LN) for normalization processing, to further reduce data complexity. Then, the normalized eleventh feature information is inputted to the first convolution layer for processing, to obtain the twelfth feature information.

Then, the decoder obtains the thirteenth feature information based on the second convolution layer and the twelfth feature information.

A specific mode of obtaining, by the decoder, the thirteenth feature information based on the second convolution layer and the twelfth feature information is not limited in this embodiment of this application.

For example, the decoder directly inputs the twelfth feature information to the second convolution layer, and outputs the thirteenth feature information.

For another example, the decoder processes the twelfth feature information by using an activation function (for example, GELU), and inputs the information to the second convolution layer for processing, to obtain the thirteenth feature information.

Finally, the decoder fuses the thirteenth feature information and the tenth feature information, to obtain the fourteenth feature information.

A specific mode of fusing, by the decoder, the thirteenth feature information and the tenth feature information, to obtain the fourteenth feature information is not limited in this embodiment of this application.

For example, the decoder fuses the thirteenth feature information and the tenth feature information, to obtain the fourteenth feature information.

For another example, the decoder multiplies the thirteenth feature information by a coefficient, and fuses with the tenth feature information, to obtain the fourteenth feature information.

Specific network structures of the depth-wise convolution layer, the first convolution layer, and the second convolution layer are not limited in this embodiment of this application. To be specific, in this embodiment of this application, sizes of convolution kernels, quantities of channels, and the like of the depth-wise convolution layer, the first convolution layer, and the second convolution layer are not limited.

In some embodiments, the convolution kernel of the depth-wise convolution layer is 7×7, and the quantity of channels is 96. The convolution kernel of the first convolution layer is 1×1, and the quantity of channels is 384. The convolution kernel of the second convolution layer is 1×1, and the quantity of channels is 96.

In some embodiments, the convolution kernel of the depth-wise convolution layer is greater than a preset convolution kernel. A specific size of the preset convolution kernel is not limited in this embodiment of this application. For example, the convolution kernel of the depth-wise convolution layer is greater than or equal to 7×7.

Then, the decoder obtains the $(i+1)^{th}$ feature information based on the determined fourteenth feature information.

In an example, if the P types of lightweight attention modules are connected in series and the fourth type of lightweight attention module is the last lightweight attention module of the P types of lightweight attention modules, the fourteenth feature information is determined as the $(i+1)^{th}$ feature information. If the fourth type of lightweight attention module is not the last lightweight attention module of the P types of lightweight attention modules, the decoder inputs the fourteenth feature information to another type of lightweight attention module following the fourth type of lightweight attention module for processing, to obtain the $(i+1)^{th}$ feature information.

In an example, if the P types of lightweight attention modules are connected in parallel, the fourteenth feature information and feature information outputted by lightweight attention modules of other types than the fourth type in the P types are fused (for example, channel concatenation), to obtain the $(i+1)^{th}$ feature information.

In an example, if the P types of lightweight attention modules are in skip connection, the fourteenth feature information and feature information outputted by lightweight attention modules of other types than the fourth type in the P types are fused (for example, channel concatenation), to obtain fused feature information. Then the fused feature information is fused with the $i^{th}$ feature information, to obtain the $(i+1)^{th}$ feature information.

The P types of lightweight attention modules following the $i^{th}$ convolution layer of the M convolution layers in the composite transformation network are used as an example for description above. For a data processing process of the at least one type of lightweight attention module following another convolution layer of the M convolution layers, refer to a data processing process of the P types of lightweight attention modules following the $i^{th}$ convolution layer.

In some embodiments, assuming that a quantity of channels of input information to be inputted to a lightweight attention module is C, the input information having the quantity of channels C may be divided into several pieces of sub-input information having quantities of channels a1, a1, . . . , and an (it is ensured that a1+a2+ . . . +an=C), and several lightweight attention modules having quantities of channels a1, a1, . . . , and an are disposed at the same time. The foregoing sub-input information is separately inputted to the lightweight attention modules having the corresponding quantities of channels, to obtain output results having quantities of channels a1, a1, . . . , and an. For example, the sub-input information having a quantity of channels a1 is inputted into a lightweight attention module having the quantity of channels a1 for processing, and an output result having the quantity of channels a1 is outputted. Then, output results having quantities of channels a1, a1, . . . , and an are concatenated, to finally obtain an output result having the quantity of channels C.

In some embodiments, a resolution downsampling module may be separately added in front of the at least one lightweight attention module in the composite transformation network provided in this embodiment of this application, and an upsampling module may be separately added behind the at least one lightweight attention module.

Types of the lightweight attention module provided in the embodiments of this application include, but are not limited to, the foregoing.

In this embodiment of this application, the decoder sets K types of lightweight attention modules in the composite transformation network. For example, at least one convolution layer of the composite transformation network is followed by at least one type of lightweight attention module of the K types, so that a correlation between different positions of a hidden variable can be constructed in layers, thereby reducing a bit rate loss, reducing a decoding time, improving decoding efficiency, and effectively controlling decoding complexity.

In some embodiments, for a luminance component and a chrominance component, different quantities of lightweight attention modules may be used, and may be deployed in different depths of a network.

In some embodiments, when a new quantity of channels is used for a neural network that processes the luminance component and the chrominance component by the decoder, parameters such as a position of the lightweight attention module, a quantity of channels, and a window size need to be adjusted again.

In some embodiments, when the decoder performs decoding by using a new bit rate point (for example, an animation picture or a picture of screen content generated by a computer), a test needs to be performed, and adjustment of parameters such as the position of the lightweight attention module, the quantity of channels, and the window size is resumed.

According to the picture decoding method provided in this embodiment of this application, when decoding a current picture, a decoder first decodes a bitstream of a current picture, to obtain a residual value of the current picture, and determines a transformed value of the current picture based on the residual value. The transformed value of the current picture is processed by using a composite transformation network, to obtain a reconstructed picture of the current picture. The composite transformation network includes K types of lightweight attention modules, and computation complexities of the K types of lightweight attention modules are all less than a preset value. To be specific, an embodiment of this application provides a new composite transformation network. The composite transformation network includes K types of lightweight attention modules, and computation complexities of the K types of lightweight attention modules are all less than a preset value. In this way, an effect of processing a transformed value of a current picture by using the composite transformation network to obtain a reconstructed picture of the current picture is good, and the computation complexity is low, thereby effectively controlling picture decoding complexities, shortening a decoding time, and improving picture decoding performances while improving a picture processing effect.

A picture decoding method in an embodiment of this application, which is applied to, for example, a decoder, is described above. A picture decoding method in an embodiment of this application, which is applied to, for example, a coder, is described above.

Figure 12:
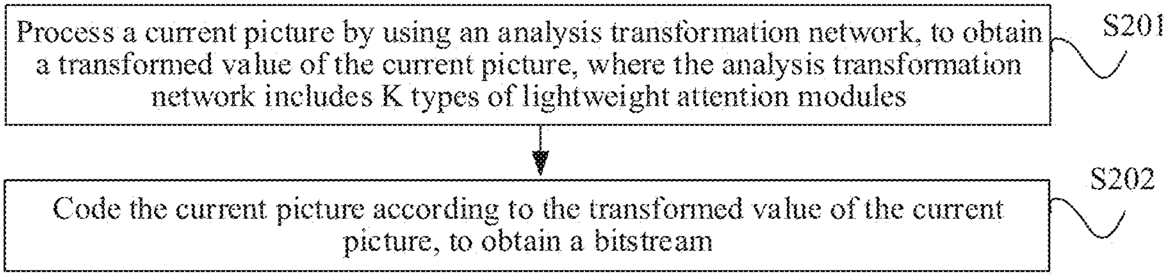
FIG. 12 is a schematic flowchart of a picture coding method according to an embodiment of this application.

FIG. 12 is a schematic flowchart of a picture coding method according to an embodiment of this application. This embodiment of this application is applied to the coder shown in FIG. 1. As shown in FIG. 12, the method according to this embodiment of this application includes the following operations.

S201: Process a current picture by using an analysis transformation network, to obtain a transformed value of the current picture, where the analysis transformation network includes K types of lightweight attention modules.

Computation complexities of the K types of lightweight attention modules are all less than a preset value.

A current analysis transformation network has a problem of incompatibility between a computation complexity and a picture processing effect. To resolve the technical problem, an embodiment of this application provides a new analysis transformation network. The analysis transformation network includes K types of lightweight attention modules, and computation complexities of the K types of lightweight attention modules are all less than a preset value. In this way, when a current picture is coded by using the analysis transformation network, a coding effect is good, and the computation complexity is low, thereby effectively controlling picture coding complexities and improving picture coding performances while improving a picture processing effect.

The quantity of types of lightweight attention modules included in the analysis transformation network is not limited in this embodiment of this application, and is specifically determined according to an actual requirement. For example, the analysis transformation network includes one type of lightweight attention module, or the analysis transformation network includes a plurality of different types of lightweight attention modules.

In some embodiments, the analysis transformation network may include one or more lightweight attention modules of a same type. For example, the analysis transformation network includes two types of lightweight attention modules, and includes two lightweight attention modules of a first type, and one lightweight attention module of a second type.

The computation complexity of the current picture by the K types of lightweight attention modules provided in this embodiment of this application is less than the predicted value. To be specific, the computation complexity of the current picture by the K types of lightweight attention modules provided in this embodiment of this application is less than the computation complexity of the current picture by the RNAB shown in FIG. 3A.

In some embodiments, the analysis transformation network in this embodiment of this application includes only the K types of lightweight attention modules, and does not include the RNAB shown in FIG. 3A.

In some embodiments, the analysis transformation network in this embodiment of this application includes the K types of lightweight attention modules, and includes at least one RNAB shown in FIG. 3A.

A specific indicator measuring the computation complexity of the lightweight attention module for the current picture is not limited in this embodiment of this application.

In some embodiments, the at least one RNAB in the analysis transformation network shown in FIG. 3A may be replaced with the K types of lightweight attention modules provided in this embodiment of this application, to reduce the computation complexity of the analysis transformation network.

In some embodiments, at least K types of lightweight attention modules provided in this embodiment of this application may be added to the analysis transformation network shown in FIG. 3B, to improve a picture processing capability of the analysis transformation network.

In some embodiments, the analysis transformation network in this embodiment of this application includes only the K types of lightweight attention modules. The coder processes the current picture by using the K types of lightweight attention modules, to obtain a transformed value of the current picture.

In some embodiments, the analysis transformation network in this embodiment of this application further includes N convolution layers. M convolution layers of the N convolution layers are separately followed by at least one lightweight attention module of the K types of lightweight attention modules.

In an example, M=N. To be specific, each convolution layer of the N convolution layers is followed by at least one lightweight attention module of the K types of lightweight attention modules, and types of lightweight attention modules following different convolution layers may be the same or may be different.

For example, as shown in FIG. 5A, M=N=3. Types of lightweight attention modules following each convolution layer of the three convolution layers are the same. To be specific, the three convolution layers are all followed by two types of lightweight attention modules. For example, a first type of lightweight attention module and a second type of lightweight attention module are connected. The quantities of the first type of lightweight attention modules connected to each convolution layer of the three convolution layers may be the same or may be different, and the quantities of the second type of lightweight attention modules connected to each convolution layer of the three convolution layers may be the same or may be different.

For another example, types of lightweight attention modules following each of the N convolution layers are different, or types of lightweight attention modules following at least two convolution layers of the N convolution layers are different. For example, as shown in FIG. 5B, M=N=3. A first convolution layer of the three convolution layers is followed by a first type of lightweight attention module and a second type of lightweight attention module. A second convolution layer is followed by a first type of lightweight attention module and a third type of lightweight attention module. A third convolution layer is followed by a third type of lightweight attention module.

In an example, M is less than N. To be specific, M convolution layers of the N convolution layers are separately followed by at least one lightweight attention module of the K types of lightweight attention modules, and types of lightweight attention modules following different convolution layers of the M convolution layers may be the same or may be different.

For example, as shown in FIG. 5C, N=3, and M=1. The third convolution layer of the three convolution layers is followed by two types of lightweight attention modules. For example, a first type of lightweight attention module and a second type of lightweight attention module are connected.

To be specific, in this embodiment of this application, each convolution layer of the N convolution layers of the analysis transformation network may be followed by at least one type of lightweight attention module of the K types of lightweight attention modules, and types of lightweight attention modules following each convolution layer of the N convolution layers may be the same or may be different. Alternatively, a part of convolution layers of the N convolution layers of the analysis transformation network may be followed by at least one type of lightweight attention module of the K types of lightweight attention modules, and types of lightweight attention modules following each convolution layer of the part of convolution layers may be the same or may be different.

In this embodiment of this application, data processing principles of the lightweight attention modules connected to each convolution layer of the M convolution layers of the analysis transformation network are basically the same. For ease of description, at least one type of lightweight attention module following the $i^{th}$ convolution layer of the M convolution layers is used as an example for description. At this moment, S201 includes the following operations.

S201-A: The coder processes, for an $i^{th}$ convolution layer of the M convolution layers, $(i-1)^{th}$ feature information of the current picture by using the $i^{th}$ convolution layer, to obtain $i^{th}$ feature information of the current picture, where the $(i-)^{th}$ feature information is obtained based on the current picture, N is a positive integer, M is a positive integer less than or equal to N, and i is a positive integer less than or equal to M.

S201-B: The coder processes the $i^{th}$ feature information by using P types of lightweight attention modules connected to the $i^{th}$ convolution layer, to obtain $(i+1)^{th}$ feature information of the current picture.

S201-C: The coder determines a transformed value of the current picture based on the $(i+1)^{th}$ feature information.

The it convolution layer is any convolution layer of the M convolution layers. The $i^{th}$ convolution layer is followed by P types of lightweight attention modules. The P types of lightweight attention modules are all or a part of the K types of lightweight attention modules. For example, if P is less than K, it indicates that the $i^{th}$ convolution layer is connected to any P types of lightweight attention modules in the K types of lightweight attention modules. For another example, if P=K, it indicates that the $i^{th}$ convolution layer is connected to the K types of lightweight attention modules. P is a positive integer. To be specific, the $i^{th}$ convolution layer may be connected to one type of lightweight attention module of the K types of lightweight attention modules, or be connected to two or more types of lightweight attention modules in the K types of lightweight attention modules.

A specific quantity of lightweight attention modules included in each of the P types is not limited in this embodiment of this application. For example, each of the P types may include one or more lightweight attention modules, and different types may include the same or different quantities of lightweight attention modules.

The $(i-1)^{th}$ feature information is obtained based on the current picture. For example, if the $i^{th}$ convolution layer is a first data processing layer in the analysis transformation network, the $(i-1)^{th}$ feature information is the current picture. For another example, if the $i^{th}$ convolution layer is not the first data processing layer in the analysis transformation network, the $(i-1)^{th}$ feature information is feature information obtained after another data processing layer before the $i^{th}$ convolution layer in the analysis transformation network processes the current picture. To be specific, the $(i-1)^{th}$ feature information may be understood as input information of the $i^{th}$ convolution layer.

As shown in FIG. 6, the coder inputs the $(i-1)^{th}$ feature information of the current picture to the $i^{th}$ convolution layer to perform convolution processing, to obtain the $i^{th}$ feature information of the current picture. Then, the coder inputs the $i^{th}$ feature information to P types of lightweight attention modules connected to the $i^{th}$ convolution layer for attention computation, and records a computation result as $(i+1)^{th}$ feature information of the current picture. Finally, the coder determines a transformed value of the current picture according to the $(i+1)^{th}$ feature information. For example, as shown in FIG. 3A and FIG. 3B, processing such as convolution or cropping is performed on the $(i+1)^{th}$ feature information, to obtain the transformed value of the current picture.

A specific connection mode (or fusion mode) of the P types of lightweight attention modules is not limited in this embodiment of this application.

In some embodiments, the P types of lightweight attention modules are connected in series or in parallel.

In some embodiments, the P types of lightweight attention modules are divided into Q attention units. Each attention unit includes at least one type of lightweight attention module of the P types of lightweight attention modules.

A specific division mode of dividing the P types of lightweight attention modules into the Q attention units includes, but is not limited to, the following examples.

Example 1: Lightweight attention modules included in a same attention unit of the Q attention units are of a same type (to be specific, one type of lightweight attention module is included), and lightweight attention modules included in different attention units are of different types.

For example, a same type of lightweight attention modules of the P types of lightweight attention modules may be divided into a same attention unit, to obtain P attention units. At this moment. Q=P.

For example, it is assumed that the P types of lightweight attention modules include a first type of lightweight attention module and a second type of lightweight attention module. The Q attention units include two attention units. In this way, the first type of lightweight attention module may be divided into an attention unit, and the second type of lightweight attention module may be divided into another attention unit. At this moment, types of lightweight attention modules included in the two attention units are different.

Example 2: At least one attention unit of the Q attention units includes two or more types of lightweight attention modules.

In a possible implementation of Example 2, each attention unit of the Q attention units includes two or more types of lightweight attention modules. At this moment, types of lightweight attention modules included in each attention unit of the Q attention units may be the same, or may be different. For example, Q=2. Lightweight attention modules included in the two attention modules are of a same type. For example, the first type of lightweight attention module and the second type of lightweight attention module are included. For another example, Q=2. Types of lightweight attention modules included in the two attention units are not completely the same. For example, a first attention unit includes a first type of lightweight attention module and a second type of lightweight attention module, and a second attention unit includes a third type of lightweight attention module and a second type of lightweight attention module.

In another possible implementation of Example 2, a part of attention units of the Q attention units include two or more types of lightweight attention modules, and a part of attention units include one type of lightweight attention module. For example, Q=3. Two attention units in the three attention modules include two or more types of lightweight attention modules. The other attention unit includes one type of lightweight attention module.

To be specific, in Example 2, a part or all of the Q attention units include two or more types of lightweight attention modules.

Based on the foregoing description, at this moment, in S201-B, the processing the $i^{th}$ feature information by using P types of lightweight attention modules connected to the $i^{th}$ convolution layer, to obtain $(i+1)^{th}$ feature information of the current picture includes: processing the $i^{th}$ feature information by using the Q attention units, to obtain the $(i+1)^{th}$ feature information, where Q is a positive integer less than or equal to P.

In this embodiment, P types of lightweight attention modules connected to the it convolution layer may be divided into Q attention units. Each attention unit includes at least one type of lightweight attention module of the P types. In this way, the coder may process the $i^{th}$ feature information by using the Q attention units, to obtain the $(i+1)^{th}$ feature information.

A specific connection mode of the Q attention units is not limited in this embodiment of this application.

In some embodiments, the Q attention units are connected in series. At this moment, the coder may process the $i^{th}$ feature information by using the Q attention units connected in series, to obtain the $(i+1)^{th}$ feature information.

As shown in FIG. 7A, Q=2. The two attention units are connected in series. After inputting the $i^{th}$ feature information to the first attention unit for processing, to obtain processed feature information 1, the coder further inputs the feature information 1 to the second attention unit for processing, and outputs the $(i+1)^{th}$ feature information.

In an example, a same attention unit of the foregoing two attention units shown in FIG. 7A includes one type of lightweight attention module. As shown in FIG. 7B, it is assumed that the analysis transformation network includes four convolution layers, and the $i^{th}$ convolution layer is a third convolution layer of the analysis transformation network. The first attention unit includes a first type of lightweight attention module, which is recorded as a lightweight attention module A, and the second attention unit includes a second type of lightweight attention module, which is recorded as a lightweight attention module B. At this moment, the lightweight attention module A and the lightweight attention module B following the $i^{th}$ convolution layer (i.e. the third convolution layer) are connected in series.

In some examples, a lightweight attention module following another convolution layer of the M convolution layers of the analysis transformation network may be consistent with a lightweight attention module following the $i^{th}$ convolution layer. For example, a part or all of the convolution layers of the analysis transformation network are all followed by the lightweight attention module A and the lightweight attention module B which are connected in series as shown in FIG. 7B.

In some embodiments, the Q attention units are connected in series, and inputs and outputs of the Q attention units are in skip connection. To be specific, the Q attention units are in skip connection with the $i^{th}$ feature information after being connected in series. At this moment, the coder may process the $i^{th}$ feature information by using the Q attention units connected in series, to obtain processed feature information, and then fuse the processed feature information with the $i^{th}$ feature information, to obtain the $(i+1)^{th}$ feature information.

As shown in FIG. 7C, Q=2. The two attention units are connected in series and then in skip connection with the $i^{th}$ feature information. In this way, the coder may input the $i^{th}$ feature information to the first attention unit for processing, to obtain processed feature information 1, and input the feature information 1 to the second attention unit for processing, to obtain processed feature information 2. Then, the feature information 2 outputted by the second attention unit is fused with the $i^{th}$ feature information, to obtain the $(i+1)^{th}$ feature information.

In an example, a same attention unit of the foregoing two attention units shown in FIG. 7C includes one type of lightweight attention module. As shown in FIG. 7D, it is assumed that the analysis transformation network includes four convolution layers, and the $i^{th}$ convolution layer is a third convolution layer of the analysis transformation network. The first attention unit includes a first type of lightweight attention module, which is recorded as a lightweight attention module A, and the second attention unit includes a second type of lightweight attention module, which is recorded as a lightweight attention module B. At this moment, the lightweight attention module A and the lightweight attention module B following the $i^{th}$ convolution layer (i.e. the third convolution layer) are in skip connection.

In some examples, a lightweight attention module following another convolution layer of the M convolution layers of the analysis transformation network may be consistent with a lightweight attention module following the $i^{th}$ convolution layer. For example, a part or all of the convolution layers of the analysis transformation network are all followed by the lightweight attention module A and the lightweight attention module B which are in skip connection as shown in FIG. 7D.

In some embodiments, the Q attention units are connected in parallel. At this moment, the coder may divide the $i^{th}$ feature information into Q pieces of first sub-feature information. For a $j^{th}$ attention unit of the Q attention units, $j^{th}$ first sub-feature information in the Q pieces of sub-feature information is processed by using the $j^{th}$ attention unit, to obtain $j^{th}$ second sub-feature information, where j is a positive integer less than or equal to Q. The second sub-feature information separately outputted by the Q attention units is fused, to obtain the $(i+1)^{th}$ feature information.

As shown in FIG. 7E, Q=2. The two attention units are connected in parallel. In this way, the coder first divides the $i^{th}$ feature information into two pieces, to obtain two pieces of first sub-feature information. Then, the two pieces of first sub-feature information are separately inputted to corresponding attention units. For example, the first piece of first sub-feature information is inputted to the first attention unit, to obtain feature information outputted by the first attention unit, and the feature information is recorded as a first piece of second sub-feature information. Meanwhile, the second piece of first sub-feature information is inputted to the second attention unit, to obtain feature information outputted by the second attention unit, and the feature information is recorded as a second piece of second sub-feature information. Then, the first piece of second sub-feature information and the second piece of second sub-feature information are fused, to obtain the $(i+1)^{th}$ feature information.

A division mode of the $i^{th}$ feature information into Q pieces of first sub-feature information is not limited in this embodiment of this application.

For example, the coder divides, based on a scale of the $i^{th}$ feature information, the $i^{th}$ feature information into Q pieces of first sub-feature information. Correspondingly, the coder performs scale concatenation on Q pieces of second sub-feature information, to obtain the $(i+1)^{th}$ feature information.

For another example, the coder divides the $i^{th}$ feature information into the Q pieces of first sub-feature information according to a quantity of channels of the $i^{th}$ feature information. To be specific, the coder divides the quantity of channels of the $i^{th}$ feature information into Q pieces, to obtain the Q pieces of first sub-feature information. Correspondingly, the second sub-feature information separately outputted by the Q attention units is concatenated according to the quantity of channels, to obtain the $(i+1)^{th}$ feature information. To be specific, the Q pieces of second sub-feature information are concatenated on the quantity of channels, to obtain the $(i+1)^{th}$ feature information.

In an example, a same attention unit of the foregoing two attention units shown in FIG. 7E includes one type of lightweight attention module. As shown in FIG. 7F, it is assumed that the analysis transformation network includes four convolution layers, and the $i^{th}$ convolution layer is a third convolution layer of the analysis transformation network. The first attention unit includes a first type of lightweight attention module, which is recorded as a lightweight attention module A. and the second attention unit includes a second type of lightweight attention module, which is recorded as a lightweight attention module B. At this moment, the lightweight attention module A and the lightweight attention module B following the $i^{th}$ convolution layer (i.e. the third convolution layer) are connected in parallel.

In some examples, a lightweight attention module following another convolution layer of the M convolution layers of the analysis transformation network may be consistent with a lightweight attention module following the $i^{th}$ convolution layer. For example, a part or all of the convolution layers of the analysis transformation network are all followed by the lightweight attention module A and the lightweight attention module B which are connected in parallel as shown in FIG. 7F.

In some examples, for each Q attention unit of the Q attention units, if the attention unit includes a plurality of lightweight attention modules, the plurality of lightweight attention modules may be connected in series, or may be connected in parallel, or may be connected in another mode. This is not limited in this embodiment of this application.

The foregoing describes a specific connection mode of the P types of lightweight attention modules following the $i^{th}$ convolution layer of the M convolution layers in the analysis transformation network. For example, the P types of lightweight attention modules may be connected in series, may be connected in parallel, may be in skip connection, and certainly may further be connected in another mode. This is not limited in the embodiment of this application.

In some embodiments, a connection mode of a lightweight attention module following another convolution layer of the M convolution layers is the same as a connection mode of a lightweight attention module following the $i^{th}$ convolution layer.

In some embodiments, a connection mode of a lightweight attention module following another convolution layer of the M convolution layers is not completely the same as a connection mode of a lightweight attention module following the $i^{th}$ convolution layer. For example, various types of lightweight attention modules following the first convolution layer of the M convolution layers are connected in series, various types of lightweight attention modules following the second convolution layer are in skip connection, and various types of lightweight attention modules following the third convolution layer are connected in parallel.

In some embodiments, in at least two convolution layers of the M convolution layers, lightweight attention modules following a same convolution layer are of a same type, and lightweight attention modules following different convolution layers are of different types.

For example, as shown in FIG. 7H, it is assumed that the analysis transformation network includes four convolution layers. A second convolution layer and a third convolution layer of the four convolution layers are followed by lightweight attention modules. For example, a first type of lightweight attention module following the second convolution layer is recorded as a lightweight attention module A, and a second type of lightweight attention module following the third convolution layer is marked as a lightweight attention module B.

In some embodiments, before processing the $i^{th}$ feature information by using P types of lightweight attention modules connected to the $i^{th}$ convolution layer, to obtain $(i+1)^{th}$ feature information of the current picture, the coder may downsample the $i^{th}$ feature information, to obtain $i^{th}$ downsampled feature information, then process, by using the P types of lightweight attention modules, the $i^{th}$ downsampled feature information, to obtain $i^{th}$ attention-processed feature information, and finally upsample the $i^{th}$ attention-processed feature information, to obtain the $(i+1)^{th}$ feature information. To be specific, in this embodiment of this application, before performing attention computation on the $i^{th}$ feature information, the coder first performs downsampling, to reduce a data volume for the attention computation. In this way, when attention computation is performed on the $i^{th}$ downsampled feature information by using the P types of lightweight attention modules, a processing speed of the attention computation can be improved, thereby improving the entire decoding efficiency. Finally, the $i^{th}$ attention-processed feature information is upsampled, to obtain the $(i+1)^{th}$ feature information.

Specific modes of downsampling and upsampling used by the coder are not limited in this embodiment of this application, and may be determined according to an actual requirement.

Different lightweight attention modules involved in this embodiment of this application are introduced below. The types of the lightweight attention modules in this embodiment of this application include, but are not limited to, those shown in the following examples, and may further include a lightweight attention module developed based on any of the foregoing types of lightweight attention modules, or another type of lightweight attention module easily conceived of by a person skilled in the art.

In some embodiments, the P types of lightweight attention modules include a first type of lightweight attention module. The first type of lightweight attention module includes a simplified residual non-local attention block. At this moment, S201-B includes the following operations.

S201-B-a1. The coder processes first feature information by using the simplified residual local attention block, to obtain second feature information, where the first feature information is obtained based on the $i^{th}$ feature information.

S201-B-a2: The coder obtains the $(i+1)^{th}$ feature information based on the second feature information.

As shown in FIG. 8A, a current RNAB includes two parallel residual units. One residual unit includes three residual blocks RBs, and the other residual unit includes six residual blocks RBs, three convolution layers, and a sigmoid function. The structure is relatively complex.

In this embodiment of this application, a simplified residual non-local attention block is provided. The simplified residual non-local attention block may be understood as a lightweight RNAB.

A specific network structure of the simplified residual non-local attention block is not limited in this embodiment of this application. For example, the simplified residual non-local attention block may be any simple structure of an RNAB network shown in FIG. 8A. For example, a network structure including fewer convolution layers, fewer residual blocks, or fewer convolution layers and fewer residual blocks than those shown in FIG. 8A may all be used as the simplified residual non-local attention block in this embodiment of this application.

In this embodiment of this application, if the P types of lightweight attention modules following the $i^{th}$ convolution layer include a first type of lightweight attention module, the coder may process first feature information by using a simplified residual local attention block, to obtain second feature information, where the first feature information is obtained based on the $i^{th}$ feature information.

For example, if the P types of lightweight attention modules are connected in series and the first type of lightweight attention module is a first lightweight attention module directly connected to the $i^{th}$ convolution layer, the first feature information is the $i^{th}$ feature information. If the first type of lightweight attention module is not the first lightweight attention module directly connected to the $i^{th}$ convolution layer, the first feature information is feature information obtained after processing the $i^{th}$ feature information by a lightweight attention module of another type located in front of the first type of lightweight attention module.

For another example, if the P types of lightweight attention modules are connected in parallel, the first feature information is the $i^{th}$ feature information.

For another example, if the P types of lightweight attention modules are in skip connection, the first feature information is also the $i^{th}$ feature information.

After processing the first feature information by using the simplified residual local attention block (i.e. the first type of lightweight attention module), to obtain second feature information, the coder obtains the $(i+1)^{th}$ feature information based on the second feature information.

In an example, if the P types of lightweight attention modules are connected in series and the simplified residual local attention block is the last lightweight attention module of the P types of lightweight attention modules, the second feature information is determined as the $(i+1)^{th}$ feature information. If the simplified residual local attention block is not the last lightweight attention module of the P types of lightweight attention modules, the coder inputs the second feature information to another type of lightweight attention module following the simplified residual local attention block for processing, to obtain the $(i+1)^{th}$ feature information.

In an example, if the P types of lightweight attention modules are connected in parallel, the second feature information and feature information outputted by lightweight attention modules of other types than the first type in the P types are fused (for example, channel concatenation), to obtain the $(i+1)^{th}$ feature information.

In an example, if the P types of lightweight attention modules are in skip connection, the coder fuses (for example, performs channel concatenation on) the second feature information and feature information outputted by lightweight attention modules of other types than the first type in the P types, to obtain fused feature information. Then the fused feature information is fused with the $i^{th}$ feature information, to obtain the $(i+1)^{th}$ feature information.

In a possible implementation, as shown in FIG. 8B, the simplified residual local attention block in this embodiment of this application includes a first residual unit and a second residual unit. At this moment, S201-B-a1 includes the following operations.

S201-B-a11: The coder processes first feature information by using a first residual unit, to obtain a first feature residual value.

S201-B-a12: The coder processes the first feature information by using a second residual unit, to obtain a second feature residual value.

S201-B-a13: The coder obtains second feature information according to the first feature residual value, the second feature residual value, and the first feature information.

The first residual unit and the second residual unit in this embodiment of this application are connected in parallel, and are configured to perform residual processing on the first feature information, to obtain a first feature residual value and a second feature residual value of the current picture.

In some embodiments, a quantity of residual blocks included in the first residual unit is less than a first preset quantity and/or a quantity of residual blocks included in the second residual unit is less than a second preset quantity.

To be specific, the quantity of residual blocks included in the first residual unit is less than the quantity of residual blocks included in an upper residual unit in FIG. 8A, and/or the quantity of residual blocks included in the second residual unit is less than the quantity of residual blocks included in a lower residual unit in FIG. 8A, so that the network structure of the simplified residual local attention block provided in this embodiment of this application is simpler than the network structure of the RNAB shown in FIG. 8A.

In some embodiments, at least one residual unit of the first residual unit and the second residual unit includes a simplified residual block. The simplified residual block may be understood as a residual block having a simpler structure than an existing residual block.

In an example, the simplified residual block includes a convolution layer.

As shown in FIG. 8C, a current residual block includes at least two convolution layers. This embodiment of this application provides a simplified residual block simplified RB. The simplified residual block includes only one convolution layer, which may reduce computation complexity of the residual block.

In an example, as shown in FIG. 8D, the simplified residual block includes a convolution layer and an activation function.

A specific quantity of simplified residual blocks included in the first residual unit and the second residual unit is not limited in this embodiment of this application.

In an example, both the first residual unit and the second residual unit include a simplified residual block. At this moment, the simplified residual non-local attention block is shown in FIG. 8E. The first feature information is separately processed by using the simplified residual block in the first residual unit and the simplified residual block in the second residual unit, and then multiplied. A multiplication result is added to the first feature information, to obtain the second feature information.

In some embodiments, the at least one residual block shown in FIG. 8A may be replaced with a simplified residual block provided in this embodiment of this application as a simplified residual non-local attention block.

Because the network structure of the simplified residual non-local attention block provided in this embodiment of this application is simpler than the network structure of the RNAB shown in FIG. 3A and FIG. 8A, and computation complexity is lower, the computation complexity is reduced while a picture processing effect is ensured, thereby improving picture decoding performance.

In some embodiments, as shown in FIG. 9A, the P types of lightweight attention modules in this embodiment of this application include a second type of lightweight attention module. The second type of lightweight attention module includes a window attention unit and a grid attention unit. At this moment, S201-B includes the following operations.

S201-B-b1: The coder determines a first window size and a second window size corresponding to the $i^{th}$ convolution layer.

S201-B-b2: The coder determines third feature information based on the $i^{th}$ feature information.

S201-B-b3: The coder divides, based on the first window size and the window attention unit, the third feature information into a plurality of sub-blocks, and separately performs local attention processing on the plurality of sub-blocks, to obtain local feature information of the current picture.

S201-B-b4: The coder divides, based on the second window size and the grid attention unit, the local feature information of the current picture into a plurality of grids, and performs global attention processing on the plurality of grids, to obtain global feature information of the current picture.

S201-B-b5: The coder determines the $(i+)^{th}$ feature information based on the global feature information of the current picture.

In this embodiment of this application, if the second type of lightweight attention module includes a window attention unit and a grid attention unit, a first window size and a second window size corresponding to the $i^{th}$ convolution layer are first determined.

The first window size may be understood as a window size corresponding to the window attention unit, and the second window size may be understood as a window corresponding to the grid attention unit.

Specific values of the first window size and the second window size are not limited in this embodiment of this application.

In some embodiments, first window sizes corresponding to different network layers are the same, and/or second window sizes corresponding to different network layers are the same.

In some embodiments, first window sizes corresponding to different network layers are different, and/or second window sizes corresponding to different network layers are different.

In some embodiments, on different network layers, different window sizes may be set to better capture an association between elements in a hidden variable, and effectively control complexity. Exemplarily, S201-B-b1 includes determining, according to a network depth of the $i^{th}$ convolution layer, at least one of the first window size and the second window size corresponding to the $i^{th}$ convolution layer.

In this embodiment, different or different levels of first window sizes and/or second window sizes are set for the second type of lightweight attention modules of different network depths. For example, different first window sizes and/or second window sizes are set for the second type of lightweight attention modules of different network depths. Alternatively, different levels of first window sizes and/or second window sizes are set for the second type of lightweight attention modules of different network depth ranges.

For example, a small first window and/or second window may be used in a shallow layer of a network, and a large first window and/or second window may be used in a deep layer of the network. To be specific, if the network depth of the $i^{th}$ convolution layer (or the second type of lightweight attention module) is small, a small first window and/or second window is used. If the network depth of the $i^{th}$ convolution layer (or the second type of lightweight attention module) is large, a large first window and/or second window is used.

A specific mode of determining, by the coder, the third feature information based on the $i^{th}$ feature information is not limited in this embodiment of this application.

For example, if the P types of lightweight attention modules are connected in series and the second type of lightweight attention module is a first lightweight attention module directly connected to the $i^{th}$ convolution layer, the third feature information is the $i^{th}$ feature information. If the second type of lightweight attention module is not the first lightweight attention module directly connected to the $i^{th}$ convolution layer, the third feature information is feature information obtained after processing the $i^{th}$ feature information by a lightweight attention module of another type located in front of the second type of lightweight attention module.

For another example, if the P types of lightweight attention modules are connected in parallel, the third feature information is the $i^{th}$ feature information.

For another example, if the P types of lightweight attention modules are in skip connection, the third feature information is also the $i^{th}$ feature information.

After determining the first window size and the third feature information based on the foregoing operations, the coder divides, based on the first window size and the window attention unit, the third feature information into a plurality of sub-blocks, and separately performs local attention processing on the plurality of sub-blocks, to obtain local feature information of the current picture.

In some embodiments, before dividing the third feature information into the plurality of sub-blocks, the coder further processes the third feature information by using another feature processing unit, to obtain processed third feature information.

A specific network structure of the feature processing unit is not limited in this embodiment of this application.

In a possible implementation, as shown in FIG. 9B, the second type of lightweight attention module further includes an inverted linear bottleneck unit with depth-wise convolution. At this moment, S201-B-b2 includes operation S201-B-b21.

S201-B-b21: The coder performs feature extraction on the third feature information by using the inverted linear bottleneck unit with depth-wise convolution, to obtain the processed third feature information.

A specific network structure of the inverted linear bottleneck unit with depth-wise convolution is not limited in this embodiment of this application.

In an example, as shown in FIG. 9C, the inverted linear bottleneck unit with depth-wise convolution is an MBConv, including a first convolution layer, a Depth-wise convolution layer, a squeeze excitation layer (SE), and a second convolution layer. At this moment, S201-B-b21 includes: performing pointwise convolution channel dimension increase on the $i^{th}$ feature information by using the first convolution layer, performing Depth-wise convolution in a projection space after the dimension increase, enhancing representation of an important channel by using the SE immediately following, and finally, performing pointwise convolution to restore a dimension by using the second convolution layer again.

In an example, as shown in FIG. 9D, the inverted linear bottleneck unit with depth-wise convolution includes a first convolution layer, an SE layer, and a second convolution layer. At this moment, S201-B-b21 includes the following operations: performing channel dimension increase processing on the third feature information by using the first convolution layer, to obtain dimension increase feature information; performing channel enhancement processing on the dimension increase feature information by pressing the squeeze excitation layer, to obtain enhanced feature information; and performing channel dimension reduction on the enhanced feature information by using the second convolution layer, to obtain processed third feature information.

Exemplarily, a feature dimension of the dimension reduction feature information is equal to a feature dimension of the third feature information.

Specific parameters of the first convolution layer and the second convolution layer are not limited in this embodiment of this application.

Exemplarily, the first convolution layer is a 1×1 convolution layer.

Exemplarily, the second convolution layer is a 1×1 convolution layer.

Compared with the MBConv of FIG. 9C, the inverted linear bottleneck unit with depth-wise convolution shown in FIG. 9D reduces a Depth-wise convolution layer. Normalization processing is usually performed after the Depth-wise convolution layer, and the normalization processing is not very friendly to a picture compression task. Therefore, when picture compression is performed by using the depth-wise convolution unit shown in FIG. 9D, picture compression efficiency can be improved.

In some embodiments, the inverted linear bottleneck unit with depth-wise convolution shown in FIG. 9D may be used as an improved MBConv.

A specific network structure of the window attention unit is not limited in this embodiment of this application.

In a possible implementation, as shown in FIG. 9E, the window attention unit includes a block self attention (Block-SA) and a feed forward neural network (FNN). Exemplarily, for each sub-block of the plurality of sub-blocks, block-level self attention computation is first performed on the sub-block by using the Block-SA, and a computation result is added to the sub-block, to obtain self attention information of the sub-block. The self attention information of the plurality of sub-blocks is combined, and the combined self attention information is inputted to the FNN for processing, to obtain the local feature information of the current picture.

In a possible implementation, the window attention unit may include more or fewer modules than those shown in FIG. 9E. For example, at least one convolution layer is added after the FNN shown in FIG. 9E, or at least one convolution layer is added after the last addition operation shown in FIG. 9E.

After obtaining the local feature information of the current picture by using the window attention unit, the coder inputs the local feature information to the grid attention unit. Then, the local feature information of the current picture is divided into a plurality of grids according to the second window size, and global attention processing is performed on the plurality of grids, to obtain global feature information of the current picture.

A specific network structure of the grid attention unit is not limited in this embodiment of this application.

In a possible implementation, as shown in FIG. 9F, the grid attention unit includes a grid self attention (Grid-SA) and a feed forward neural network (FNN).

For example, self attention computation is first performed on the entire grid by using the Grid-SA, and a computation result is fused with the local feature information, to obtain self attention information of the entire grid. The self attention information of the entire grid is inputted to the FNN for processing, to obtain the global feature information of the current picture.

In a possible implementation, the grid attention unit may include more or fewer modules than those shown in FIG. 9F. For example, at least one convolution layer is added after the FNN shown in FIG. 9F, or at least one convolution layer is added after the last addition operation shown in FIG. 9F.

After determining the global feature information of the current picture based on the foregoing operations, the coder determines the $(i+1)^{th}$ feature information according to the global feature information of the current picture.

A specific mode of determining, by the coder, the $(i+1)^{th}$ feature information according to the global feature information of the current picture is not limited in this embodiment of this application.

In an example, if the P types of lightweight attention modules are connected in series and the second type of lightweight attention module is the last lightweight attention module of the P types of lightweight attention modules, the global feature information is determined as the $(i+1)^{th}$ feature information. If the second type of lightweight attention module is not the last lightweight attention module of the P types of lightweight attention modules, the coder inputs the global feature information to another type of lightweight attention module following the second type of lightweight attention module for processing, to obtain the $(i+1)^{th}$ feature information.

In an example, if the P types of lightweight attention modules are connected in parallel, the global feature information and feature information outputted by lightweight attention modules of other types than the second type in the P types are fused (for example, channel concatenation), to obtain the $(i+1)^{th}$ feature information.

In an example, if the P types of lightweight attention modules are in skip connection, the coder fuses (for example, performs channel concatenation on) the global feature information and feature information outputted by lightweight attention modules of other types than the second type in the P types, to obtain fused feature information. Then the fused feature information is fused with the $i^{th}$ feature information, to obtain the $(i+1)^{th}$ feature information.

In this implementation, the provided second type of lightweight attention module includes a window attention unit and a grid attention unit. It can be seen from the foregoing that the window attention unit and the grid attention unit have a simple structure, so that the entire second type of lightweight attention module has a simple structure and has low computation complexity. Therefore, the computation complexity can be reduced while a picture processing effect is ensured, thereby improving picture decoding performance.

In some embodiments, as shown in FIG. 10A, the P types of lightweight attention modules in this embodiment of this application include a third type of lightweight attention module. The third type of lightweight attention module includes at least one of a multi-head transposed attention submodule and a gated feed forward network submodule. At this moment, S201-B includes the following operations.

S201-B-c1: The coder processes fourth feature information by using at least one of the multi-head transposed attention submodule and the gated feed forward network submodule, to obtain fifth feature information.

S201-B-c2: The coder determines the $(i+1)^{th}$ feature information based on the fifth feature information.

The fourth feature information is obtained based on the $i^{th}$ feature information.

For example, if the P types of lightweight attention modules are connected in series and the third type of lightweight attention module is a first lightweight attention module directly connected to the $i^{th}$ convolution layer, the fourth feature information is the $i^{th}$ feature information. If the third type of lightweight attention module is not the first lightweight attention module directly connected to the $i^{th}$ convolution layer, the fourth feature information is feature information obtained after processing the $i^{th}$ feature information by a lightweight attention module of another type located in front of the third type of lightweight attention module.

For another example, if the P types of lightweight attention modules are connected in parallel, the fourth feature information is the $i^{th}$ feature information.

For another example, if the P types of lightweight attention modules are in skip connection, the fourth feature information is also the $i^{th}$ feature information.

Then, the coder inputs the fourth feature information to the third type of lightweight attention module, and processes the fourth feature information by using the multi-head transposed attention submodule and/or the gated feed forward network submodule in the third type of lightweight attention module, to obtain fifth feature information.

The multi-head transposed attention submodule is configured to perform channel self attention processing on information inputted to the multi-head transposed attention submodule. The gated feed forward network submodule is configured to perform feature conversion processing on information inputted to the gated feed forward network submodule.

In some embodiments, if the third type of lightweight attention module includes a multi-head transposed attention submodule and a gated feed forward network submodule, S201-B-c1 includes the following operations.

S201-B-c11: The coder performs channel self attention processing on the fourth feature information by using the multi-head transposed attention submodule, to obtain sixth feature information.

S201-B-c12: The coder performs feature conversion processing on the sixth feature information by using the gated feed forward network submodule, to obtain the fifth feature information.

A specific network structure of the multi-head transposed attention submodule is not limited in this embodiment of this application.

In a possible implementation, as shown in FIG. 10B, the multi-head transposed attention submodule includes a first feature processing unit, a second feature processing unit, and a third feature processing unit. At this moment, S201-B-c11 includes the following operations.

S201-B-c111: The coder separately processes the fourth feature information by using the first feature processing unit, the second feature processing unit, and the third feature processing unit, to obtain query information, key value information, and value entry information.

S201-B-c112: The coder determines transposed attention information according to the query information, the key value information, and the value entry information.

S201-B-c113: The coder obtains the sixth feature information according to the transposed attention information and the fourth feature information.

As shown in FIG. 10B, in this embodiment of this application, the coder inputs the fourth feature information to the first feature processing unit for processing, and outputs query information Q. The query information Q is also referred to as a query matrix. The fourth feature information is inputted to the second feature processing unit for processing, and key value information K is outputted. The key value information K is also referred to as a key value matrix. The fourth feature information is inputted to the third feature processing unit for processing, and value entry information V is outputted. The value entry information V is also referred to as a value entry matrix. Further, transposed attention information is determined according to the query information, the key value information, and the value entry information, and sixth feature information is obtained according to the transposed attention information and the fourth feature information.

Specific network structures of the first feature processing unit, the second feature processing unit, and the third feature processing unit are not limited in this embodiment of this application.

In a possible implementation, as shown in FIG. 10C, the first feature processing unit includes one convolution layer and one deformable convolution layer. The second feature processing unit includes one convolution layer and one deformable convolution layer. The third feature processing unit includes one convolution layer and one deformable convolution layer. In some embodiments, convolution layers included in the first feature processing unit, the second feature processing unit, and the third feature processing unit may be the same or may be different. In some embodiments, deformable convolution layers included in the first feature processing unit, the second feature processing unit, and the third feature processing unit may be the same, or may be different.

In some embodiments, a convolution layer included in at least one feature processing unit of the first feature processing unit, the second feature processing unit, and the third feature processing unit is a 1×1 convolution layer.

In some embodiments, a deformable convolution layer included in at least one feature processing unit of the first feature processing unit, the second feature processing unit, and the third feature processing unit is a 3×3 deformable convolution layer.

In a possible implementation, at least one of the first feature processing unit, the second feature processing unit, and the third feature processing unit does not include a third convolution layer, and a size of a convolution kernel of the third convolution layer is a first preset value.

In an example, the third convolution layer may be the 1×1 convolution layer in FIG. 10C.

In an example, the third convolution layer may be the 3×3 deformable convolution layer in FIG. 10C.

To be specific, the multi-head transposed attention submodule shown in this implementation may not include the at least one 1×1 convolution layer in FIG. 10C. Alternatively, the multi-head transposed attention submodule shown in this implementation may not include the at least one 3×3 deformable convolution layer in FIG. 10C, to reduce computation complexity of the multi-head transposed attention submodule. Alternatively, the multi-head transposed attention submodule shown in this implementation includes fewer 1×1 convolution layers and/or fewer 3×3 deformable convolution layers than those shown in FIG. 10C.

In an example, if the first feature processing unit, the second feature processing unit, and the third feature processing unit do not include a 1×1 convolution layer, a network of the multi-head transposed attention submodule is shown in FIG. 10D.

In some embodiments, as shown in FIG. 10D, the multi-head transposed attention submodule further includes a fourth convolution layer. At this moment, the obtaining, by the coder, the sixth feature information according to the transposed attention information and the fourth feature information includes: processing the transposed attention information by using the fourth convolution layer, and fusing with the fourth feature information, to obtain the sixth feature information.

A specific structure of the fourth convolution layer is not limited in this embodiment of this application.

Exemplarily, the fourth convolution layer is a 1×1 convolution layer.

In some embodiments, as shown in FIG. 10E, the multi-head transposed attention submodule does not include a fourth convolution layer. At this moment, the obtaining, by the coder, the sixth feature information according to the transposed attention information and the fourth feature information includes: processing the transposed attention information, and fusing with the fourth feature information, to obtain the sixth feature information.

In some embodiments, as shown in FIG. 10C, before inputting the fourth feature information to the first feature processing unit, the second feature processing unit, and the third feature processing unit, the decoder first performs normalization (Norm) processing, and separately inputs the normalized fourth feature information to the first feature processing unit, the second feature processing unit, and the third feature processing unit.

It can be seen from the foregoing that, in some embodiments, to reduce computation complexity of the multi-head transposed attention submodule, compared with the multi-Dconv head transposed attention (MDTA) shown in FIG. 10C, there are fewer 1×1 convolution layers, fewer 3×3 deformable convolution layers, or fewer 1×1 convolution layers and 3×3 deformable convolution layers, to reduce computation complexity of the multi-head transposed attention submodule and improve picture processing efficiency. For example, the left three 1×1 convolution layers and/or the right three 1×1 convolution layers in the MDTA shown in FIG. 10C are reduced, to obtain a multi-head transposed attention submodule with low computation complexity.

In some embodiments, at least one of the first feature processing unit, the second feature processing unit, and the third feature processing unit in the multi-head transposed attention submodule includes a residual block (RB) or a simplified residual block (simplified RB block). To be specific, in this embodiment, the 1×1 convolution layer and the 3×3 convolution layer in any branch of the MDTA shown in 10C may be replaced with a residual block or a simplified residual block. In some embodiments, the last convolution layer (i.e. a 1×1 convolution layer at the lower right corner) may further be removed, to further reduce model complexity. In some embodiments, the activation function in the simplified residual block may be a LeakyReLU activation function, another activation function, or the like.

In some embodiments, the multi-head transposed attention submodule may be directly replaced with the simplified residual non-local attention block. As shown in the foregoing embodiment, the simplified residual non-local attention block includes a first residual unit and a second residual unit, and at least one residual unit of the first residual unit and the second residual unit includes one or more simplified residual blocks. Alternatively, a quantity of residual blocks included in the first residual unit is less than a first preset quantity and/or a quantity of residual blocks included in the second residual unit is less than a second preset quantity.

In some embodiments, in the lightweight attention modules included in the analysis transformation network, different lightweight attention modules correspond to different quantities of heads of multi-head transposed attention submodules. For example, for some lightweight attention modules, head transposed attention submodules with a large quantity of heads are used. For some lightweight attention modules, head transposed attention submodules with a small quantity of heads are used. For example, lightweight attention modules of different network depths correspond to different quantities of heads of multi-head transposed attention submodules.

Based on the foregoing operations, after inputting the fourth feature information to the multi-head transposed attention submodule to perform channel self attention processing, to obtain sixth feature information, the coder inputs the sixth feature information to the gated feed forward network submodule to perform feature conversion processing, to obtain fifth feature information.

A specific network structure of the gated feed forward network submodule is not limited in this embodiment of this application.

In a possible implementation, as shown in FIG. 10F, the gated feed forward network submodule includes a fourth feature processing unit and a fifth feature processing unit. At this moment, S201-B-c12 includes the following operations.

S201-B-c121: The coder separately processes the sixth feature information by using the fourth feature processing unit and the fifth feature processing unit, to obtain seventh feature information and eighth feature information.

S201-B-c122: The coder point-multiplies the seventh feature information and the eighth feature information, to obtain ninth feature information.

S201-B-c123: The coder obtains fifth feature information according to the ninth feature information and the sixth feature information.

Specific network structures of the fourth feature processing unit and the fifth feature processing unit are not limited in this embodiment of this application.

In a possible implementation, as shown in FIG. 10G, the fourth feature processing unit includes one convolution layer and one deformable convolution layer. The fifth feature processing unit includes one convolution layer and one deformable convolution layer. In some embodiments, convolution layers included in the fourth feature processing unit and the fifth feature processing unit may be the same or may be different. In some embodiments, deformable convolution layers included in the fourth feature processing unit and the fifth feature processing unit may be the same or may be different.

In some embodiments, a convolution layer included in at least one feature processing unit of the fourth feature processing unit and the fifth feature processing unit is a 1×1 convolution layer.

In some embodiments, a deformable convolution layer included in at least one feature processing unit of the fourth feature processing unit and the fifth feature processing unit is a 3×3 deformable convolution layer.

In a possible implementation, at least one of the fourth feature processing unit and the fifth feature processing unit does not include a fifth convolution layer, and a size of a convolution kernel of the fifth convolution layer is a second preset value.

In an example, the fifth convolution layer may be the 1×1 convolution layer in FIG. 10G.

In an example, the fifth convolution layer may be the 3×3 deformable convolution layer in FIG. 10G.

To be specific, the gated feed forward network submodule shown in this implementation may not include the at least one 1×1 convolution layer in FIG. 10G. Alternatively, the gated feed forward network submodule shown in this implementation may not include the at least one 3×3 deformable convolution layer in FIG. 10G, to reduce computation complexity of the gated feed forward network submodule. Alternatively, the gated feed forward network submodule shown in this implementation includes fewer 1×1 convolution layers and/or fewer 3×3 deformable convolution layers than those shown in FIG. 10G. For example, two 1×1 convolution layers on the left of 10G are adapted to be reduced.

In an example, if neither the fourth feature processing unit nor the fifth feature processing unit includes a 1×1 convolution layer, a network of the gated feed forward network submodule is shown in FIG. 10H.

In some embodiments, as shown in FIG. 10H, the gated feed forward network submodule further includes a sixth convolution layer. At this moment, the obtaining, by the coder, fifth feature information according to the ninth feature information and the sixth feature information includes: processing the ninth feature information by using the sixth convolution layer, and fusing with the sixth feature information, to obtain the fifth feature information.

A specific structure of the sixth convolution layer is not limited in this embodiment of this application.

Exemplarily, the sixth convolution layer is a 1×1 convolution layer.

In some embodiments, as shown in FIG. 10I, the gated feed forward network submodule does not include a sixth convolution layer. At this moment, the obtaining, by the coder, fifth feature information according to the ninth feature information and the sixth feature information includes: fusing the ninth feature information and the sixth feature information, to obtain the fifth feature information.

In some embodiments, before inputting the ninth feature information to the fourth feature processing unit and the fifth feature processing unit, the decoder first performs normalization processing (Norm), and separately inputs the normalized sixth feature information to the fourth feature processing unit and the fifth feature processing unit.

It can be seen from the foregoing that, in some embodiments, to reduce computation complexity of the gated feed forward network submodule, compared with the gated-Dconv feed-forward network (GDFN) shown in FIG. 10G, there are fewer 1×1 convolution layers, fewer 3×3 deformable convolution layers, or fewer 1×1 convolution layers and 3×3 deformable convolution layers, to reduce computation complexity of the multi-head transposed attention submodule and improve picture processing efficiency. For example, the left two 1×1 convolution layers and/or the right two 1×1 convolution layers in the GDFN shown in FIG. 10G are reduced, to obtain a gated feed forward network submodule with low computation complexity.

In some embodiments, as shown in FIG. 10F, after the fifth feature processing unit, the gated feed forward network submodule in this embodiment of this application further includes an activation function. To be specific, after processing the second feature information by using the fifth feature processing unit to obtain fourth feature information, the coder processes the fourth feature information by using the activation function, and point-multiplies the processed fourth feature information by the third feature information and the fourth feature information, to obtain fifth feature information.

A specific type of the activation function in FIG. 10F is not limited in this embodiment of this application.

In some embodiments, the activation function is GELU Activation.

In some embodiments, to further reduce complexity of the gated feed forward network submodule, the activation function may be an activation function such as Sigmoid, ReLU, LeakyReLU, PReLU, or ELU.

In some embodiments, at least one of the fourth feature processing unit and the fifth feature processing unit includes a residual block or a simplified residual block. To be specific, in this embodiment, the 1×1 and 3×3 convolution of any branch in the gated feed forward network submodule may be replaced with the residual block (RB) or the foregoing simplified residual block (simplified RB block). In some embodiments, the last convolution layer, i.e. the 1×1 convolution layer at the lower right corner of the GDFN shown in FIG. 10G, is removed, thereby further reducing model complexity. In some embodiments, the activation function in the simplified residual block may be a LeakyReLU activation function, another activation function, or the like.

In some embodiments, the gated feed forward network submodule may be directly replaced with the simplified residual non-local attention block.

After determining the global feature information of the current picture based on the foregoing operations, the coder determines the $(i+1)^{th}$ feature information according to the global feature information of the current picture.

A specific mode of determining, by the coder, the $(i+1)^{th}$ feature information according to the fifth feature information is not limited in this embodiment of this application.

In an example, if the P types of lightweight attention modules are connected in series and the third type of lightweight attention module is the last lightweight attention module of the P types of lightweight attention modules, the fifth feature information is determined as the $(i+1)^{th}$ feature information. If the third type of lightweight attention module is not the last lightweight attention module of the P types of lightweight attention modules, the coder inputs the fifth feature information to another type of lightweight attention module following the third type of lightweight attention module for processing, to obtain the $(i+1)^{th}$ feature information.

In an example, if the P types of lightweight attention modules are connected in parallel, the fifth feature information and feature information outputted by lightweight attention modules of other types than the third type in the P types are fused (for example, channel concatenation), to obtain the $(i+1)^{th}$ feature information.

In an example, if the P types of lightweight attention modules are in skip connection, the fifth feature information and feature information outputted by lightweight attention modules of other types than the third type in the P types are fused (for example, channel concatenation), to obtain fused feature information. Then the fused feature information is fused with the $i^{th}$ feature information, to obtain the $(i+1)^{th}$ feature information.

In this implementation, the provided third type of lightweight attention module includes at least one of a multi-head transposed attention submodule and a gated feed forward network submodule. It can be seen from the foregoing that the multi-head transposed attention submodule and the gated feed forward network submodule have a simple structure, so that the entire third type of lightweight attention module has low computation complexity. Therefore, the computation complexity can be reduced while a picture processing effect is ensured, thereby improving picture decoding performance.

In some embodiments, as shown in FIG. 11, the P types of lightweight attention modules in this embodiment of this application include a fourth type of lightweight attention module. The fourth type of lightweight attention module includes a depth-wise convolution layer, a first convolution layer, and a second convolution layer. At this moment, S201-B includes the following operations.

S201-B-d1: The coder processes the tenth feature information by using the depth-wise convolution layer, to obtain eleventh feature information.

S201-B-d2: The coder obtains twelfth feature information based on the first convolution layer and the eleventh feature information.

S201-B-d3: The coder obtains thirteenth feature information based on the second convolution layer and the twelfth feature information.

S201-B-d4: The coder fuses the thirteenth feature information and the tenth feature information, to obtain fourteenth feature information.

S201-B-d5: The coder obtains $(i+1)^{th}$ feature information based on the fourteenth feature information.

In this embodiment, a lightweight attention module shown in FIG. 11 is provided. The lightweight attention module may replace the RNBA in FIG. 2A. Because the lightweight attention module has a simple structure and low computation complexity, picture decoding efficiency can be improved.

The tenth feature information is obtained based on the $i^{th}$ feature information.

For example, if the P types of lightweight attention modules are connected in series and the fourth type of lightweight attention module is a first lightweight attention module directly connected to the $i^{th}$ convolution layer, the tenth feature information is the $i^{th}$ feature information. If the fourth type of lightweight attention module is not the first lightweight attention module directly connected to the $i^{th}$ convolution layer, the tenth feature information is feature information obtained after processing the $i^{th}$ feature information by a lightweight attention module of another type located in front of the fourth type of lightweight attention module.

For another example, if the P types of lightweight attention modules are connected in parallel, the tenth feature information is the $i^{th}$ feature information.

For another example, if the P types of lightweight attention modules are in skip connection, the tenth feature information is also the $i^{th}$ feature information.

Then, as shown in FIG. 11, the coder inputs the tenth feature information to the depth-wise convolution layer for processing, inputs the eleventh feature information, and then obtains the twelfth feature information based on the first convolution layer and the eleventh feature information.

A specific mode of obtaining, by the coder, the twelfth feature information based on the first convolution layer and the eleventh feature information is not limited in this embodiment of this application.

For example, the coder directly inputs the eleventh feature information to the first convolution layer, and outputs the twelfth feature information.

For another example, the coder inputs the eleventh feature information to a layer-normalization (LN) for normalization processing, to further reduce data complexity. Then, the normalized eleventh feature information is inputted to the first convolution layer for processing, to obtain the twelfth feature information.

Then, the coder obtains the thirteenth feature information based on the second convolution layer and the twelfth feature information.

A specific mode of obtaining, by the coder, the thirteenth feature information based on the second convolution layer and the twelfth feature information is not limited in this embodiment of this application.

For example, the coder directly inputs the twelfth feature information to the second convolution layer, and outputs the thirteenth feature information.

For another example, the coder processes the twelfth feature information by using an activation function (for example, GELU), and inputs the information to the second convolution layer for processing, to obtain the thirteenth feature information.

Finally, the coder fuses the thirteenth feature information and the tenth feature information, to obtain the fourteenth feature information.

A specific mode of fusing, by the coder, the thirteenth feature information and the tenth feature information, to obtain the fourteenth feature information is not limited in this embodiment of this application.

For example, the coder fuses the thirteenth feature information and the tenth feature information, to obtain the fourteenth feature information.

For another example, the coder multiplies the thirteenth feature information by a coefficient, and fuses with the tenth feature information, to obtain the fourteenth feature information.

Specific network structures of the depth-wise convolution layer, the first convolution layer, and the second convolution layer are not limited in this embodiment of this application. To be specific, in this embodiment of this application, sizes of convolution kernels, quantities of channels, and the like of the depth-wise convolution layer, the first convolution layer, and the second convolution layer are not limited.

In some embodiments, the convolution kernel of the depth-wise convolution layer is 7×7, and the quantity of channels is 96. The convolution kernel of the first convolution layer is 1×1, and the quantity of channels is 384. The convolution kernel of the second convolution layer is 1×1, and the quantity of channels is 96.

In some embodiments, the convolution kernel of the depth-wise convolution layer is greater than a preset convolution kernel. A specific size of the preset convolution kernel is not limited in this embodiment of this application.

For example, the convolution kernel of the depth-wise convolution layer is greater than or equal to 7×7.

Then, the coder obtains the $(i+1)^{th}$ feature information based on the determined fourteenth feature information.

In an example, if the P types of lightweight attention modules are connected in series and the fourth type of lightweight attention module is the last lightweight attention module of the P types of lightweight attention modules, the fourteenth feature information is determined as the $(i+1)^{th}$ feature information. If the fourth type of lightweight attention module is not the last lightweight attention module of the P types of lightweight attention modules, the coder inputs the fourteenth feature information to another type of lightweight attention module following the fourth type of lightweight attention module for processing, to obtain the $(i+1)^{th}$ feature information.

In an example, if the P types of lightweight attention modules are connected in parallel, the fourteenth feature information and feature information outputted by lightweight attention modules of other types than the fourth type in the P types are fused (for example, channel concatenation), to obtain the $(i+1)^{th}$ feature information.

In an example, if the P types of lightweight attention modules are in skip connection, the fourteenth feature information and feature information outputted by lightweight attention modules of other types than the fourth type in the P types are fused (for example, channel concatenation), to obtain fused feature information. Then the fused feature information is fused with the $i^{th}$ feature information, to obtain the $(i+1)^{th}$ feature information.

The P types of lightweight attention modules following the $i^{th}$ convolution layer of the M convolution layers in the analysis transformation network are used as an example for description above. For a data processing process of the at least one type of lightweight attention module following another convolution layer of the M convolution layers, refer to a data processing process of the P types of lightweight attention modules following the $i^{th}$ convolution layer.

In some embodiments, assuming that a quantity of channels of input information to be inputted to a lightweight attention module is C, the input information having the quantity of channels C may be divided into several pieces of sub-input information having quantities of channels a1, a1, . . . , and an (it is ensured that a1+a2+ . . . +an=C), and several lightweight attention modules having quantities of channels a1, a1, . . . , and an are disposed at the same time. The foregoing sub-input information is separately inputted to the lightweight attention modules having the corresponding quantities of channels, to obtain output results having quantities of channels a1, a1, . . . , and an. For example, the sub-input information having a quantity of channels a1 is inputted into a lightweight attention module having the quantity of channels a1 for processing, and an output result having the quantity of channels a1 is outputted. Then, output results having quantities of channels a1, a1, . . . , and an are concatenated, to finally obtain an output result having the quantity of channels C.

In some embodiments, a resolution downsampling module may be separately added in front of the at least one lightweight attention module in the analysis transformation network provided in this embodiment of this application, and an upsampling module may be separately added behind the at least one lightweight attention module.

Types of the lightweight attention module provided in the embodiments of this application include, but are not limited to, the foregoing.

In this embodiment of this application, K types of lightweight attention modules are disposed in the analysis transformation network. For example, at least one convolution layer of the analysis transformation network is followed by at least one type of lightweight attention module of the K types, so that a correlation between different positions of a hidden variable can be constructed in layers, thereby reducing a bit rate loss, improving coding efficiency, and effectively controlling coding complexity.

S202: Code the current picture according to the transformed value of the current picture, to obtain a bitstream.

For example, as shown in FIG. 2A and FIG. 2B, after obtaining a transformed value of a current picture by using the foregoing method, a coder obtains a residual value according to the transformed value, and quantizes and codes the residual value to obtain a bitstream.

According to the picture coding method provided in this embodiment of this application, when coding a current picture, a coder processes the current picture by using an analysis transformation network, to obtain a transformed value of the current picture. The analysis transformation network includes K types of lightweight attention modules, and computation complexities of the K types of lightweight attention modules are all less than a preset value. Further, the current picture is coded based on the transformed value of the current picture, to obtain a bitstream. To be specific, an embodiment of this application provides a new analysis transformation network. The analysis transformation network includes K types of lightweight attention modules, and computation complexities of the K types of lightweight attention modules are all less than a preset value. In this way, when a current picture is processed by the analysis transformation network, the computation complexity is reduced while ensuring a coding effect, thereby effectively controlling picture coding complexities, reducing a coding time, and improving picture coding performances while improving a picture processing effect.

The preferred implementations of this application are described in detail above with reference to the accompanying drawings. However, this application is not limited to the specific details in the foregoing implementations. A plurality of simple deformations may be made to the technical solution of this application within a range of the technical concept of this application. These simple deformations fall within the protection scope of this application. For example, the specific technical features described in the foregoing specific implementations may be combined in any proper mode in a case without conflict. To avoid unnecessary repetition, possible combinations will not be described separately in this application. For another example, different implementations of this application may alternatively be arbitrarily combined without departing from the idea of this application. These combinations shall still be regarded as content disclosed in this application.

In the method embodiments of this application, sequence numbers of the foregoing processes do not indicate execution sequences. The execution sequences of the processes are to be determined according to functions and internal logic of the processes, and not to be construed as any limitation to the implementation processes of the embodiments of this application.

The method embodiments of this application are described in detail above with reference to FIG. 4 to FIG. 12. Apparatus embodiments of this application are described in detail below with reference to FIG. 13 to FIG. 15.

Figure 13:
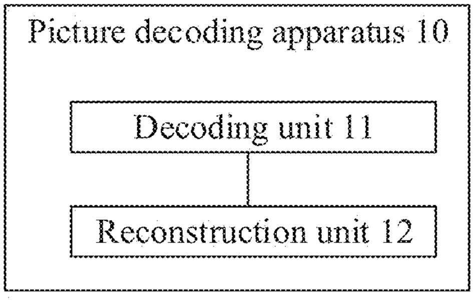
FIG. 13 is a schematic block diagram of a picture decoding apparatus according to an embodiment of this application.

FIG. 13 is a schematic block diagram of a picture decoding apparatus according to an embodiment of this application.

As shown in FIG. 13, the picture decoding apparatus 10 may include:

- a decoding unit 11, configured to decode a bitstream of a current picture, to obtain a residual value of the current picture, and determine a transformed value of the current picture based on the residual value; and
- a reconstruction unit 12, configured to process the transformed value of the current picture by using a composite transformation network, to obtain a reconstructed picture of the current picture, where the composite transformation network includes K types of lightweight attention modules, K is a positive integer, and computation complexities of the K types of lightweight attention modules are all less than a preset value.

In some embodiments, the composite transformation network includes N convolution layers. M convolution layers of the N convolution layers are separately connected to at least one type of lightweight attention module of the K types of lightweight attention modules. The reconstruction unit 12 is specifically configured to, process, for an $i^{th}$ convolution layer of the M convolution layers, $(i-1)^{th}$ feature information of the current picture by using the $i^{th}$ convolution layer, to obtain $i^{th}$ feature information of the current picture, where the $(i-1)^{th}$ feature information is obtained based on the transformed value of the current picture, N is a positive integer, M is a positive integer less than or equal to N. and i is a positive integer less than or equal to M; process the $i^{th}$ feature information by using P types of lightweight attention modules connected to the $i^{th}$ convolution layer, to obtain $(i+1)^{th}$ feature information of the current picture, where P is a positive integer less than or equal to K; and determine the reconstructed picture based on the $(i+1)^{th}$ feature information.

In some embodiments, the P types of lightweight attention modules are divided into Q attention units. Each attention unit includes at least one type of lightweight attention module of the P types of lightweight attention modules. The reconstruction unit 12 is specifically configured to process the $i^{th}$ feature information by using the Q attention units, to obtain the $(i+1)^{th}$ feature information, where Q is a positive integer less than or equal to P.

In some embodiments, lightweight attention modules included in a same attention unit of the Q attention units are of a same type, and lightweight attention modules included in different attention units are of different types.

In some embodiments, at least one attention unit of the Q attention units includes two or more types of lightweight attention modules.

In some embodiments, the Q attention units are connected in series. The reconstruction unit 12 is specifically configured to process the $i^{th}$ feature information by using the Q attention units connected in series, to obtain the $(i+1)^{th}$ feature information.

In some embodiments, the Q attention units are connected in series, and inputs and outputs of the Q attention units are in skip connection. The reconstruction unit 12 is specifically configured to: process the $i^{th}$ feature information by using the Q attention units connected in series, to obtain processed feature information; and fuse the processed feature information with the $i^{th}$ feature information, to obtain the $(i+1)^{th}$ feature information.

In some embodiments, the Q attention units are connected in parallel. The reconstruction unit 12 is specifically configured to: divide the $i^{th}$ feature information into Q pieces of first sub-feature information; process, for a $j^{th}$ attention unit of the Q attention units, $j^{th}$ first sub-feature information in the Q pieces of sub-feature information by using the $j^{th}$ attention unit, to obtain $j^{th}$ second sub-feature information, where j is a positive integer less than or equal to Q; and fuse the second sub-feature information separately outputted by the Q attention units, to obtain the $(i+1)^{th}$ feature information.

In some embodiments, the reconstruction unit 12 is specifically configured to: divide the $i^{th}$ feature information into the Q pieces of first sub-feature information according to a quantity of channels of the $i^{th}$ feature information; and concatenate, according to the quantity of channels, the second sub-feature information separately outputted by the Q attention units, to obtain the $(i+1)^{th}$ feature information.

In some embodiments, in at least two convolution layers of the M convolution layers, lightweight attention modules connected to a same convolution layer are of a same type, and lightweight attention modules connected to different convolution layers are of different types.

In some embodiments, the reconstruction unit 12 is specifically configured to: downsample the $i^{th}$ feature information, to obtain $i^{th}$ downsampled feature information; process the $i^{th}$ downsampled feature information by using the P types of lightweight attention modules, to obtain it attention-processed feature information; and upsample the $i^{th}$ attention-processed feature information, to obtain the $(i+1)^{th}$ feature information.

In some embodiments, the P types of lightweight attention modules include a first type of lightweight attention module. The first type of lightweight attention module includes a simplified residual non-local attention block. The reconstruction unit 12 is specifically configured to: process first feature information by using the simplified residual local attention block, to obtain second feature information, where the first feature information is obtained based on the $i^{th}$ feature information; and obtain the $(i+1)^{th}$ feature information based on the second feature information.

In some embodiments, the P types of lightweight attention modules include a second type of lightweight attention module. The second type of lightweight attention module includes a window attention unit and a grid attention unit. The reconstruction unit 12 is specifically configured to: determine a first window size and a second window size corresponding to the $i^{th}$ convolution layer, determine third feature information based on the $i^{th}$ feature information; divide, based on the first window size and the window attention unit, the third feature information into a plurality of sub-blocks, and separately perform local attention processing on the plurality of sub-blocks, to obtain local feature information of the current picture; divide, based on the second window size and the grid attention unit, the local feature information of the current picture into a plurality of grids, and perform global attention processing on the plurality of grids, to obtain global feature information of the current picture; and determine the $(i+1)^{th}$ feature information based on the global feature information of the current picture.

In some embodiments, the P types of lightweight attention modules include a third type of lightweight attention module. The third type of lightweight attention module includes at least one of a multi-head transposed attention submodule and a gated feed forward network submodule. The reconstruction unit 12 is specifically configured to: process fourth feature information by using at least one of the multi-head transposed attention submodule and the gated feed forward network submodule, to obtain fifth feature information, where the fourth feature information is obtained based on the $i^{th}$ feature information, the multi-head transposed attention submodule is configured to perform channel self attention processing on information inputted to the multi-head transposed attention submodule, and the gated feed forward network submodule is configured to perform feature conversion processing on information inputted to the gated feed forward network submodule; and determine the $(i+1)^{th}$ feature information based on the fifth feature information.

In some embodiments, the third type of lightweight attention module includes a multi-head transposed attention submodule and a gated feed forward network submodule. The reconstruction unit 12 is specifically configured to: perform channel self attention processing on the fourth feature information by using the multi-head transposed attention submodule, to obtain sixth feature information; and perform feature conversion processing on the sixth feature information by using the gated feed forward network submodule, to obtain the fifth feature information.

In some embodiments, the multi-head transposed attention submodule includes a first feature processing unit, a second feature processing unit, and a third feature processing unit. The reconstruction unit 12 is specifically configured to: separately process the fourth feature information by using the first feature processing unit, the second feature processing unit, and the third feature processing unit, to obtain query information, key value information, and value entry information, determine transposed attention information according to the query information, the key value information, and the value entry information; and obtain the sixth feature information according to the transposed attention information and the fourth feature information.

In some embodiments, at least one of the first feature processing unit, the second feature processing unit, and the third feature processing unit includes a residual block or a simplified residual block.

In some embodiments, the gated feed forward network submodule includes a fourth feature processing unit and a fifth feature processing unit. The reconstruction unit 12 is specifically configured to: separately process the sixth feature information by using the fourth feature processing unit and the fifth feature processing unit, to obtain seventh feature information and eighth feature information; point-multiply the seventh feature information and the eighth feature information, to obtain ninth feature information; and obtain the fifth feature information according to the ninth feature information and the sixth feature information.

In some embodiments, at least one of the fourth feature processing unit and the fifth feature processing unit includes a residual block or a simplified residual block.

In some embodiments, the multi-head transposed attention submodule or the gated feed forward network submodule is a simplified residual non-local attention block.

In some embodiments, the simplified residual non-local attention block includes a first residual unit and a second residual unit. At least one residual unit of the first residual unit and the second residual unit includes one or more simplified residual blocks. Alternatively, a quantity of residual blocks included in the first residual unit is less than a first preset quantity and/or a quantity of residual blocks included in the second residual unit is less than a second preset quantity.

In some embodiments, the P types of lightweight attention modules include a fourth type of lightweight attention module. The fourth type of lightweight attention module includes a depth-wise convolution layer, a first convolution layer, and a second convolution layer. The reconstruction unit 12 is specifically configured to: process tenth feature information by using the depth-wise convolution layer, to obtain eleventh feature information, where the tenth feature information is obtained based on the $i^{th}$ feature information; obtain twelfth feature information based on the first convolution layer and the eleventh feature information; obtain thirteenth feature information based on the second convolution layer and the twelfth feature information; obtain fourteenth feature information based on the thirteenth feature information and the tenth feature information; and obtain the $(i+1)^{th}$ feature information based on the fourteenth feature information.

The apparatus embodiments and the method embodiments may correspond to each other. For similar descriptions, refer to the method embodiments. To avoid repetition, details are not described herein again. Specifically, the apparatus shown in FIG. 13 may perform the foregoing method embodiments, and the foregoing and other operations and/or functions of the modules in the apparatus are separately intended to implement the method embodiments corresponding to the decoder. For brevity, details are not described herein again.

Figure 14:
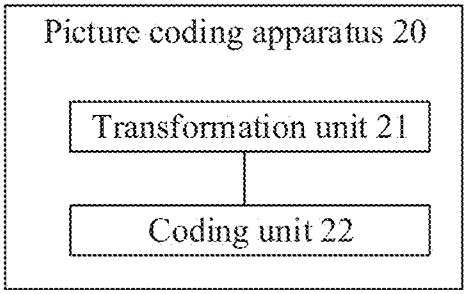
FIG. 14 is a schematic block diagram of a picture coding apparatus according to an embodiment of this application.

FIG. 14 is a schematic block diagram of a picture coding apparatus according to an embodiment of this application.

As shown in FIG. 14, the picture coding apparatus 20 may include:

a transformation unit 21, configured to process a current picture by using an analysis transformation network, to obtain a transformed value of the current picture, where the analysis transformation network includes K types of lightweight attention modules, computation complexities of the K types of lightweight attention modules are all less than a preset value, and K is a positive integer; and a coding unit 22, configured to code the current picture according to the transformed value of the current picture, to obtain a bitstream.

The apparatus embodiments and the method embodiments may correspond to each other. For similar descriptions, refer to the method embodiments. To avoid repetition, details are not described herein again. Specifically, the apparatus shown in FIG. 14 may perform the foregoing method embodiments, and the foregoing and other operations and/or functions of the modules in the apparatus are separately intended to implement the method embodiments corresponding to the coder. For brevity, details are not described herein again.

The apparatus in this embodiment of this application is described above with reference to the accompanying drawings from the perspective of a functional module. The functional module may be implemented in a form of hardware, or may be implemented in a form of software, or may be implemented in a combination of hardware and software modules. Specifically, the operations of the method in this embodiment of this application may be completed by an integrated logic circuit of hardware in the processor and/or an instruction in a form of software. The operations of the method disclosed in this embodiment of this application may be directly embodied as being completed by a hardware decoding processor, or may be completed by a combination of hardware and software modules in the decoding processor. In some embodiments, the software module may be located in a storage medium that is mature in the art, such as a random access memory, a flash memory, a read-only memory, a programmable read-only memory, an electrically erasable programmable memory, or a register. The storage medium is located in the memory. The processor reads information in the memory and completes the operations in the foregoing method embodiments in combination with hardware thereof.

Figure 15:
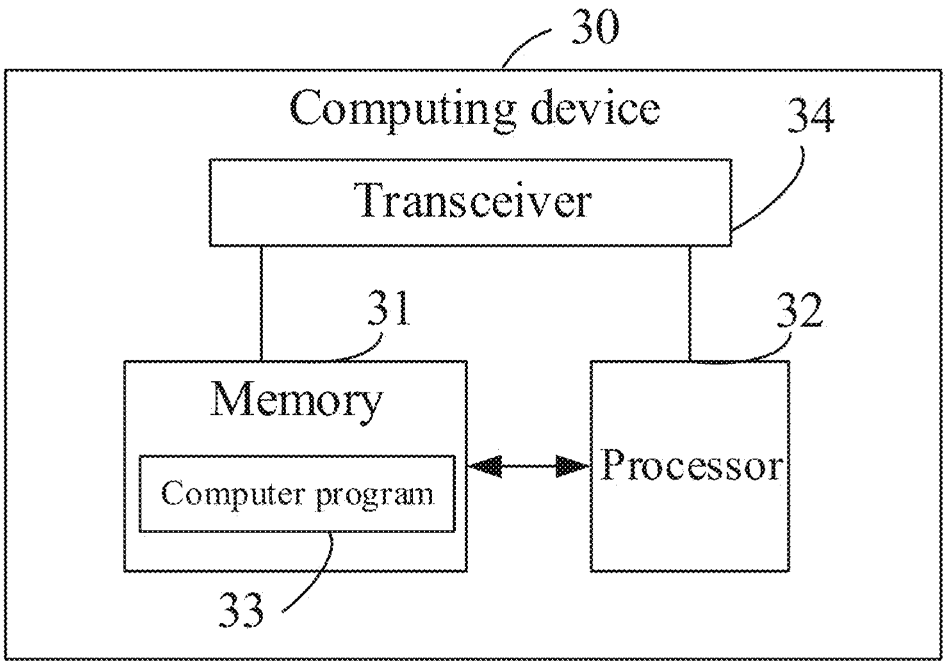
FIG. 15 is a schematic block diagram of an electronic device according to an embodiment of this application.

FIG. 15 is a schematic block diagram of an electronic device according to an embodiment of this application. The electronic device in FIG. 15 may be the foregoing decoder or coder.

As shown in FIG. 15, the electronic device 30 may include:

a memory 31 and a processor 32. The memory 31 is configured to store a computer program 33 and transmit the program code 33 to the processor 32. In other words, the processor 32 may invoke and run the computer program 33 from the memory 31 to implement the method in this embodiment of this application.

For example, the processor 32 may be configured to perform the operations in the foregoing method 200 according to instructions in the computer program 33.

In some embodiments of this application, the processor 32 may include, but is not limited to:

a general-purpose processor, a digital signal processor (DSP), an application specific integrated circuit (ASIC), a field programmable gate array (FPGA), or another programmable logic device, a discrete gate or transistor logic device, or a discrete hardware component.

In some embodiments of this application, the memory 31 includes, but is not limited to:

a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through exemplary but not limited description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

In some embodiments of this application, the computer program 33 may be segmented into one or more modules. The one or more modules are stored in the memory 31 and executed by the processor 32, to complete a page recording method provided in this application. The one or more modules may be a series of computer program instruction segments that can implement specific functions. The instruction segments are configured for describing an execution process of the computer program 33 in the electronic device.

As shown in FIG. 15, the electronic device 30 may further include:

a transceiver 34. The transceiver 34 may be connected to the processor 32 or the memory 31.

The processor 32 may control the transceiver 34 to communicate with other devices. Specifically, information or data may be transmitted to or received from the other devices. The transceiver 34 may include a transmitter and a receiver. The transceiver 34 may further include an antenna. There may be one or more antennas.

The components in the electronic device 30 are connected through a bus system. In addition to a data bus, the bus system further includes a power bus, a control bus, and a status signal bus.

According to one aspect of this application, a computer storage medium is provided. The computer storage medium has a computer program stored therein. The computer program, when executed by a computer, causes the computer to perform the method in the foregoing method embodiments.

An embodiment of this application further provides a computer program product including instructions. The instructions, when executed by a computer, cause the computer to perform the method in the foregoing method embodiments.

According to another aspect of this application, a computer program product or a computer program is provided. The computer program product or the computer program includes computer instructions. The computer instructions are stored in a non-transitory computer-readable storage medium. A processor of a computer device reads the computer instructions from the computer-readable storage medium. The processor executes the computer instructions, so that the computer device performs the method in the foregoing method embodiments.

In other words, when implemented by using software, all or some of the operations may be implemented in a form of a computer program product. The computer program product includes one or more computer instructions. When the computer program instructions are loaded and executed on a computer, all or some of the processes or functions of this embodiment of this application are implemented. The computer may be a general-purpose computer, a special-purpose computer, a computer network, or another programmable apparatus. The computer instructions may be stored in a computer-readable storage medium, or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) mode. The computer-readable storage medium may be any available medium that can be accessed by a computer, or a data storage device such as a server or a data center integrated by one or more available media. The available medium may be a magnetic medium (for example, a floppy disk, a hard disk, or a magnetic tape), an optical medium (for example, a digital video disc (DVD)), a semiconductor medium (for example, a solid state disk (SSD)), or the like.

A person of ordinary skill in the art may be aware that the exemplary modules and algorithm operations described with reference to embodiments disclosed in this specification can be implemented by electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it shall not be considered that the implementation goes beyond the scope of this application.

In the several embodiments provided in this application, the disclosed system, apparatus, and method may be implemented in other modes. For example, the apparatus embodiments described above are merely schematic. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate components may or may not be physically separated, and the components displayed as modules may or may not be physical modules, and may be located in one place or may be distributed over a plurality of network units. Some or all of the modules may be selected according to actual needs to achieve the objectives of the solutions of this embodiment. For example, the functional modules in the embodiments of this application may be integrated in one processing module, the modules may exist alone physically, or two or more modules may be integrated in one module.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules. Moreover, each module or unit can be part of an overall module or unit that includes the functionalities of the module or unit. The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A picture decoding method performed by a computer device, the method comprising:

- decoding a bitstream of a current picture to obtain a residual value of the current picture;
- determining a predicted value of the current picture based on the decoded bitstream;
- determining a transformed value of the current picture based on the residual value and the predicted value; and
- processing the transformed value of the current picture by using a composite transformation network, to obtain a reconstructed picture of the current picture, the composite transformation network comprising K types of lightweight attention modules and N convolution layers, wherein M convolution layers of the N convolution layers are separately connected to at least one type of lightweight attention module of the K types of lightweight attention modules, wherein each of the K types of lightweight attention modules has a computation complexity less than a preset value, and K being a positive integer, and the processing further comprising:
  - processing, for an $i^{th}$ convolution layer of the M convolution layers, $(i-1)^{th}$ feature information of the current picture by using the $i^{th}$ convolution layer, to obtain $i^{th}$ feature information of the current picture, the $(1-1)^{th}$ feature information being obtained based on the transformed value of the current picture, N being a positive integer, M being a positive integer less than or equal to N, and i being a positive integer less than or equal to M;
  - processing the $i^{th}$ feature information by using P types of lightweight attention modules connected to the $i^{th}$ convolution layer, to obtain $(i+1)^{th}$ feature information of the current picture, P being a positive integer less than or equal to K; and
  - determining the reconstructed picture based on the $(1+1)^{th}$ feature information.

2. The method according to claim 1, wherein the P types of lightweight attention modules are divided into Q attention units, each attention unit comprises at least one type of lightweight attention module of the P types of lightweight attention modules, and the processing the $i^{th}$ feature information by using P types of lightweight attention modules connected to the $i^{th}$ convolution layer, to obtain $(i+1)^{th}$ feature information of the current picture comprises:

- processing the $i^{th}$ feature information by using the Q attention units, to obtain the $(i+1)^{th}$ feature information, Q being a positive integer less than or equal to P.

3. The method according to claim 2, wherein lightweight attention modules comprised in a same attention unit of the Q attention units are of a same type, and lightweight attention modules comprised in different attention units are of different types.

4. The method according to claim 2, wherein at least one attention unit of the Q attention units comprises two or more types of lightweight attention modules.

5. The method according to claim 2, wherein the Q attention units are connected in series, and the processing the $i^{th}$ feature information by using the Q attention units, to obtain the $(i+1)^{th}$ feature information comprises:

- processing the $i^{th}$ feature information by using the Q attention units connected in series, to obtain the $(i+1)^{th}$ feature information.

6. The method according to claim 2, wherein the Q attention units are connected in series, inputs and outputs of the Q attention units are in skip connection, and the processing the $i^{th}$ feature information by using the Q attention units, to obtain the $(i+1)^{th}$ feature information comprises:

- processing the $i^{th}$ feature information by using the Q attention units connected in series, to obtain processed feature information; and
- fusing the processed feature information with the $i^{th}$ feature information, to obtain the $(i+1)^{th}$ feature information.

7. The method according to claim 2, wherein the Q attention units are connected in parallel, and the processing the $i^{th}$ feature information by using the Q attention units, to obtain the $(i+1)^{th}$ feature information comprises:

- dividing the $i^{th}$ feature information into Q pieces of first sub-feature information;
- processing, for a $j^{th}$ attention unit of the Q attention units, $j^{th}$ first sub-feature information in the Q pieces of sub-feature information by using the $j^{th}$ attention unit, to obtain $j^{th}$ second sub-feature information, j being a positive integer less than or equal to Q; and
- fusing the second sub-feature information separately outputted by the Q attention units, to obtain the $(i+1)^{th}$ feature information.

8. The method according to claim 1, wherein in at least two convolution layers of the M convolution layers, lightweight attention modules connected to a same convolution layer are of a same type, and lightweight attention modules connected to different convolution layers are of different types.

9. The method according to claim 1, wherein the processing the $i^{th}$ feature information by using P types of lightweight attention modules connected to the $i^{th}$ convolution layer, to obtain $(i+1)^{th}$ feature information of the current picture comprises:

downsampling the $i^{th}$ feature information, to obtain $i^{th}$ downsampled feature information;

processing the $i^{th}$ downsampled feature information by using the P types of lightweight attention modules, to obtain $i^{th}$ attention-processed feature information; and upsampling the $i^{th}$ attention-processed feature information, to obtain the $(i+1)^{th}$ feature information.

10. The method according to claim 1, wherein the P types of lightweight attention modules comprise a first type of lightweight attention module, the first type of lightweight attention module comprises a simplified residual non-local attention block, and the processing the $i^{th}$ feature information by using P types of lightweight attention modules connected to the $i^{th}$ convolution layer, to obtain $(i+1)^{th}$ feature information of the current picture comprises:

processing first feature information by using the simplified residual local attention block, to obtain second feature information, the first feature information being obtained based on the $i^{th}$ feature information; and obtaining the $(i+1)^{th}$ feature information based on the second feature information.

11. The method according to claim 1, wherein the P types of lightweight attention modules comprise a second type of lightweight attention module, the second type of lightweight attention module comprises a window attention unit and a grid attention unit, and the processing the $i^{th}$ feature information by using P types of lightweight attention modules connected to the $i^{th}$ convolution layer, to obtain $(i+1)^{th}$ feature information of the current picture comprises:

determining a first window size and a second window size corresponding to the $i^{th}$ convolution layer;

determining third feature information based on the $i^{th}$ feature information;

dividing, based on the first window size and the window attention unit, the third feature information into a plurality of sub-blocks, and separately performing local attention processing on the plurality of sub-blocks, to obtain local feature information of the current picture;

dividing, based on the second window size and the grid attention unit, the local feature information of the current picture into a plurality of grids, and performing global attention processing on the plurality of grids, to obtain global feature information of the current picture; and determining the $(i+1)^{th}$ feature information based on the global feature information of the current picture.

12. The method according to claim 1, wherein the P types of lightweight attention modules comprise a third type of lightweight attention module, the third type of lightweight attention module comprises at least one of a multi-head transposed attention submodule and a gated feed forward network submodule, and the processing the $i^{th}$ feature information by using P types of lightweight attention modules connected to the $i^{th}$ convolution layer, to obtain $(i+1)^{th}$ feature information of the current picture comprises:

processing fourth feature information by using at least one of the multi-head transposed attention submodule and the gated feed forward network submodule, to obtain fifth feature information, the fourth feature information being obtained based on the $i^{th}$ feature information, the multi-head transposed attention submodule being configured to perform channel self attention processing on information inputted to the multi-head transposed attention submodule, and the gated feed forward network submodule being configured to perform feature conversion processing on information inputted to the gated feed forward network submodule; and determining the $(i+1)^{th}$ feature information based on the fifth feature information.

13. The method according to claim 1, wherein the P types of lightweight attention modules comprise a fourth type of lightweight attention module, the fourth type of lightweight attention module comprises a depth-wise convolution layer, a first convolution layer, and a second convolution layer, and the processing the $i^{th}$ feature information by using P types of lightweight attention modules connected to the $i^{th}$ convolution layer, to obtain $(i+1)^{th}$ feature information of the current picture comprises:

processing tenth feature information by using the depth-wise convolution layer, to obtain eleventh feature information, the tenth feature information being obtained based on the $i^{th}$ feature information;

obtaining twelfth feature information based on the first convolution layer and the eleventh feature information;

obtaining thirteenth feature information based on the second convolution layer and the twelfth feature information;

obtaining fourteenth feature information based on the thirteenth feature information and the tenth feature information; and obtaining the $(i+1)^{th}$ feature information based on the fourteenth feature information.

14. An electronic device, comprising a processor and a memory, the memory being configured to store a computer program; and the processor being configured to execute the computer program to implement a picture decoding method including:

decoding a bitstream of a current picture to obtain a residual value of the current picture;

determining a predicted value of the current picture based on the decoded bitstream;

determining a transformed value of the current picture based on the residual value and the predicted value; and processing the transformed value of the current picture by using a composite transformation network, to obtain a reconstructed picture of the current picture, the composite transformation network comprising K types of lightweight attention modules and N convolution layers, wherein M convolution layers of the N convolution layers are separately connected to at least one type of lightweight attention module of the K types of lightweight attention modules, wherein each of the K types of lightweight attention modules has a computation complexity less than a preset value, and K being a positive integer, and the processing further comprising:

processing, for an $i^{th}$ convolution layer of the M convolution layers, $(i-1)^{th}$ feature information of the current picture by using the $i^{th}$ convolution layer, to obtain $i^{th}$ feature information of the current picture, the $(1-1)^{th}$ feature information being obtained based on the transformed value of the current picture, N being a positive integer, M being a positive integer less than or equal to N, and i being a positive integer less than or equal to M;

processing the $i^{th}$ feature information by using P types of lightweight attention modules connected to the $i^{th}$ convolution layer, to obtain $(1+1)^{th}$ feature information of the current picture, P being a positive integer less than or equal to K; and determining the reconstructed picture based on the $(1+1)^{th}$ feature information.

15. The electronic device according to claim 14, wherein lightweight attention modules comprised in a same attention unit of the Q attention units are of a same type, and lightweight attention modules comprised in different attention units are of different types.

16. The electronic device according to claim 14, wherein at least one attention unit of the Q attention units comprises two or more types of lightweight attention modules.

17. The electronic device according to claim 14, wherein in at least two convolution layers of the M convolution layers, lightweight attention modules connected to a same convolution layer are of a same type, and lightweight attention modules connected to different convolution layers are of different types.

18. A non-transitory computer-readable storage medium storing a computer program, the computer program, when executed by a processor of a computer device, causing the computer device to perform a picture decoding method including:

decoding a bitstream of a current picture to obtain a residual value of the current picture;

determining a predicted value of the current picture based on the decoded bitstream;

determining a transformed value of the current picture based on the residual value and the predicted value; and processing the transformed value of the current picture by using a composite transformation network, to obtain a reconstructed picture of the current picture, the composite transformation network comprising K types of lightweight attention modules and N convolution layers, wherein M convolution layers of the N convolution layers are separately connected to at least one type of lightweight attention module of the K types of lightweight attention modules, wherein each of the K types of lightweight attention modules has a computation complexity less than a preset value, and K being a positive integer, and the processing further comprising:

processing, for an $i^{th}$ convolution layer of the M convolution layers, $(i-1)^{th}$ feature information of the current picture by using the $i^{th}$ convolution layer, to obtain $i^{th}$ feature information of the current picture, the $(i-1)^{th}$ feature information being obtained based on the transformed value of the current picture, N being a positive integer, M being a positive integer less than or equal to N, and i being a positive integer less than or equal to M;

processing the $i^{th}$ feature information by using P types of lightweight attention modules connected to the $i^{th}$ convolution layer, to obtain $(i+1)^{th}$ feature information of the current picture, P being a positive integer less than or equal to K; and determining the reconstructed picture based on the $(1+1)^{th}$ feature information.

* * * * *